(12) United States Patent
Omura et al.

(10) Patent No.: US 7,430,579 B2
(45) Date of Patent: *Sep. 30, 2008

(54) CONFERENCE SUPPORT APPARATUS, INFORMATION PROCESSOR, TELECONFERENCE SYSTEM AND COMPUTER PRODUCT

(75) Inventors: Katsuyuki Omura, Tokyo (JP); Tadashi Honda, Tokyo (JP); Soichiro Iga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/742,630

(22) Filed: May 1, 2007

(65) Prior Publication Data

US 2007/0198638 A1 Aug. 23, 2007

Related U.S. Application Data

(62) Division of application No. 10/259,774, filed on Sep. 30, 2002, now Pat. No. 7,225,227.

(30) Foreign Application Priority Data

| Sep. 28, 2001 | (JP) | 2001-303385 |
| Mar. 22, 2002 | (JP) | 2002-082149 |
| Aug. 6, 2002 | (JP) | 2002-229162 |
| Sep. 3, 2002 | (JP) | 2002-258309 |
| Sep. 3, 2002 | (JP) | 2002-258310 |

(51) Int. Cl.
*G06F 15/16* (2006.01)

(52) U.S. Cl. .................. 709/205; 709/208; 709/204

(58) Field of Classification Search ............ None
See application file for complete search history.

(56) References Cited

U.S. PATENT DOCUMENTS

| 5,161,113 A | 11/1992 | Omura |
| 5,208,874 A | 5/1993 | Omura |
| 5,218,558 A | 6/1993 | Omura |
| 5,694,544 A | 12/1997 | Tanigawa et al. |
| 5,844,553 A | 12/1998 | Hao et al. |
| 5,872,924 A | 2/1999 | Nakayama et al. |

(Continued)

FOREIGN PATENT DOCUMENTS

JP 2-84860 3/1990

(Continued)

OTHER PUBLICATIONS

U.S. Appl. No. 12/031,257, filed Feb. 14, 2008, Honda, et al.

*Primary Examiner*—John B. Walsh
(74) *Attorney, Agent, or Firm*—Oblon, Spivak, McClelland, Maier & Neustadt, P.C.

(57) ABSTRACT

An information sharing area, employed by all conferees for sharing information (object) or personal knowledge transmitted via information processors from conferees, and an editing display area, employed for editing a structure of the information (object) or shared knowledge, can be definitely distinguished from each other and displayed in a large display device commonly visible from all conferees. When the areas are displayed in the large display device and one of the objects displayed in the information sharing area is designated, the designated object is displayed at a desired location in the editing display area and can be edited through cooperative works by all conferees centering around a conference chairman.

15 Claims, 32 Drawing Sheets

U.S. PATENT DOCUMENTS

| | | | |
|---|---|---|---|
| 5,996,002 A | | 11/1999 | Katsurabayashi et al. |
| 6,047,314 A * | | 4/2000 | Pommier et al. ............ 709/205 |
| 6,091,408 A | | 7/2000 | Trebitz et al. |
| 6,195,091 B1 * | | 2/2001 | Harple et al. ................ 715/751 |
| 6,195,684 B1 | | 2/2001 | Watanabe et al. |
| 6,370,533 B1 | | 4/2002 | Sato et al. |
| 6,421,042 B1 | | 7/2002 | Omura et al. |
| 6,429,856 B1 | | 8/2002 | Omura et al. |
| 6,584,493 B1 * | | 6/2003 | Butler ........................ 709/204 |
| 6,772,229 B1 * | | 8/2004 | Achacoso et al. ............. 710/4 |
| 6,820,112 B1 * | | 11/2004 | Matsuda et al. ............ 709/203 |
| 6,851,053 B1 * | | 2/2005 | Liles et al. .................. 713/168 |
| 6,983,416 B1 * | | 1/2006 | Bae et al. .................... 715/530 |
| 6,996,780 B2 * | | 2/2006 | Estrada ....................... 715/751 |
| 7,043,529 B1 * | | 5/2006 | Simonoff .................... 709/205 |
| 7,171,448 B1 * | | 1/2007 | Danielsen et al. ........... 709/205 |
| 7,184,592 B2 | | 2/2007 | Iga et al. |
| 7,185,054 B1 * | | 2/2007 | Ludwig et al. .............. 709/204 |
| 2003/0187932 A1 | | 10/2003 | Kennedy |
| 2007/0198638 A1 | | 8/2007 | Omura et al. |

FOREIGN PATENT DOCUMENTS

| | | |
|---|---|---|
| JP | 3-157029 | 7/1991 |
| JP | 6-77958 | 3/1994 |
| JP | 7-284076 | 10/1995 |
| JP | 08-055067 | 2/1996 |
| JP | 9-325883 | 12/1997 |
| JP | 10-40058 | 2/1998 |
| JP | 10-134002 | 5/1998 |
| JP | 10-322331 | 12/1998 |
| JP | 11-134225 | 5/1999 |
| JP | 2000-124901 | 4/2000 |

* cited by examiner

FIG.18
TABLE VIEW
|      | 1Mbps | 5Mbps | 10Mbps | 50Mbps | 100Mbps | NONE |
|------|-------|-------|--------|--------|---------|------|
| 2001 |       |       | model 001 PROPOSED SPECIFICATION  ○ |        |         |      |
| 2002 |       |       |        | model 002 PROPOSED SPECIFICATION  ○ |         |      |
| 2003 |       |       |        |        |         |      |
| 2004 |       |       |        |        |         |      |
| 2005 |       |       |        |        | model 003 PROPOSED SPECIFICATION 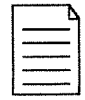 ○ |      |
| NONE |       |       |        |        |         |      |

FIG.21

|  | TITLE | ATTRIBUTE | CONTRIBUTOR |
|---|---|---|---|
| ◎ | FINAL PROPOSED REPORT | CONCLUSION | OMURA |
| ◎ | FINISH CHART | CONCLUSION | SUZUKI |
| ▲ | PROBLEM MEMO | SUBJECT | OMURA |

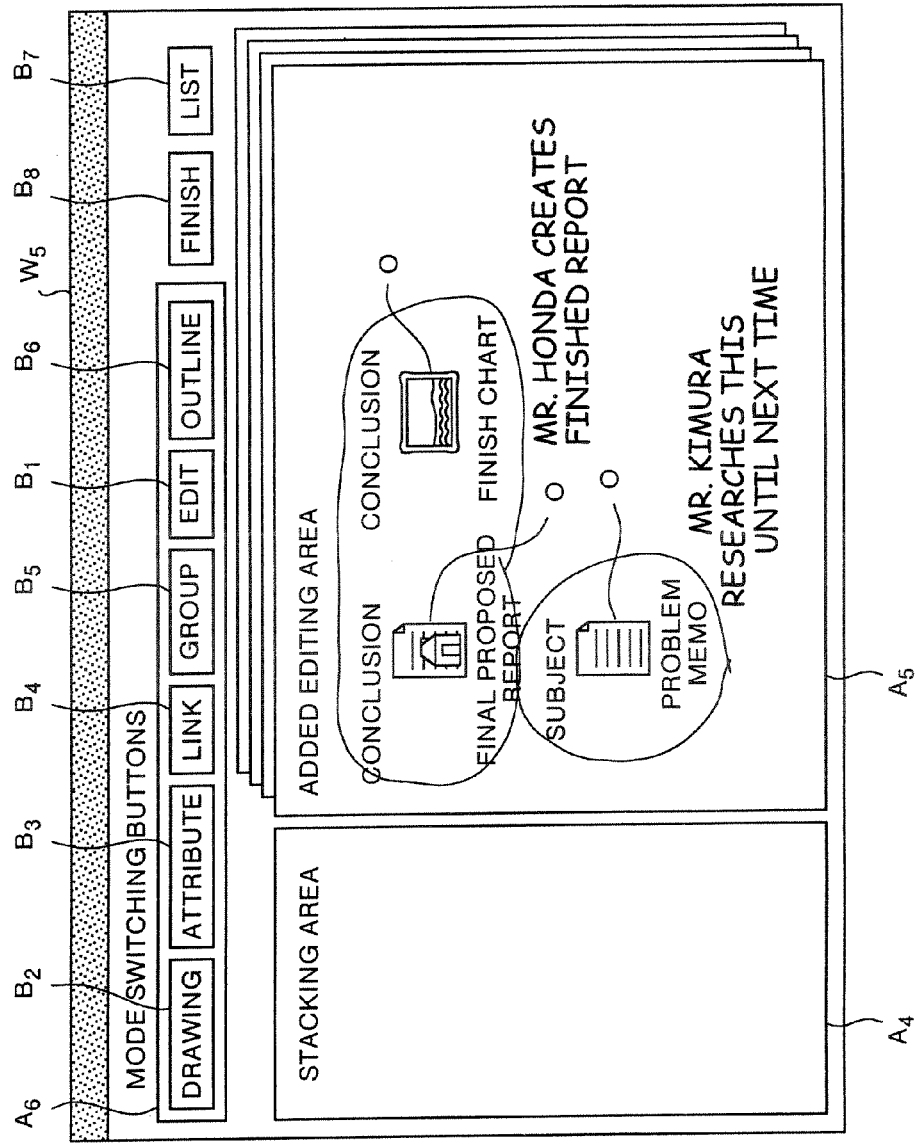

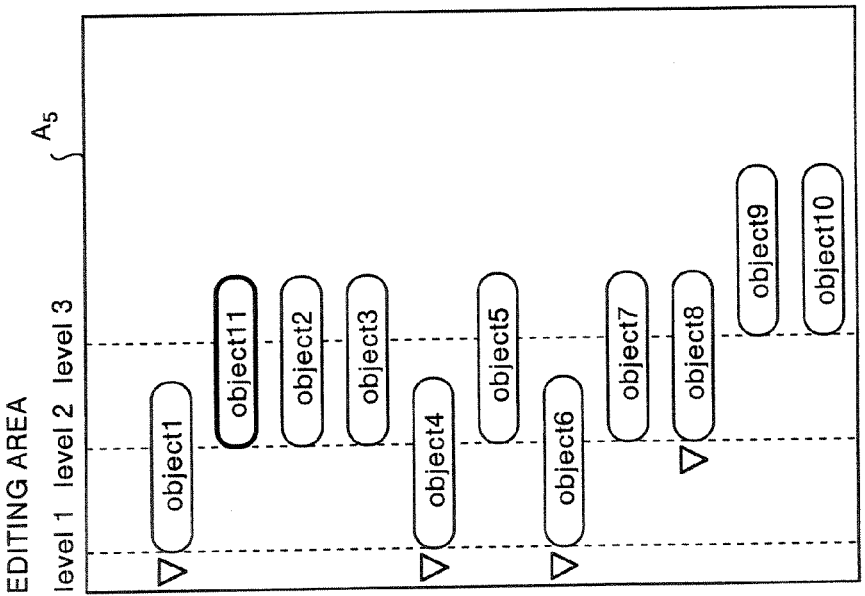
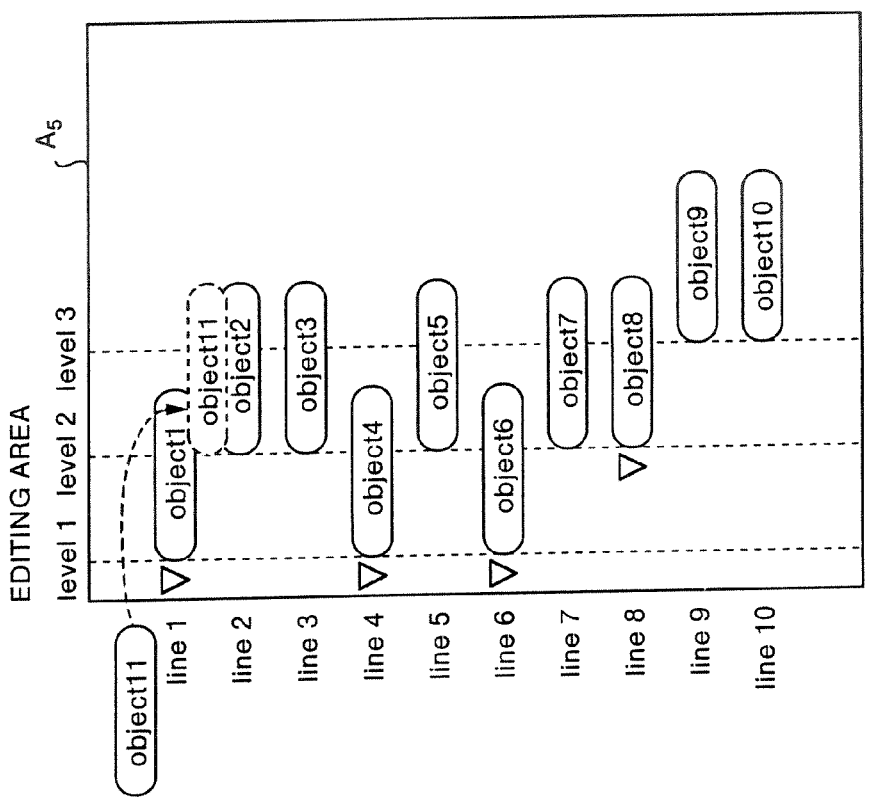

CONFERENCE SUPPORT APPARATUS, INFORMATION PROCESSOR, TELECONFERENCE SYSTEM AND COMPUTER PRODUCT

BACKGROUND OF THE INVENTION

1) Field of the Invention

The present invention relates to a conference support apparatus, computer-readable program and teleconference system. More particular, it relates to a conference support apparatus, computer-readable program and teleconference system that electronically supports a knowledge creative conference.

2) Description of the Related Art

FIG. 35 is a systematic arrangement diagram which briefly shows an example of the conventional teleconference system 100 (see Patent publication 1, Japanese Patent Application Laid-Open No. HEI06-77958, for example). The teleconference system 100 comprises a plurality of PCs (Personal Computers) 101, 102, 103 connected to each other via a network 104 as shown in FIG. 35. Each PC 101 to 103 includes a PC body 105 that contains a display and so forth, a keyboard/mouse 106, a sharing manager 107, and an application 108. The sharing manager 107 manages input/output of the application 108, peripheral devices and a disk drive (not shown) connected to the PC body 105, and communications between the PCs 101 to 103. The application 108 includes an editor for a word processor, spreadsheet software, drawing software and teleconference software, for example. FIG. 35 shows a teleconference that is held using the application 108.

An example of the teleconference using the teleconference system 100 shown in FIG. 35 is explained below. The PCs 101 to 103 are to be started up by the users prior to the beginning of the conference. The sharing manager 107 in the first started PC (for example, PC 101) among the PCs 101 to 103 is determined to manage proceeding of the conference. The sharing manager 107 in the PC 101 fetches a desired application 108 based on an instruction from the user and sends the application 108 to other PCs 102, 103. In such the condition, the user can perform various operations while viewing contents displayed on the display of the PC 101 based on the application 108 fetched in the sharing manager 107 of the PC 101.

The operational result from the user is sent via the sharing manager 107 in the PC 101 to the sharing managers 107 in the other PCs 102, 103 to display it on the displays in the other PCs 102, 103 simultaneously. The operational result from the PC 102 or PC 103 is similarly sent to the sharing managers 107 in the other PCs.

Such the arrangement allows the users to proceed the teleconference while viewing the operational results executed in PCs 101 to 103 in real-time.

The sharing manager 107 in each PC can manage peripheral devices and a disk drive connected to the PC as described above. In addition, it can remove a difference in environments from other PCs using a corresponding table. Specifically, even if the same file is stored on different PCs with different names, the use of the corresponding table in the sharing manager 107 allows all PCs to be set in the same environment to perform the teleconference.

Such the teleconference allows information processed by executing the same application to be kept in the same executive condition on computers that attend the conference.

When partial failure of the network or break of the PC power occurs, however, the use of the PC may be interrupted during the proceeding of the teleconference. If the use of the PC is interrupted during the teleconference, the following problem is caused.

FIG. 36 is an explanatory diagram which shows the interrupted use of the PC during the teleconference (see Patent publication 1, for example). As shown in FIG. 36, a teleconference system 200 has a different arrangement in the number of PCs from the teleconference system 100 shown in FIG. 35 and comprises a plurality of PCs 201, 202, 203, 204 connected to each other via a network 205.

It is assumed that a user employs the PC 201 to enter "abc" and another user then employs the PC 202 to enter "xyz". Thereafter, the power of the PC 203 is failed. This case is explained below.

After the power failure of the PC 203, input/output information executed by the application in the other PC 201 or PC 202 can not reach to the PC 203. On the other hand, on a display 206 in the powered PC 204, "abcxyz" entered from the PC 201 and PC 202 is displayed. Similarly, on displays 206 in the PC 201 and PC 202, "abcxyz" is displayed.

Thereafter, if the power of the PC 203 is restored, the PC 203 returns to be able to attend the teleconference again. The PC 203 in this case, however, lacks "abcxyz" executed by the other PC 201 and PC 202 during its interruption. As a result, the interrupted PC 203 differs in the application executive condition from those in the PC 201, PC 202 and PC 204 that have continuously attended the conference from the beginning.

The user using the interrupted PC 203 is therefore difficult to proceed the conference together with the users of the PC 201, PC 202 and PC 204 that have continuously attended the conference from the beginning because of the lack of conference contents.

When the network or the PC fails, data may not be sent in a correct order during the proceeding of the teleconference. If data can not be sent in a correct order during the teleconference, the following problem is caused.

FIG. 37 is an explanatory diagram which shows the data not sent in a correct order during the teleconference (see Patent publication 1, for example). As shown in FIG. 37, a teleconference system 300 has a different arrangement in the number of PCs from the teleconference system 100 shown in FIG. 35 and comprises a plurality of PCs 301, 302 connected to each other via a network 303.

It is assumed that applications are executed in the PC 301 and PC 302 simultaneously. A user employs the PC 301 to enter "abc" and another user then employs the PC 302 to enter "xyz". In this case, on each display 304 in the PC 301 and PC 302, "abcxyz" is displayed as shown in FIG. 37.

If any failure occurs on the network 303 between the PC 301 and PC 302, data "a" through "x" may not be sent in a correct order. In such the case, it is difficult to proceed the teleconference smoothly.

In the conventional teleconference system that supports a conference electronically, a function is provided to distribute the information fed to the public space from individual conferees to terminal equipment at all conferees or a common screen visible from all conferees to share the information. Others functions are also provided to edit the shared information simultaneously by all conferees and express (display, for example) the result without any contradiction in real-time.

Installation of such the functions complicates programs required for configuring the system, spending massive computational resources, easily lowering an operational speed, reliability and fastness, and causing a problem that makes it difficult to provide a high-usability system.

In the conventional teleconference system that supports a conference electronically, it is also difficult to arrange relations among information provided from conferees during discussion.

SUMMARY OF THE INVENTION

It is an object of the present invention to provide a conference support apparatus, an information processor, a teleconference system and a computer product capable of simplifying the system without the need for synchronized processing at each of information processors used by conferees.

It is an another object of the present invention to provide a conference support apparatus, a information processor, a teleconference system and a computer product capable of extremely improving the efficiency of cooperative works performed by all conferees.

It is an another object of the present invention to provide a conference support apparatus, an information processor, a teleconference system and a computer product capable of extremely improving the usability of the system.

It is an another object of the present invention to provide a conference support apparatus, an information processor, a teleconference system and a computer product capable of arranging at site relations among information (objects) divergently generated/provided from each information processor and efficiently collecting and grasping information.

According to one aspect of the present invention, there is provided a conference support apparatus connected via a network to a plurality of information processors used by conferees, the apparatus comprising: a display device which is visible from conferees; a receiving device which receives information transmitted from the information processors; a control unit that display controls the display device; and an input device which feeds an operational instruction to the display control unit, the control unit including an area display unit that allows the display device to display an information sharing area for listing predetermined objects and an editing display area for displaying the objects listed in the information sharing area, an object listing unit that employs the information sharing area to display the objects according to the information received by the receiving device, a designated object moving unit that employs a desired location in the editing display area to display the object designated by the input device among the objects displayed in the information sharing area, and an object editing unit that edits the object displayed in the editing display area based on the operational instruction from the input device.

According to the aspect, the information sharing area, employed by all conferees for sharing the information (object) or personal knowledge transmitted via the information processors from conferees, and the editing display area, employed for editing a structure of the information (object) or shared knowledge, can be definitely distinguished from each other and displayed in a large display device commonly visible from all conferees. When the areas are displayed in the large display device and one of the objects displayed in the information sharing area is designated, the designated object is displayed at a desired location in the editing display area and can be edited through cooperative works by all conferees centering around a conference chairman. As a result, when the information provided from one conferee is updated, other conferees and the chairman can identify the update easily. In addition, the provided information is not directly displayed in the editing display area and accordingly synchronized processing is not required at each information processor. Therefore, it is possible to manage the conference without preventing the discussion from proceeding. It is also possible to definitely distinguish the function that intends to share knowledge and the function that edits the structure of the shared knowledge to simplify the system. This is effective to reduce the spending of computational resources and improve reliability and fastness.

According to another aspect of the present invention, there is provided a conference support apparatus connected via a network to information processors used by conferees, the apparatus comprising: a display device which is visible from conferees; an information receiving unit that receives information transmitted from the information processors; an area display unit that allows the display device to display an information sharing area for listing predetermined objects and an editing display area for displaying the objects listed in the information sharing area; an object listing unit that employs the information sharing area to display the objects according to the information received by the information receiving unit; an object designating unit that designates a predetermined object among the objects displayed in the information sharing area; a designated object moving unit that displays the object designated by the object designating unit at a desired location in the editing display area; and an object editing unit that edits the object displayed in the editing display area by the designated object moving unit.

According to still another aspect of the present invention, there is provided an information processor connected via a network to a conference support apparatus that supports a teleconference, the processor comprising: a transmission information determining unit that determines transmission of predetermined information to be processed; and an information transmitting unit that transmits the information to the conference support apparatus after the determination by the transmission information determining unit of the transmission of the information.

According to the aspects, independent of processing operations by other conferees and the conference chairman, predetermined information prepared by one conferee can be sent to the conference support apparatus and accordingly, it is possible to manage the conference without preventing the discussion from proceeding.

According to still another aspect of the present invention, there is provided a teleconference system, which comprises information processors used by conferees and a conference support apparatus shared by the conferees and connected via a network to the information processors, the information processors each including: a transmission information determining unit that determines transmission of predetermined information to be processed; and an information transmitting unit that transmits the information to the conference support apparatus after the determination by the transmission information determining unit of the transmission of the information, the conference support apparatus including: a display device which is visible from conferees; an information receiving unit that receives information transmitted from the information processors; an area display unit that allows the display device to display an information sharing area for listing predetermined objects and an editing display area for displaying the objects listed in the information sharing area; an object listing unit that employs the information sharing area to display the objects according to the information received by the information receiving unit; an object designating unit that designates a predetermined object among the objects displayed in the information sharing area; a designated object moving unit that displays the object designated by the object designating unit at a desired location in the editing display area; and an object editing unit that edits the object displayed in the editing display area by the designated object moving unit.

According to still another aspect of the present invention, there is provided a computer product having a computer-readable program, which subjects a computer to execute operational controls on a conference support apparatus connected via a network to information processors used by conferees, the product comprising: an information receiving function which receives information transmitted from the information processors; an area display function which allows the display device to display an information sharing area for listing predetermined objects and an editing display area for displaying the objects listed in the information sharing area; an object listing function which employs the information sharing area to display the objects according to the information received by the information receiving unit; an object designating function which designates a predetermined object among the objects displayed in the information sharing area; a designated object moving function which displays the object designated by the object designating function at a desired location in the editing display area; and an object editing function which edits the object displayed in the editing display area by the designated object moving function.

These and other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 18 is a front view which shows an example of a table chart view, FIG. 21 is an explanatory diagram which shows an example of a list of retrieved objects, FIG. 22 is a front view which shows an example of a display screen on a display, which explains a manner of displaying attribute-given objects, FIGS. 27A and 27B show movement of an object from the "stacking area" to the "editing area"

DETAILED DESCRIPTION

Preferred embodiments of a conference support apparatus, an information processor, a teleconference system and a computer product according to the present invention will be explained below in detail with reference to the drawings.

An embodiment of the invention is explained based on FIGS. 1 to 34. This embodiment is applied to a teleconference system that electronically supports a conference, particularly, a knowledge creative conference.

(Outline of the Invention)

Generally, in a knowledge creative conference that assumes cooperative works, it can be considered to circulate the following processes to well consider knowledge. First, an organizer or a chairman brings a problem (subject) as a common recognition. Then, each conferee introduces own personal data (an idea or objective data at hand), of which solution proposal is shared by all members. They proceed a discussion based on the shared data and gradually well consider a new proposal and conclusion. The conferees bring the cooperatively well-considered conclusion (data) back per own charge. The brought back data is additionally edited and will be brought to the next conference, where it is further well considered via similar processes to create knowledge. This scene includes a process for sharing the personal knowledge and a process for editing and structuring the shared knowledge.

In the conventional teleconference system, the process for sharing the personal knowledge and the process for editing and structuring the shared knowledge are performed at the same time. This system allows a screen to be shared visually and operationally to freely locate and edit various objects (texts, graphics, images, etc.) thereon and allows all conferees to make and edit objects on the screen simultaneously. In such the conventional teleconference system that performs the process for sharing the personal knowledge and the process for editing and structuring the shared knowledge at the same time, however, a lack occurred in contents of the teleconference may disturb the conference. This is a problem.

Therefore, the teleconference system according to this embodiment definitely distinguishes the function that intends to share knowledge from the function that edits the structure of the shared knowledge to manage the conference without disturbing the discussion.

(Systematic Arrangement Diagram of the Teleconference System)

Figure 1:
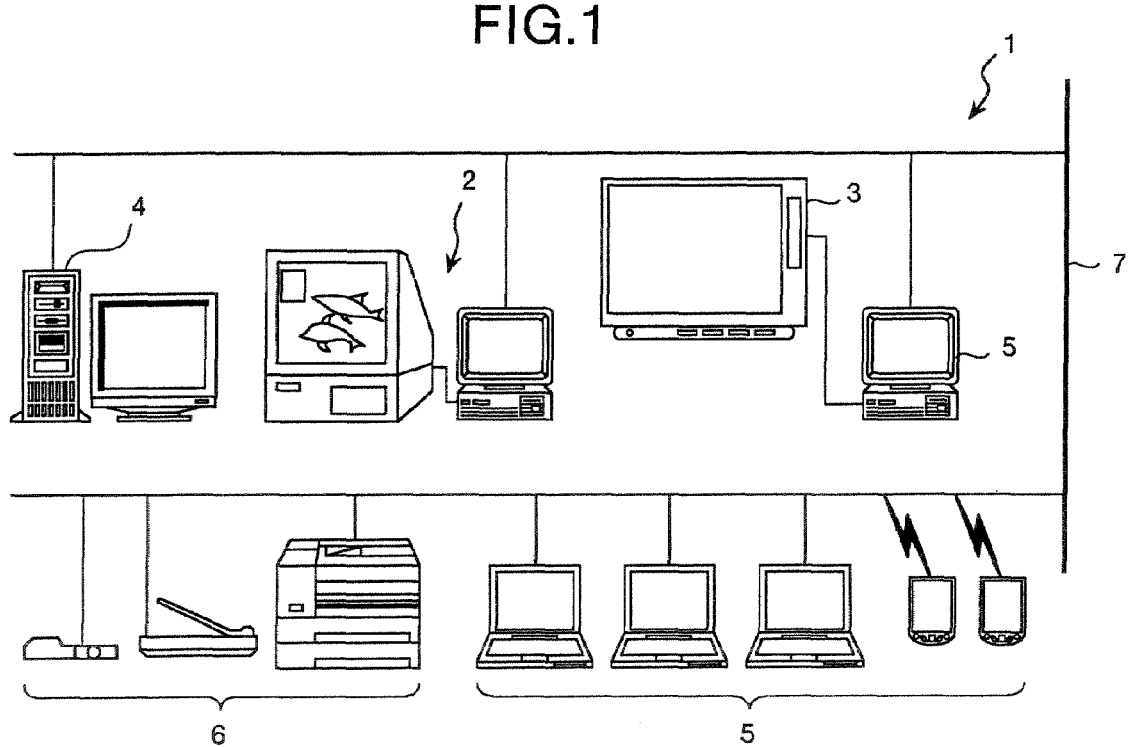
FIG. 1 is a systematic arrangement diagram which schematically shows a teleconference system according to an embodiment of the present invention.

FIG. 1 is a systematic arrangement diagram which schematically shows a teleconference system 1 according to the present invention. As shown in FIG. 1, the teleconference system 1 comprises various machines located in a conference room. More specifically, the teleconference system 1 comprises an information input/output device (shared terminal equipment) 2, a document managing server 4, various information processors (terminal equipment for conferees) 5 and input/output devices such as digital cameras, scanners and printers, which are connected to each other via a network 7, for example, LAN (Local Area Network). An electronic white board 3 is connected to one of the information processors 5.

(Arrangement of the Information Input/Output Device (Shared Terminal Equipment) in FIG. 1)

Figure 2:
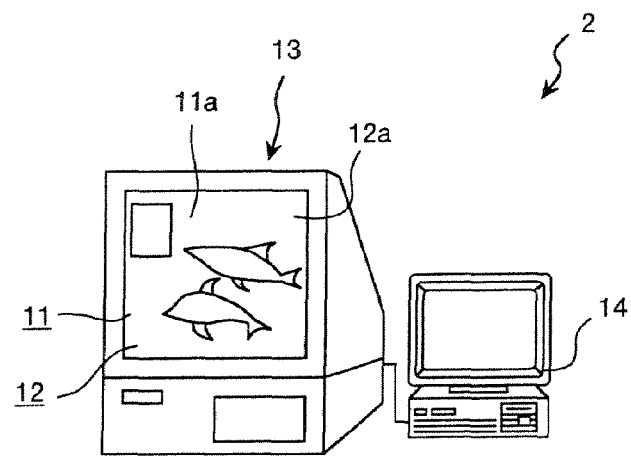
FIG. 2 is a systematic arrangement diagram which briefly shows an information input/output device.

The information input/output device 2 contained in the teleconference system 1 in FIG. 1 is explained. FIG. 2 is a systematic arrangement diagram which briefly shows the information input/output device 2. As shown in FIG. 2, the information input/output device 2 serves as a conference support apparatus and mainly comprises an information input/output section 13 and an information processor 14 such as a personal computer. The section 13 includes a display 11 that serves as a display device of a rear projection type and a coordinate detector 12 that detects a coordinate position within a coordinate detecting area 12a indicated by an indication unit such as a finger tip and a pen.

The display 11 and the coordinate detector 12 are integrated and the coordinate detector 12 is located at the display screen side of the display 11. The coordinate detecting area 12a of the coordinate detector 12 is located on the display screen 11a of the display 11. The information input/output section 13 configures the display screen and a writing surface of the information input/output device 2. As the display 1, one of a large, for example, 80-inch screen type, available as an electronic blackboard, is employed. A video input terminal and speakers, not shown, are also provided to the display 11 to be connected to various information machines and AV machines such as a video player, a laser disk player, a DVD player and a video camera to utilize the display 11 as a large screen monitor.

The coordinate detector 12 has a coordinate detecting area 12a using a film of radial or sector beams projected from at least two light sources (not shown). When an indication unit that is an indication member such as a finger tip and a pen is inserted into the coordinate detecting area 12a, the beams in the coordinate detecting area 12a can be blocked. This indicated position can be detected using a triangulation method based on a photo-detected position by photo-detectors (not shown) such as CCDs (Charge Coupled Devices). In this case, a coordinate detector of a light-block type capable of entering texts and the like is applied (Japanese Patent Application Laid-Open No. 2000-105671). The coordinate detector of such the light-block type is excellent in visibility because it has no physical surface such as a coordinate input surface (touch panel surface) and requires no special materials and mechanisms.

The coordinate detector 12 may include other applicable types than the light-block type: a light-reflective type that reflects the beams in the coordinate detecting area to detect the indicated position when the indication unit is inserted; a camera imaging type that detects the indicated position by imaging the indication unit within the coordinate detecting area; a LED array type; a ultrasound-wave elastic-wave type, an analogue capacitive coupling type; and a pressure sensitive type, needless to say.

Figure 3:
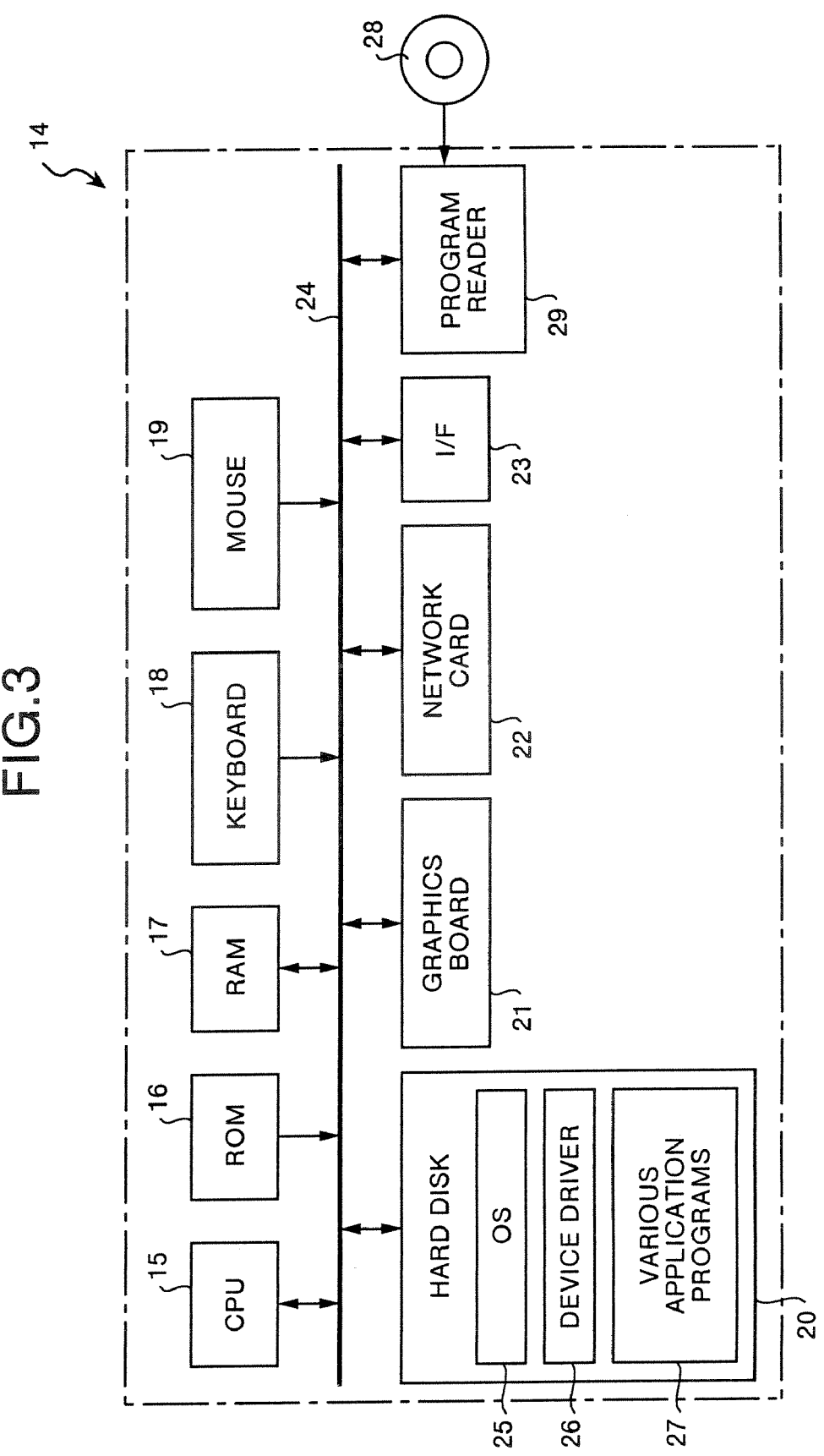
FIG. 3 is a block diagram which shows electrical connections among sections contained in a computer.

The information processor 14 is explained next. FIG. 3 is a block diagram which shows electrical connections among sections contained in the information processor 14. As shown in FIG. 3, the information processor 14 has a computer arrangement including a CPU (Central Processing Unit) 15 that controls the whole system; a ROM (Read Only Memory) 16 that stores a start-up program and so forth; and a RAM (Random Access Memory) 17 that is employed as a work area for the CPU 15. The information processor 14 is provided with a keyboard 18 for entering texts, numerals and various instructions; a mouse 19 for moving a cursor and selecting a range; a hard disk 20 employed as a storage section; a graphics board 21 connected to the display 11 for controlling display of images on the display 11; a network card 22 for making a connection to the network 7; an interface (I/F) 23 for making connections to various peripheral devices; and a bus 24 for making connections to the sections.

The hard disk 20 holds an operating system (OS) 25, a device driver 26 for operating the coordinate detector 12 on the information processor 14 and various application programs 27 such as drawing software, word processor software, spreadsheet software and presentation software. The various application programs 27 also include a master client application later described. The OS 25 in the information processor 14 comprises a GUI (Graphical User Interface)-based operating system such as Windows® available from Microsoft Corporation and Macintosh® from Apple Computer, Inc.

To read program codes from a storage medium 28, such as a flexible disk, a hard disk, an optical disk (CD-ROM, CD-R, CD-RW, DVD-ROM, DVD-RAM), a magneto-optical disk (MO) and a memory card, which holds various program codes (control programs) such as the OS 25, the device driver 26 and the various application programs 27, a program reader 29 such as a flexible disk driver, a CD-ROM driver and a MO driver is mounted on the information processor 14.

The various application programs 27 are executed by the CPU 15 under control of the OS 25 that is activated when the power of the information processor 14 is turned on. For example, when the keyboard 18 or the mouse 19 is employed to perform a predetermined operation to activate the drawing software, a predetermined image is displayed in the display 11 via the graphics board 21 based on the drawing software. The device driver 26 is also activated together with the OS 25 and allows the coordinate detector 12 to enter data. After the drawing software is activated, the user can insert the indication unit into the coordinate detecting area 12a of the coordinate detector 12 to draw texts and graphics. In this case, the coordinate information is fed into the information processor 14 as image data based on the description by the indication unit and it is displayed as a superimposed image on the image previously displayed on the display 11. In more details, the CPU 15 in the information processor 14 creates drawing information for drawing lines and texts based on the input image data and writes the information in a video memory (not shown) provided in the graphic board 21, matching with the positional coordinates based on the input coordinate information. When the graphic board 21 sends the drawing information written in the video memory as image signals to the display 11, the same texts as that written by the user can be displayed on the display 11.

The information processor 14 identifies the coordinate detector 12 as a pointing device such as the mouse 19. When a point is indicated in the coordinate detecting area 12a of the coordinate detector 12, its coordinates are sent to the information processor 14 as a mouse event. As for input operations in the coordinate detector 12, "touch" corresponds to an event of "mouse button down", "release" to "mouse button up", and "movement during touch" to "mouse button down and move". It will be explained below using these mouse events.

(Arrangement of the Information Processor (Conferee's Terminal Equipment) in FIG. 1)

The information processor 5 is explained subsequently. Portable information terminal equipment, which is employed by each conferee to look, enter and edit information, such as a desktop personal computer, a note-type personal computer and a PDA (Personal Digital Assistants), is applicable as the information processor 5. A note-type personal computer is exemplified below to explain the information processor 5.

Figure 4:
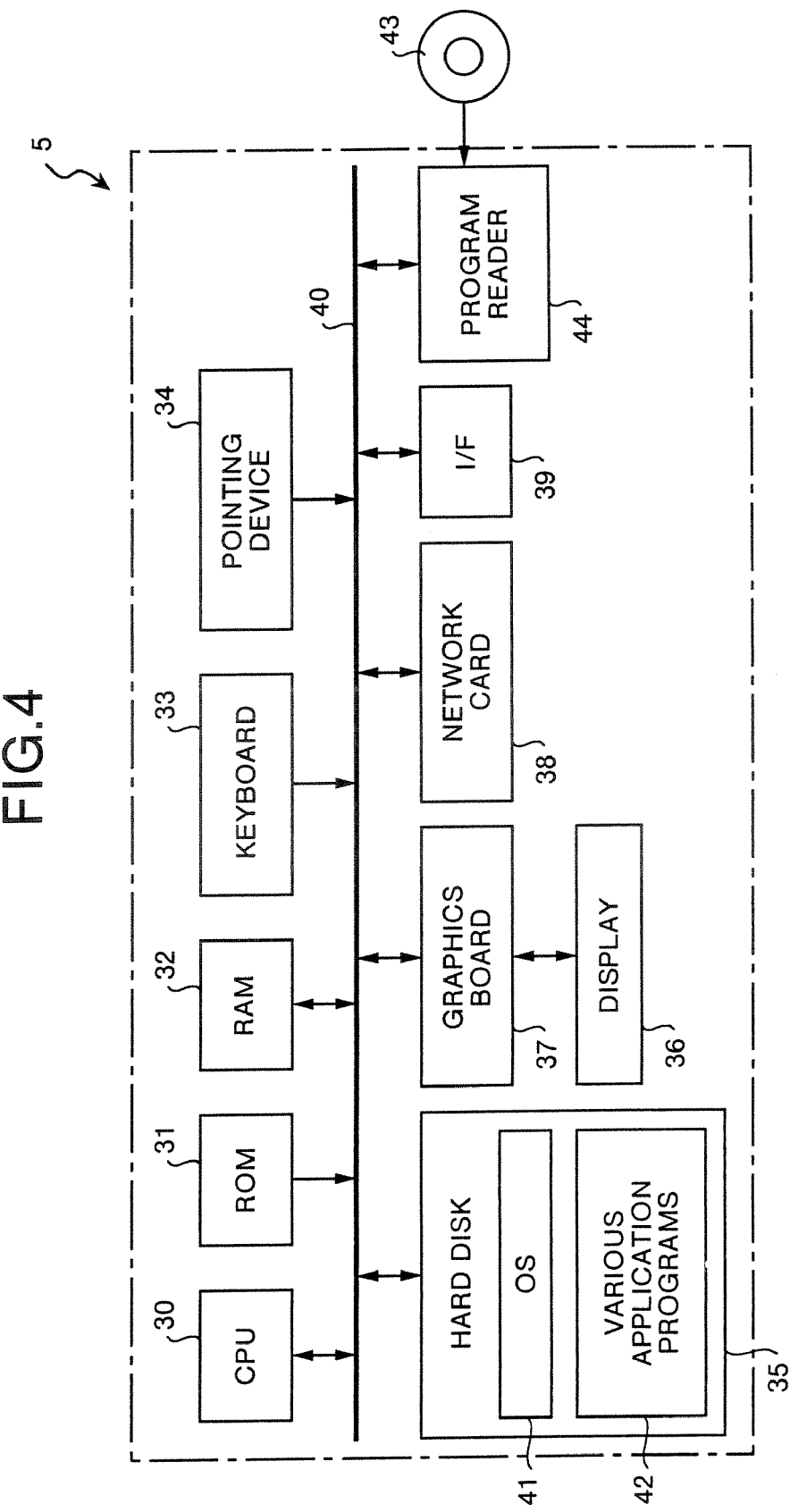
FIG. 4 is a block diagram which shows electrical connections among sections contained in an information processor.

FIG. 4 is a block diagram which shows electrical connections among sections contained in the information processor 5. As shown in FIG. 4, the information processor 5 has a computer arrangement including a CPU 30 that controls the whole system; a ROM 31 that stores a start-up program and so forth; and a RAM 32 that is employed as a work area for the CPU 30. The information processor 5 is provided with a keyboard 33 for entering texts, numerals and various instructions; a pointing device 34, such as a mouse, a touch pad and a track ball, for moving a cursor and selecting a range; a hard disk 35; a graphics board 37 connected to a display 36 such as a LCD (Liquid Crystal Display) for controlling display of images on the display 36; a network card 38 for making a connection to the network 7; an interface (I/F) 39 for making connections to various peripheral devices; and a bus 40 for making connections to the sections.

The hard disk 35 holds an operating system (OS) 41 and various application programs 42 such as drawing software, word processor software, spreadsheet software and presentation software. The various application programs 42 also include a slave client application later described. The OS 41 in the information processor 5 comprises a GUI-based operating system such as Windows® available from Microsoft Corporation and Macintosh® from Apple Computer, Inc.

To read program codes from a storage medium 43, such as a flexible disk, a hard disk, an optical disk (CD-ROM, CD-R, CD-RW, DVD-ROM, DVD-RAM), a magneto-optical disk (MO) and a memory card, which holds various program codes (control programs) including the OS 41 and the various application programs 42, a program reader 44 such as a flexible disk driver, a CD-ROM driver and a MO driver is mounted on the information processor 5.

The electronic white board 3 is a SmartBoard® (white board type) available from SmartBoard, for example. The SmartBoard® (white board type) includes a resistive film adhered on a surface to sense pressure from a pen during writing. A white board with the same principle is disclosed in Japanese Patent Application Laid-Open No. 5-241717 and accordingly the arrangement and operation of SmartBoard® is omitted to explain herein. According to the SmartBoard® (white board type), when a marker is employed to make a drawing in the same manner as drawing on a general white board, the traces can be fetched as time series data into the information processor 5 and processed digitally. Such the electronic white boards have been produced practically in various types, including known other types such as mimio® from US Virtual Inc., eBeam® from Electronics For Imaging Inc., and SoftBoard® from SoftBoard.

The document managing server 4 is provided with a computer arrangement controller containing a CPU, a ROM and a RAM (not shown), and a storage device (not shown). As described later in detail, it manages "conference documents" created by the information input/output device 2 to be accumulated in the storage device and provides a service to allow the "conference document" created by the information input/output device 2 to be retrieved from the storage device.

(Functional Arrangement Diagram of a Teleconference System)

Figure 5:
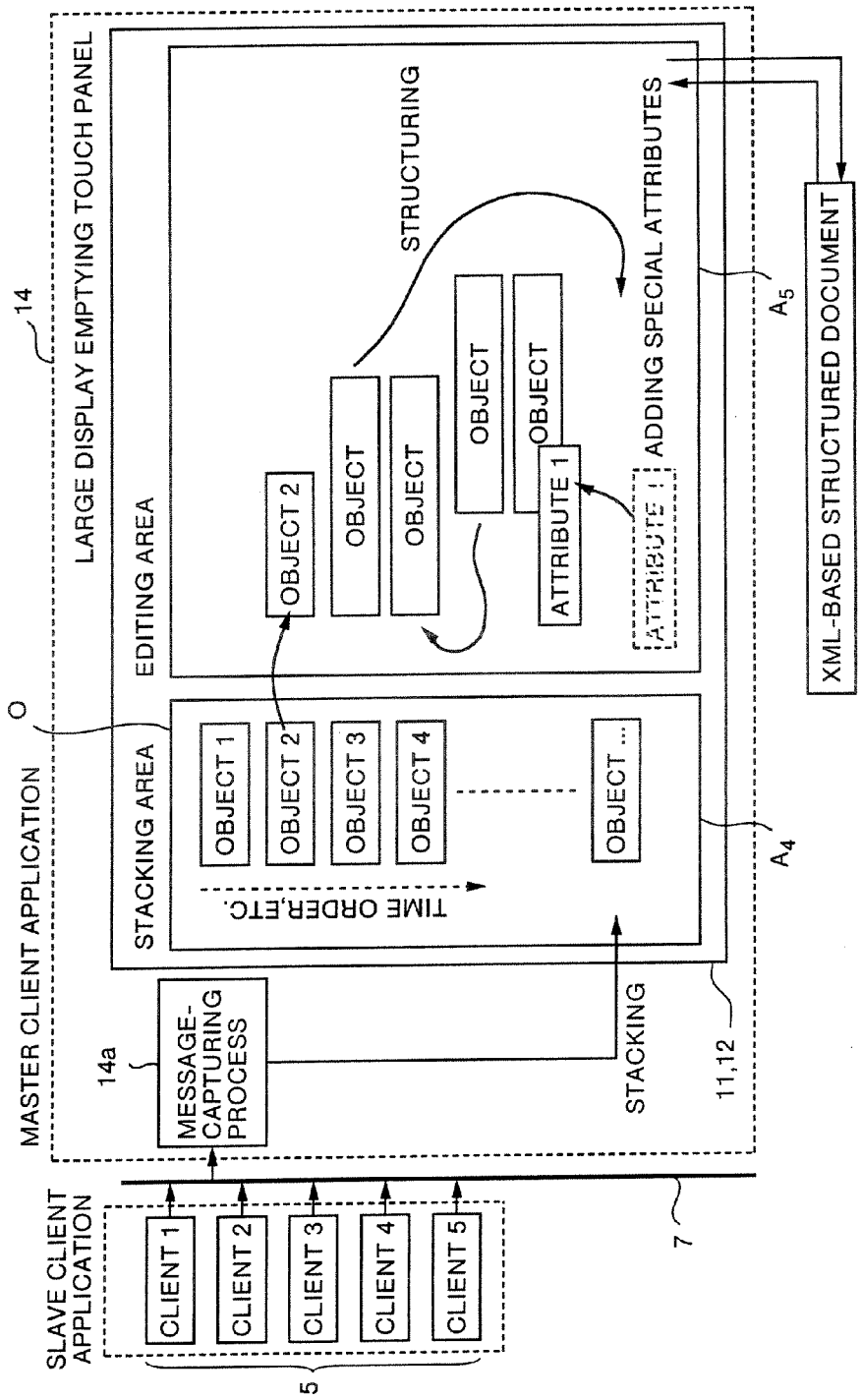
FIG. 5 is a functional arrangement diagram of a teleconference system according to the same embodiment.

FIG. 5 is a functional arrangement diagram of a teleconference system according to the present embodiment. In FIG. 5, Client 1, . . . , Client 5 are each conferee's terminal equipment and correspond to the various information processors (conferee's terminal equipment) 5 in FIG. 1. A slave client application runs on each conferee's terminal equipment. In FIG. 5, other sections than Client 1, . . . , Client 5 are functions provided from a master client application and operate on the information processor 14 (shared terminal equipment) equipped with the display 11.

The information processor 5 that runs the slave client application thereon is referred to as a "slave client" and the information processor 14 that runs the master client application thereon as a "master client".

The slave client 5 runs an object transmission process. When the pointing device at the conferee's terminal equipment is employed to indicate an object by drawing through an operation of Drag & Drop, key input or stroke, the object transmission process transmits the object to the master client 14 via the network 7.

The master client 14 on the other hand runs a message receiving process 14a. The message receiving process 14a in the master client receives and stores various objects sent from the slave client 5.

The master client 14 displays the stored objects in a "stacking area" A4 defined in a predetermined region on the display 11.

The object displayed in the "stacking area" A4 can be moved/copied visually to an "editing area" A5 through an operation of Drag & Drop and the like using the pointing device connected to the shared terminal equipment operated by the master client 14. The object displayed in the "editing area" A5 is not the actual condition in the "stacking area" A4. Though, the object displayed in the "editing area" A5 is hereinafter expressed as an object for simplification of the explanation.

The object moved/copied into the "editing area" A5, like in the "stacking area" A4, is displayed on the display 11 to be visible from all conferees. This allows them to perform various processing of attributes, for example, adding, linking, grouping, editing, concluding and outlining (structuring) of attributes based on operations through the use of the mouse or keyboard connected to the shared terminal equipment.

(Explanation of an Event Processing in the Master Client)

Figure 6:
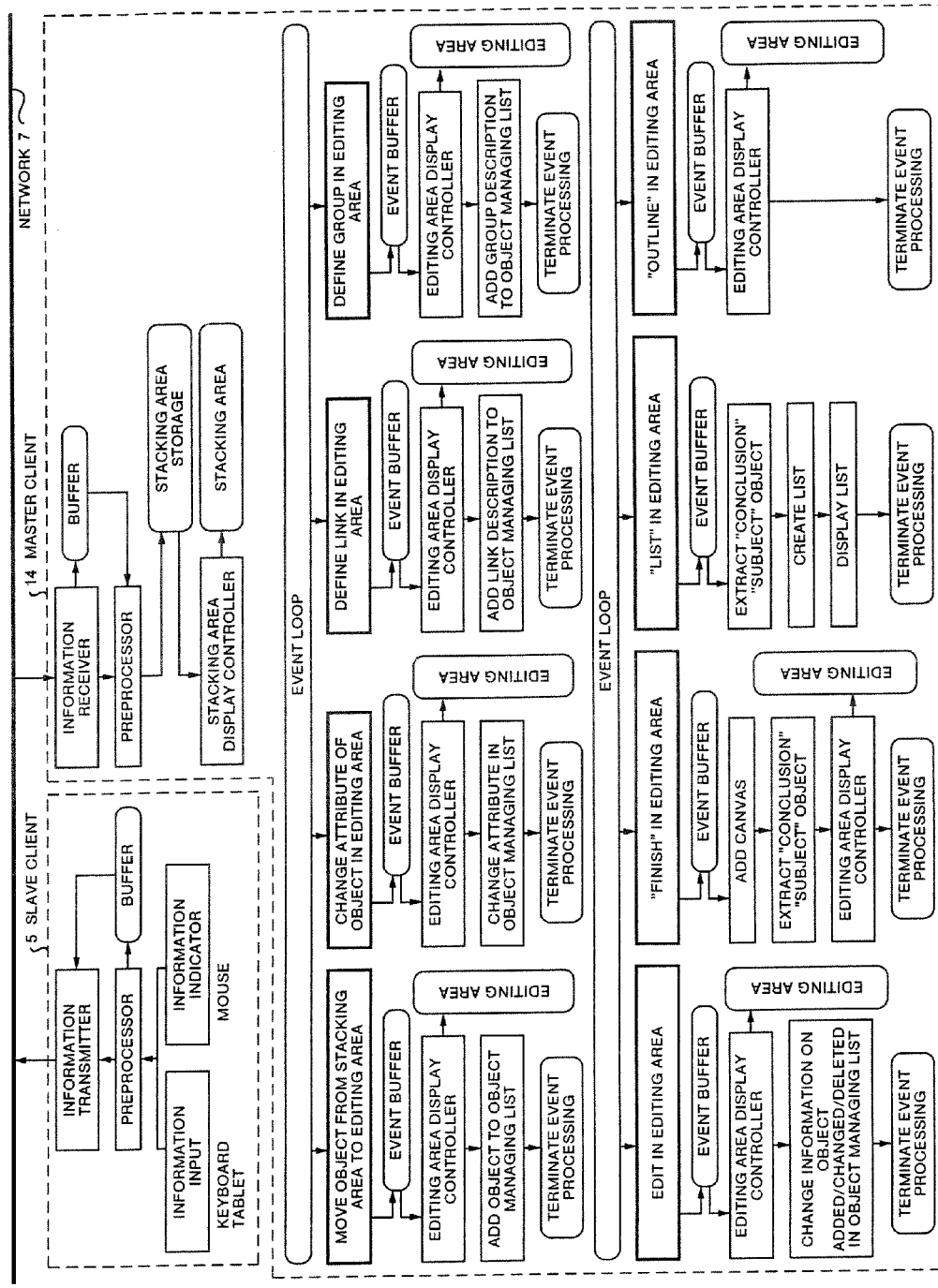
FIG. 6 is a functional diagram of a teleconference system according to the same embodiment.

FIG. 6 shows a functional diagram of the teleconference system according to the present embodiment. In the slave client 5, an object entered from an information input/output section (keyboard, tablet and the like) or indicated by an information indicator (mouse and the like) is stored in a buffer together with additional information such as predetermined attributes given at a preprocessor. The predetermined attributes include: (1) an object identifier; (2) an object type (text string, free stroke, file, etc.); (3) in the case of a file (a file name and created application); (4) a name of the operator (user identifier); and (5) time. The object identifier is an ID for identifying a target object and is automatically provided with unique symbols such as serial numbers.

A first example of information stored in the buffer is in the form of a file. In this case, the predetermined attribute is expressed with a file name and stored. For example, in the case of MS-Windows®, it is known that the last three texts in the file name or an extension can be employed to express the attribute for convenience. A second example of information stored in the buffer 54 is in the form of a bit string, which is newly created by expressing the predetermined attribute with a predetermined bit string and adding it as the header to the information body to be sent. A third example of information stored in the buffer 54 is in the form of a bit string, which defines a class having the information to be sent and attribute values thereof as members and expresses an object in the class.

The information transmitter transmits the information stored in the buffer to the master client 14 via the network 7.

In the master client 14, the information transmitted from the slave client 5 is received at the information receiver and stored in the buffer. The information stored in the buffer is preprocessed in the preprocessor. During the preprocessing, the predetermined attribute given at the time of transmission is extracted from the received information and read in a predetermined variable in the application. The preprocessed information is stored in the stacking area storage region together with the extracted attribute in a predetermined format. The information stored in the stacking area storage region is displayed in the "stacking area" A4 in a predetermined format by the stacking area display controller.

The master client 14 monitors several events and performs a predetermined processing based on a type of the occurred event. FIG. 6 shows a flow that explains processes required when an event occurs. Process flows are shown below the event loop in FIG. 6. If this program is configured with MS-Windows®, it is easy for a skilled person to program the configuration inside the event loop by combining various basic events such as a mouse event provided from the operating system, and accordingly it is not explained herein.

(1) An operation of Drag & Drop is performed to move an object from the "stacking area" A4 to the "editing area" A5. This case is explained. When the object is dropped in the "editing area" A5, its coordinates and the attribute information are stored in the buffer. The editing area display controller reads out the information stored in the event buffer and displays the object with a predetermined expression at a predetermined location in the "editing area" A5. The predetermined expression includes a text string, stroke or file icon corresponding to the object type. If the situation of the object in the "editing area" A5 is changed, that is, in this case, an object is added into the "editing area" A5, the fact is described in an object managing list (see FIG. 32) and the event process is terminated.

(2) An operation is performed to change the attribute of the object in the "editing area" A5. This case is explained. In this case, the attribute information of the corresponding object is read out of the object managing list and stored in the event buffer. The contents in the event buffer are converted into a predetermined GUI such as a pull-down menu and displayed in the "editing area" A5 by the editing area display controller. The user can change a desired attribute in the event buffer via GUI and write the attribute value in the event buffer back into an item in the object managing list of the corresponding object. It further changes the display condition of the target object in the "editing area" A5 and terminates the event processing.

(3) An operation is performed to define a link between objects in the "editing area" A5. This case is explained. In this case, link information of the corresponding object is read out of the object managing list and stored in the event buffer. The link information in the event buffer is changed as indicated and written back into an item in the object managing list of the corresponding object. The display condition of the target object in the "editing area" A5 is changed based on the link condition and the event processing is terminated.

(4) An operation is performed to define a group of objects in the "editing area" A5. This case is explained. In this case, group information of the corresponding object is read out of the object managing list and stored in the event buffer. The group information in the event buffer is changed as indicated and written back into an item in the object managing list of the corresponding object. The display condition of the target object in the "editing area" A5 is changed based on the group condition and the event is terminated.

(5) An operation is performed to edit the object in the "editing area" A5. This case is explained. In this case, information on the operation (adding, changing and deleting) to the object is stored in the event buffer. The editing area display controller reads out the information stored in the vent buffer and changes the display of the object in the "editing area" A5. It also changes the information on the object added/changed/deleted in the object managing list.

(6) An operation of concluding is performed in the "editing area" A5. This case is explained. In this case, a new canvas is added to the object managing list. Then, information on the object having a specific attribute ("conclusion", "subject") is read out from the object managing list and stored in the event buffer. Based on the information stored in the event buffer, the editing area display controller displays it in a predetermined format in the "editing area" A5.

(7) An operation of listing is performed in the "editing area" A5. This case is explained. In this case, an object O having a specific attribute (attributes of "purpose", "conclusion", "subject") is read out from the object managing list and stored in the event buffer. Then, a list is created to display the list.

(8) An operation of outlining is performed in the "editing area" A5. This case is explained. In this case, the editing area display controller switches the display in the "editing area" A5 to display a new page. Then, an operation of editing is performed when the event of editing occurs.

(Explanation of Operations in the Slave Client)

The operation of the information processor 5 is explained first. Various program codes (control programs) stored in the hard disk 35 in the information processor 5 or various program codes (control programs) stored in the storage medium 43 are written into the RAM 32 when the power to the information processor 5 is turned on. Thus, the information processor 5 operates based on the program codes (control programs). The operation controlled by the CPU 30 based on the slave client application is explained. The slave client application is a characteristic function provided to the information processor 5 of the present embodiment and contained in the various application programs 42. The information processor 5 that runs the slave client application thereon is referred to as the slave client.

Figure 7:
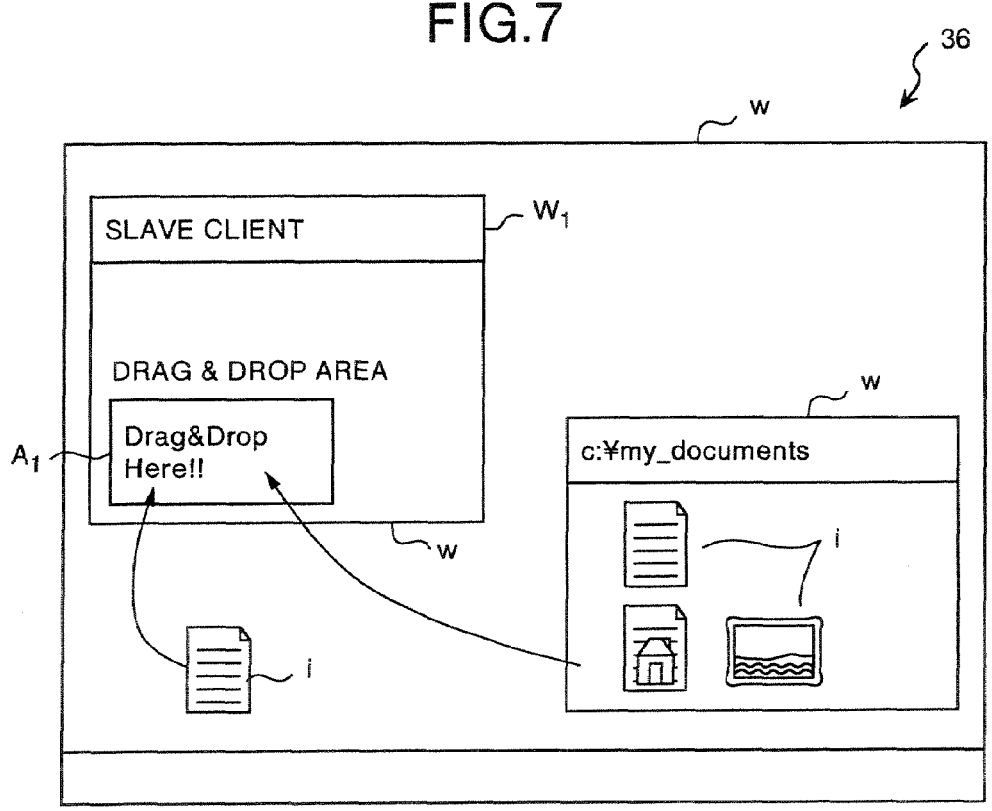
FIG. 7 is a front view which shows an example of a display screen on a display based on a slave client application.

FIG. 7 is a front view which shows an example of a display screen on the display 36 based on the slave client application. The OS 41 in the information processor 5 is the GUI-based operating system as described earlier and displays a window w in the display screen on the display 36 as shown in FIG. 7. This operating system has a function that lists files accumulated in the information processor 5, as well as files accumulated in other information processors 5 employed by other conferees, in the window w in the form of an icon i. The files accumulated in the information processor 5 and the files accumulated in other information processors 5 employed by other conferees include files created by the various application programs 42 such as drawing software, word processor software, spreadsheet software and presentation software, as well as files created via the input/output device 6, such as a digital camera and a scanner, and the electronic white board 3. When the slave client application is activated, a window W1 for the slave client application is displayed in the display screen on the display 36 as shown in FIG. 7. A "Drag and Drop area" A1 is defined in the window W1.

The conferee employs the pointing device 34 of the information processor 5, such as a mouse and a touch pad, to indicate the icon i displayed on the display 36, move it to the "Drag and Drop area" Al in the window W1 and release (drop) the indication given to the icon i. This is the so-called Drag and Drop operation. This operation notices the slave client application that the dragged and dropped file is a target to be processed.

The icon i is not limited to a file icon. For example, it may be information temporarily stored in the RAM 32 or information (a text strand, an image, for example) copied to the clipboard. It may also be a pointer to a file, that is, an information unit named "Short cut" in Windows® from Microsoft Corporation and "Alias" in Macintosh® from Apple Computer, Inc. A pointer may be employed as a URL (Uniform Resource Locator). The information to be processed is hereinafter referred to as an "object" simply for convenience of explanation.

Figure 8:
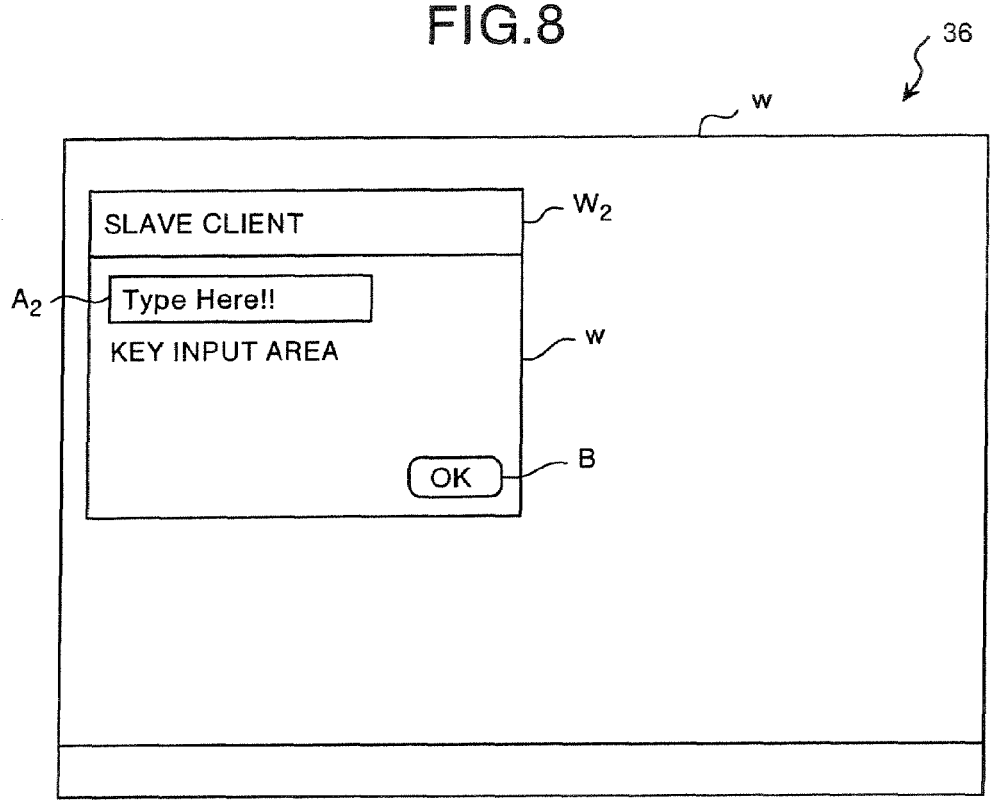
FIG. 8 is a front view which shows another example of a display screen on a display based on a slave client application.

FIG. 8 is a front view which shows another example of a display screen on the display 36 based on the slave client application. As shown in FIG. 8, when the slave client application is activated, a window W2 for the slave client application is displayed in the display screen on the display 36. A "Key input area" A2 is defined in the window W2.

The conferee employs the pointing device 34 of the information processor 5, such as a mouse and a touch pad, to move the pointer within the "Key input area" A2 displayed on the display 36. The conferee press keys on the keyboard 33 to enter predetermined texts (a text string) and then strikes a return key prepared on the keyboard 33. This operation indicates the slave client application that the entered text string is a target to be processed. In stead of entering the rerun key, an "OK" button displayed in the window W2 may be indicated from the pointing device 34 of the information processor 5, such as a mouse and a touch pad, to notice the slave client application that the entered text string is a target to be processed.

Figure 9:
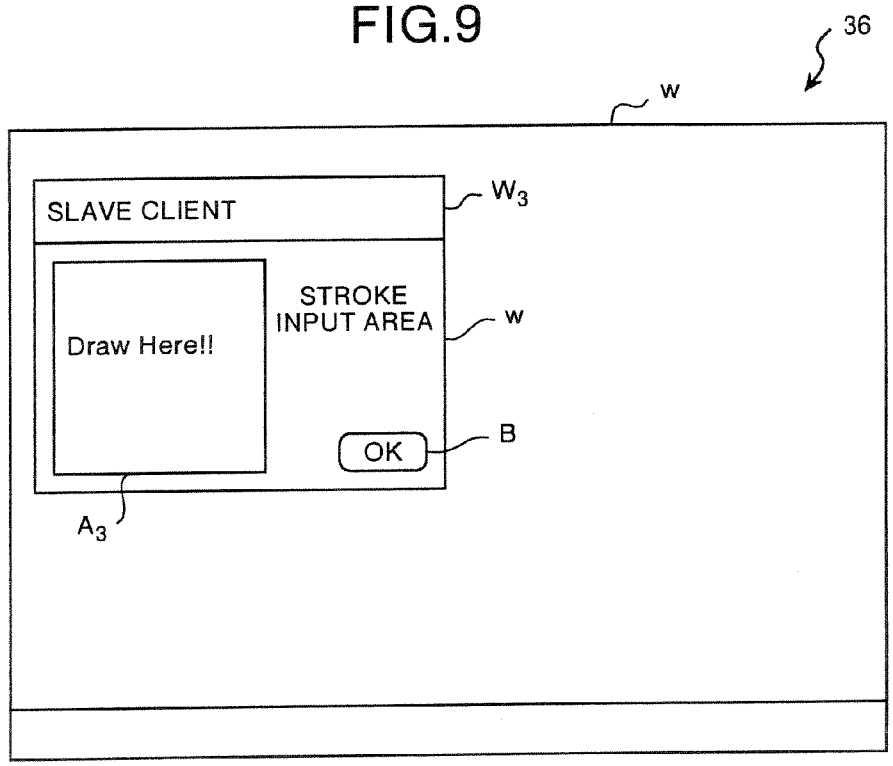
FIG. 9 is a front view which shows still another example of a display screen on a display based on a slave client application.

FIG. 9 is a front view which shows still another example of a display screen on the display 36 based on the slave client application. As shown in FIG. 9, when the slave client application is activated, a window W3 for the slave client application is displayed in the display screen on the display 36. A "Stroke input area" A3 is defined in the window W3.

The conferee employs the pointing device 34 of the information processor 5, such as a mouse and a touch pad, to move the pointer within the "Stroke input area" A3 displayed on the display 36 to create a drawing with simple strokes. Then, the pointing device 34 of the information processor 5, such as a mouse and a touch pad, is employed to indicate the "OK" button displayed in the window W2. This operation notices the slave client application that the entered drawing is a target to be processed. In stead of operating the "OK" button, a predetermined stroke that indicates the termination of the drawing may be entered into the "Stroke input area" A3 to notice the slave client application that the entered drawing is a target to be processed.

Figure 10:
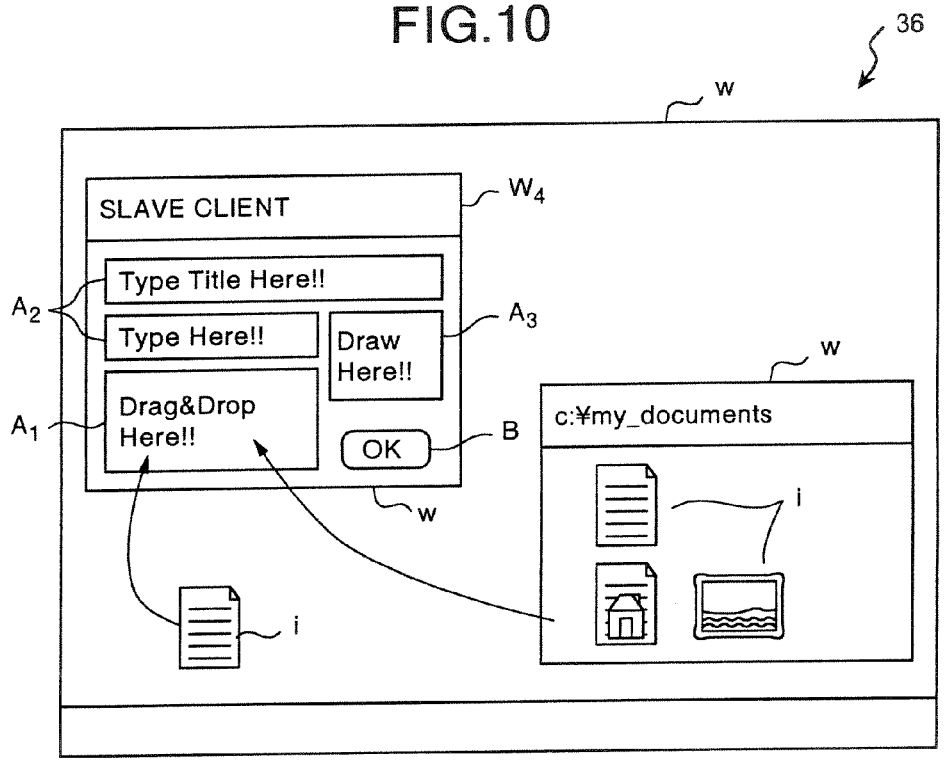
FIG. 10 is a front view which shows still another example of a display screen on a display based on a slave client application with integrated functions.

The functions described are integrated and installed in practice. FIG. 10 is a front view which shows still another example of a display screen on the display 36 based on the slave client application with integrated functions. As shown in FIG. 8, when the slave client application is activated, a window W4 for the slave client application is displayed in the display screen on the display 36. A "Drag and Drop area" A1, a "Key input area (Title input area)" A2 and a "Stroke input area" A3 are defined in the window W4.

Figure 11:
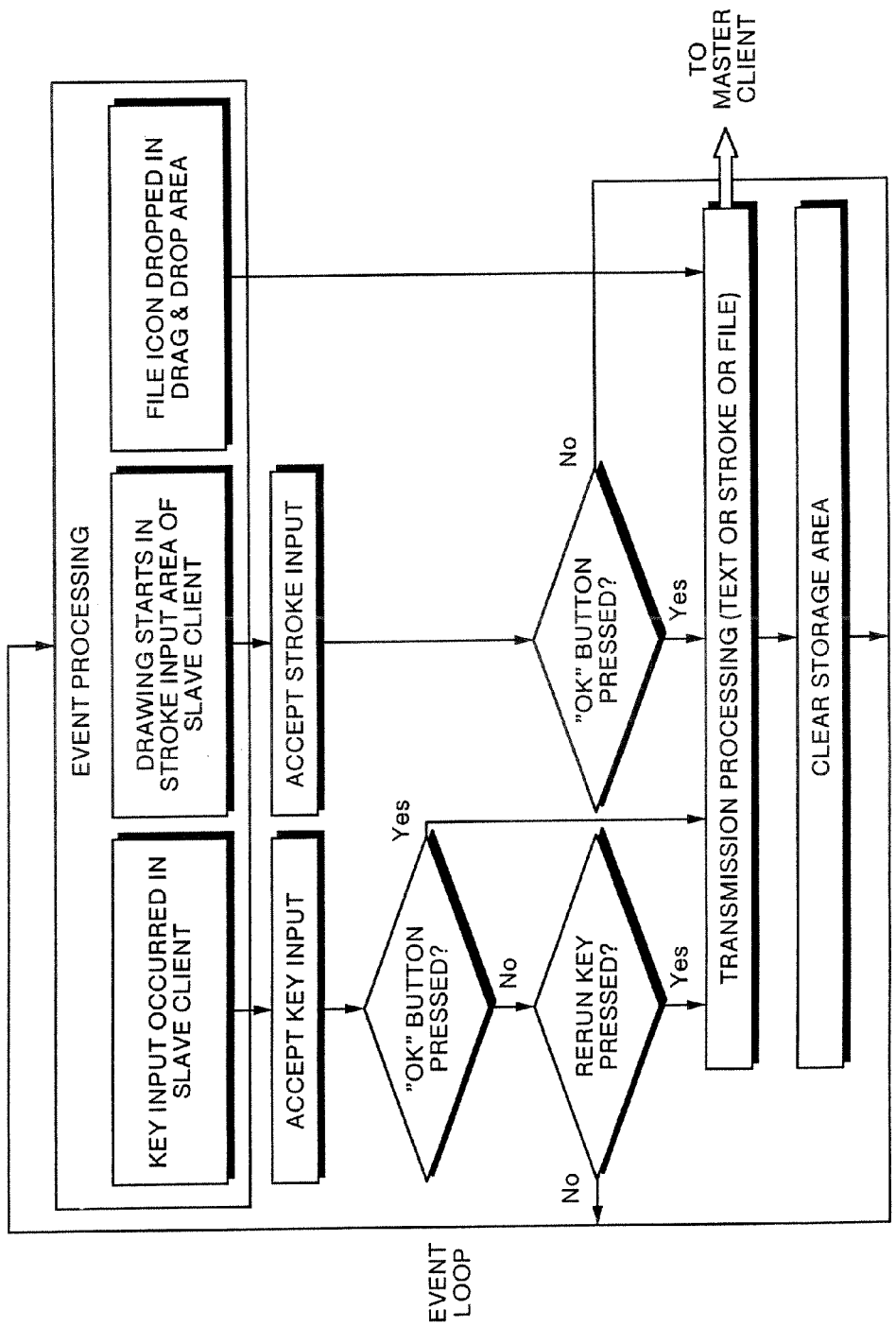
FIG. 11 is a flowchart which shows an operation in a slave client application with integrated functions.

An operational flow of the slave client application with integrated functions is shown in FIG. 11. An event loop in FIG. 11 is a portion for branching operations based on a difference in events caused on the slave client application. This portion corresponds, in the slave client application running on Windows® from Microsoft Corporation, to the function served by the operation system.

A key input occurs during the event processing. This case is explained. As shown in FIG. 11, when a key input occurs in the "Key input area" A2, texts entered using the keys are additionally stored in a predetermined storage region through a key input accept process (information generating unit) and directly fed back to the "Key input area" A2 to display. When a key input occurs in the "Title input area" A2, title texts entered by the keys are additionally stored in a predetermined storage region through a key input accept process and directly fed back to the "Title input area" A2 to display.

If the "OK" button B is operated at this moment, the input text string and title text string already entered and stored are passed to the transmission process (transmission information determining unit) and the storage region is cleared. The text string displayed in the "Key input area (Title input area)" A2 is also cleared simultaneously. If the "OK" button B is not operated but the entered key is the return key, the text string stored is passed to the transmission process to process similarly (transmission information determining unit).

If the return key is not pressed, the storage region is not cleared, returning to the event process. The text string displayed in the "Key input area (Title input area)" A2 is not cleared.

The text string displayed in the "Key input area (Title input area)" A2 can be edited/changed independent of the entered text string by moving the pointer into the "Key input area (Title input area)" A2 using the pointing device 34, then entering keys, before the return key or the "OK" button B is pressed.

A drawing occurs in the "Stroke input area" A3 during the event processing. This case is explained. As shown in FIG. 11, when the beginning of the drawing in the "Stroke input area" A3 occurs, the drawing entered with strokes is additionally stored in a predetermined storage region through a stroke input accept process (information generating unit) and directly fed back to the "Stroke input area" A3 to display. The beginning of the drawing in the "Stroke input area" A3 can be detected by detecting an occurrence of a mouse down event in the "Stroke input area" A3. Because, even if an input device such as a tablet is employed as the pointing device 34, a pen down event on the tablet is often assigned to a mouse button down event in the operating system. Therefore, the occurred event of the drawing in this case is acquired from the operating system. Alternatively, the slave client application directly monitors the operation of the input device in one method.

If the "OK" button B is operated at this moment, the drawing already entered and stored is passed to the transmission process (transmission information determining unit) and the storage region is cleared. The drawing displayed in the "Stroke input is area" A3 is also cleared simultaneously.

If the "OK" button B is not operated, the storage region is not cleared, returning to the event processing. The drawing displayed in the "Stroke input area" A3 is not cleared.

A file icon drop occurs in the "Drag and Drop area" A1 during the event processing. This case is explained. As shown in FIG. 11, when a file icon drop occurs in the "Drag and Drop area" A1, a file corresponding to the dropped file icon is additionally stored in a predetermined storage region. Then, the file stored is passed to the transmission process (transmission information determining unit) and the storage region is cleared. The file name of the file corresponding to the dropped file icon is passed as a title text string to the transmission process. The beginning of the drawing in the "Drag and Drop area" A1 can be detected by detecting an occurrence of a mouse down event in the "Drag and Drop area" A1. The operating system supports the processing of the file icon by the Drag & Drop operation.

The objects (text strings, stroke data and files) passed to the transmission process are, after later-described attributes are given, transmitted via the network 7 from the slave client to the master client (the information processor 14 that runs the master client application thereon as described later)(transmission information determining unit).

Addition of attributes to objects (text strings, stroke data and files) is explained. Attributes given to an object include, in addition to the title text string, a terminal equipment ID for specifying the conferee's information processor (slave client) 5, a user ID for the user of the conferee's information processor (slave client) 5, and time information on transmission of the object, for example. An attribute that expresses the contents of the object to be processed is also given. This attribute expresses the application that created the object. It corresponds to CREATOR recorded in the resource fork in the file of Macintosh® from Apple Computer, Inc. and to the file extension of Windows® from Microsoft Corporation. Such the attribute is hereinafter referred to as a creator attribute for convenience of explanation.

(Explanation of Operations in the Master Client)

The operation of the information processor 14 is explained next. Various program codes (control programs) stored in the hard disk 20 in the information processor 14 or various program codes (control programs) stored in the storage medium 28 are written into the RAM 17 when the power to the information processor 14 is turned on. Thus, the information processor 14 operates based on the program codes (control programs). The operation controlled by the CPU 15 based on the master client application is explained. The master client application is a characteristic function provided to the information processor 14 of the present embodiment and contained in the various application programs 27.

Figure 12:
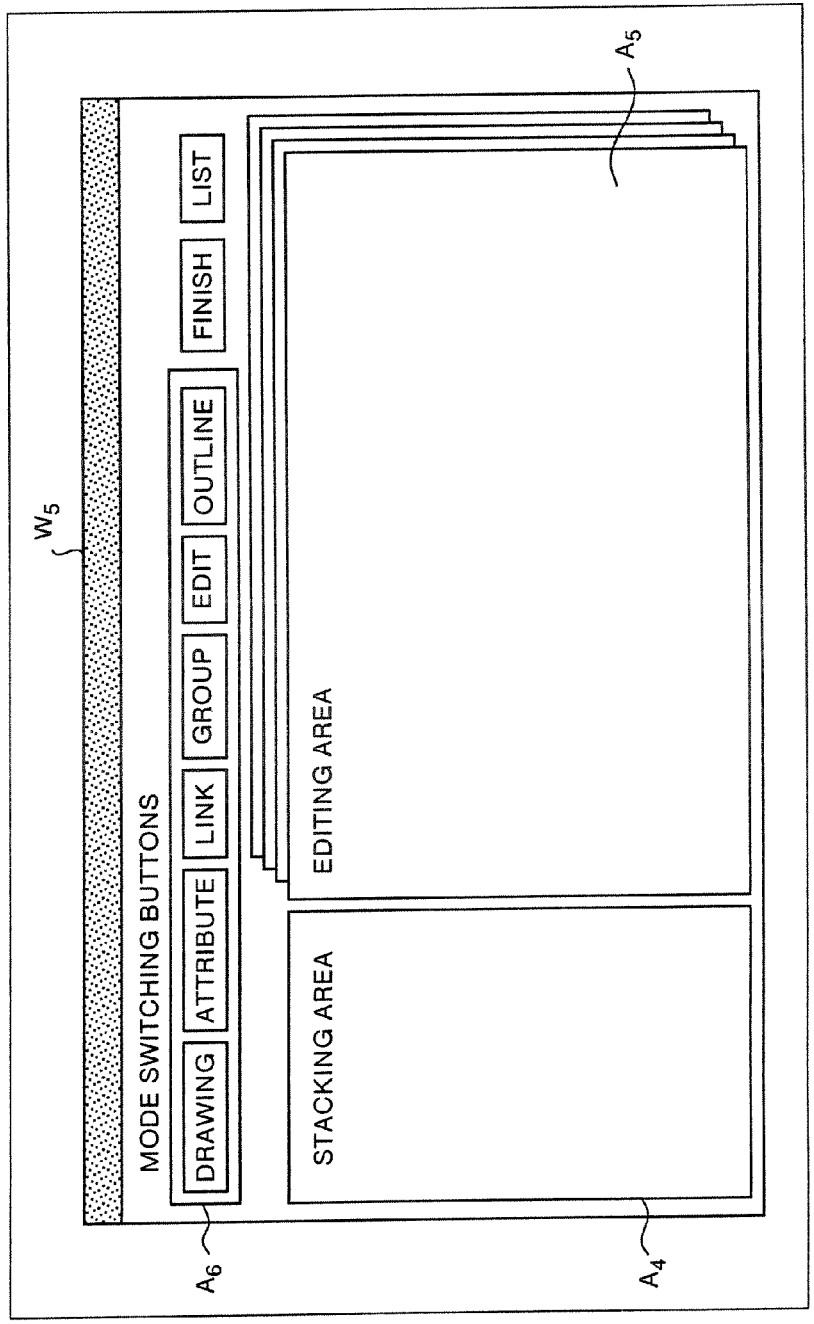
FIG. 12 is a front view which shows an example of a display screen on a display based on a master client application.
Figure 13:
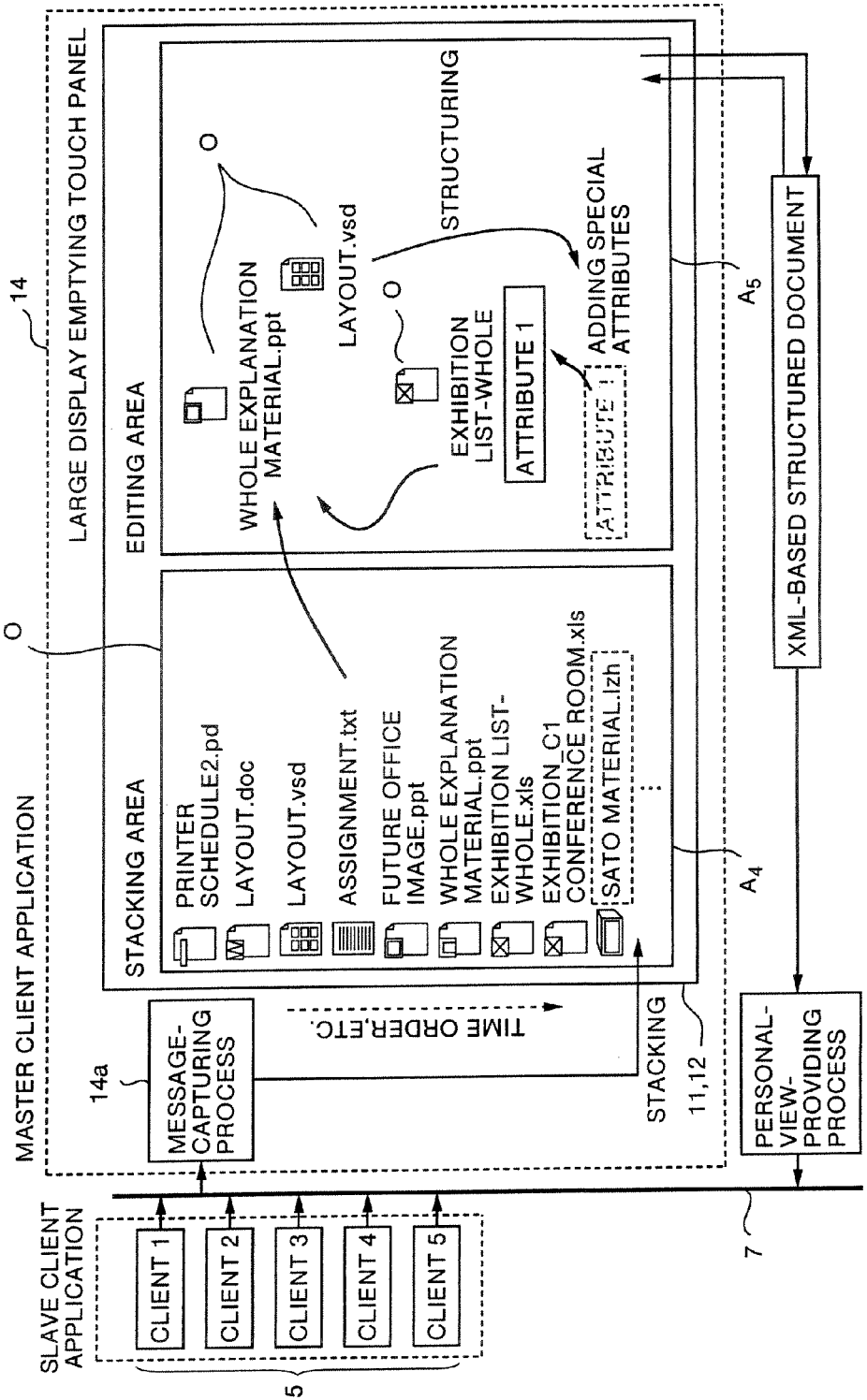
FIG. 13 is an explanatory diagram which schematically shows behaviors of objects in a master client application.

FIG. 12 is a diagram which shows an example of a display screen on the display 11 based on the master client application, and FIG. 13 is an explanatory diagram which schematically shows behaviors of objects in the master client application. As shown in FIG. 12, when the master client application is activated, a window W5 for the master client application is displayed in the display screen on the display 11 of the information input/output section 13 connected to the information processor 14. The window W5 defines the information sharing area or "stacking area" A4, the editing display area or "editing area" A5 and a Button area" A6. Thus, the area display unit functions.

As shown in FIG. 13, the message receiving process 14a is created and operates in the master client. This message receiving process 14a functions as an information receiving unit, which receives various objects sent from the slave client and takes them into the master client. The objects taken into the master client are displayed in inner regions in the "stacking area" A4 and the "editing area" A5 based on the following functions.

The objects sent from the slave client received at the message receiving process 14 are stored in a storage region accessible from the master client.

Specifically, the objects are individually stored as a file in respective predetermined regions in the hard disk 20. The ID and attributes of the received object are stored in the object managing list (see FIG. 32) that is stored in a predetermined region and managed by the maser client. The ID of the object is a text string that is created based on a received time text string and is unique per object. If the object sent from the slave client is a file, the attributes of the object include the user ID or terminal ID, and the time information on transmission of the object as described above.

Together with the storing process, the object is displayed in the "stacking area" A4. As for the objects O displayed in the "stacking area" A4, they are displayed in the "stacking are" A4 from above in a received time order, for example. In this case, display modes of the individual objects O in the "stacking area" A4 include a predetermined icon display previously defined based on a difference in the attributes of the objects O, and a thumbnail display of file contents (see FIG. 14). If the object O is an image file, the thumbnail display is particularly suitable for it. Together with the icon, the user ID for the conferee who made the transmission may be described, among the title text string and the given attributes, for example. The texts entered in the slave client from the conferee are displayed just as they are. The texts not accommodated within the display width of the "stacking area" A4 are displayed in one of the following manners: displaying a predetermined number of starting texts only; matching the texts with the width and displaying them folded over a plurality of lines; and selecting a smaller size character font to shrink-display them. If the object O in the "stacking area" A4 reaches to the lower end of the "stacking area" A4, the screen is scrolled a predetermined amount up to continue the display. Thus, the function of the object listing unit is executed.

The information (object O) displayed in the "stacking area" A4 is a display on a large, for example, 80-inch screen display 11. Therefore, the conferees can visually share the information. In the display screen 11a on the display 11, the coordinate detecting area 12a of the coordinate detector 12 is located. Therefore, the object O displayed in the "stacking area" A4 can be pointed directly by clicking/double-clicking via the coordinate detector 12. If the double-clicked object O has a type of a file, the application that created the file is activated to open the file. The pointing may be operated using the pointing device such as the mouse 19 at the master client (the information processor 14 in this example).

The object O displayed in the "stacking area" A4 can be moved/copied to the "editing area" A5 through an operation of Drag and Drop. The object O in the "stacking area" A4 is visually copied to the "editing area" A5. If the object O has a type of a file, the creator attribute of the object O is employed to determine the application that created the object O and display it on the "editing area" A5 in the form of the corresponding icon. The title attribute is also employed to display the title text string with a predetermined font near the icon. If the object O has a type of a text string, the text string is displayed on the "editing area" A5 with a predetermined font. If the object O has a type of stroke data, the stroke is enlarged or reduced and displayed similarly. If the title attribute of the title data is not empty, the text string is also displayed near the stroke. In this case, the file stored in the storage region (a predetermined region in the hard disk 20) accessible from the master client corresponding to the object O is not copied as the actual condition. The object managing list is additionally provided with the information for expressing that the object O is visually copied to the "editing area" A5. A visual location (coordinates) on the "editing area" A5 is also added. Several operational modes are defined on the "editing area" A5 as described later. These operations are always available independent of the operational modes in the "editing area" A5. Thus, the function of the object designating unit and the function of the designated object moving unit can be executed.

Therefore, the "stacking area" A4 that is the space for holding information provided from the conferees is not directly related to the "editing area" A5 that is the editing screen. In spite of such the arrangement, through an easy and intuitive operation of Drag and Drop, the conference chairman can move/copy the information provided from the conferees to the space for editing as a target to be edited. This is effective to reduce interruptions in consideration during the discussion, readily share the individual information and extremely improve the efficiency in cooperative works by all conferees.

The operation of visual copy from the "stacking area" A4 to the "editing area" A5 to update the object managing list is hereinafter simply referred to as "copy of an object from the stacking area to the editing area". The object O displayed in the "editing area" A5 is not the actual condition of the object O in the "stacking area" A4, though it is expressed below as an "object" for convenience of explanation.

Figure 14:
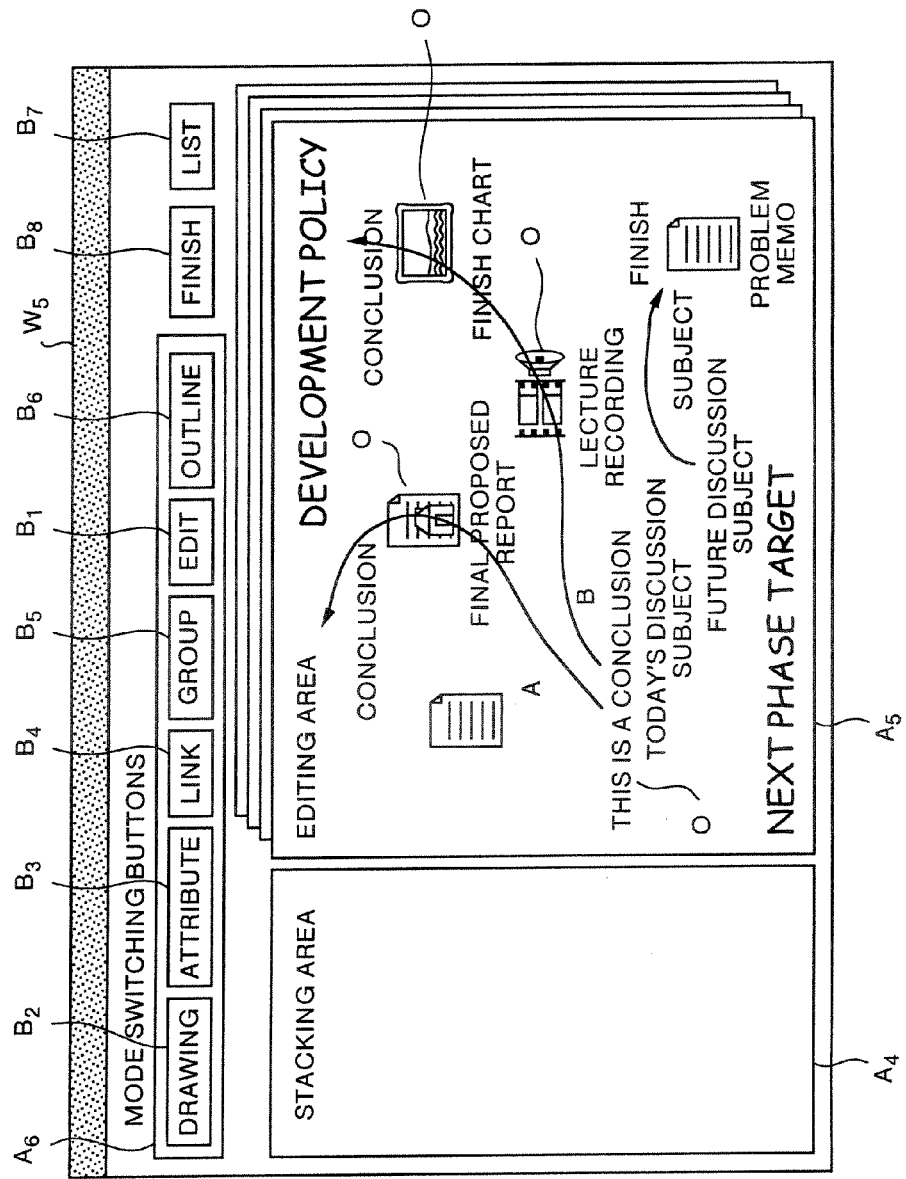
FIG. 14 is a front view which shows an example of a display screen on a display, which explains generation of a link.

To the object O copied from the "stacking area" A4 to the "editing area" A5, various editing operations can be performed. Functions for editing the object O in the "editing area" A5 are explained below in turn. As a premise of explanation, an example of the display screen in the master client is shown in FIG. 14. As described earlier, the "stacking area" A4, the "editing area" A5 and additionally the "button area" A6 are defined in the window W5. Eight buttons in total are located in the "button area" A6. They include six mode switching buttons B1 to B6 (a "Drawing" button, an "Attribute" button, a "Link" button, a "Group" button, an "Edit" button and an "Outline" button) for determining five operation modes in the "editing area" A5, a "finish" B7 and a "List" B8. The six mode switching buttons B1 to B6 are exclusive from each other. The "editing area" A5 is always in either one of the six modes. The user can switch the mode to a desired one by operating the button. The buttons of "finish" B7 and "List" B8 can be operated during any one of the five modes to execute the operations later described.

[Explanation of Operations in the Editing Area in "Edit" Mode]

The operation, when the "edit" button B1 is operated and the "editing area" A5 is switched into the "edit" mode, is explained. The object O moved/copied into the "editing area" A5 is displayed at a location, which can be altered by the pointing device such as the coordinate detector 12 and the mouse 19. This operation can be achieved by the master client, which always monitors the mouse event in the "editing area" A5 and, based on the event type and occurred location, alters the display location of the corresponding object O. Specifically, when a mouse event occurs in the "editing area" A5, it checks coordinates of all objects O recorded in the object managing list to determine if the object O is located on the mouse pointer location. If the checked result shows that the object O is located on the mouse pointer location, the display location of the object O is moved to the mouse up event occurred coordinates when the next mouse up event occurs. At the same time, the coordinates of the object O are updated for the mouse event occurred coordinates.

[Explanation of Operations in the Editing Area in "Drawing" Mode]

The operation, when the "drawing" button B2 is operated and the "editing area" A5 is switched into the "drawing" mode, is explained. When the "editing area" A5 is switched into the "drawing" mode, an occurrence of the mouse event is regarded as a drawing operation. When the mouse button down event and mouse move occur, a line is drawn along the mouse pointer locations on the "editing area" A5 until the mouse button up occurs. This is a free drawing operation. This mode allows the user to freely write characters and graphics in the "editing area" A5 and thus provides a function of the conventional white board during a conference. In this embodiment, the "drawing" button B2 is located to allow the user to select the "drawing" mode definitely, as a non-limited example. Alternatively, if any object O is not present on the coordinates of the mouse pointer when the mouse down event occurs, operations until the mouse up event occurs may be regarded as the drawing operations, for example. Such the modeless operation can be executed.

[Explanation of Operations in the Editing Area in "Attribute" Mode]

The operation, when the "attribute" button B3 is operated and the "editing area" A5 is switched into the "attribute" mode, is explained. When the "editing area" A5 is switched into the "attribute" mode, an occurrence of the mouse event is regarded as an operation of "attribute setting". A predetermined significant attribute can be given to the selected object O. For example, predetermined significant attributes of "purpose", "conclusion" and "subject" are previously stored as the attributes in a memory region (a predetermined storage region in the hard disk 20).

When the target object O is pointed and clicked using the pointing device such as the coordinate detector 12 and the mouse 19, the "purpose", "conclusion" and "subject" are displayed near the object O in a pull-down menu. When the "conclusion" is selected and clicked among these attributes ("purpose", "conclusion" and "subject"), for example, the "conclusion" attribute is given to the selected object O. At this moment, the indication of the "conclusion" attribute having been added is given to the description on the corresponding object in the object managing list (see FIG. 32). The indication of the "conclusion" attribute having been added is also displayed in a predetermined format near the object O displayed in the "editing area" A5. There are specifically available methods of: writing characters of "conclusion" near the displayed object O; giving a pre-determined symbolic mark corresponding to the "conclusion"; and changing the display color of the object O.

Therefore, it is possible to add a concept important in the conference for the information divergently created/provided during the discussion using the editing screen or "editing area" A5, such as the "purpose", "conclusion" or "subject", to the object O as an attribute. As a result, it is possible to easily look only the objects O with these important attributes added thereto even in the middle of the conference and extremely improve the efficiency of the proceedings. The third party can easily extract the essence of the conference and efficiently collect or grasp the information.

Attributes given to the object O are not limited in the one-dimensional attribute such as the "purpose", "conclusion" and "subject". A multi-dimensional attribute may also be given to an object O. The multi-dimensional attribute is an attribute of predetermined information expressed with a plurality of attributes in combination. An operation of giving a multi-dimensional attribute to the object O is explained below. An example of the attribute expressed with two attribute names, "developed year" and "communication speed" according to a proposed specification of a machine to be developed, is employed for explanation.

Figure 15:
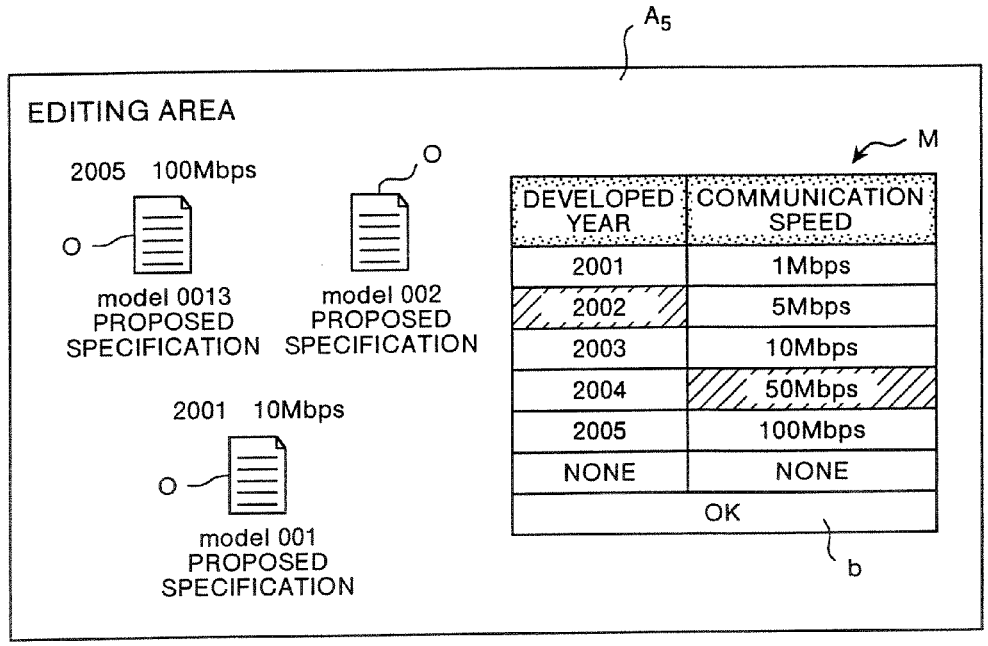
FIG. 15 is a front view which shows an example of displayed contents when a multi-dimensional attribute is given to an object.
Figure 16:
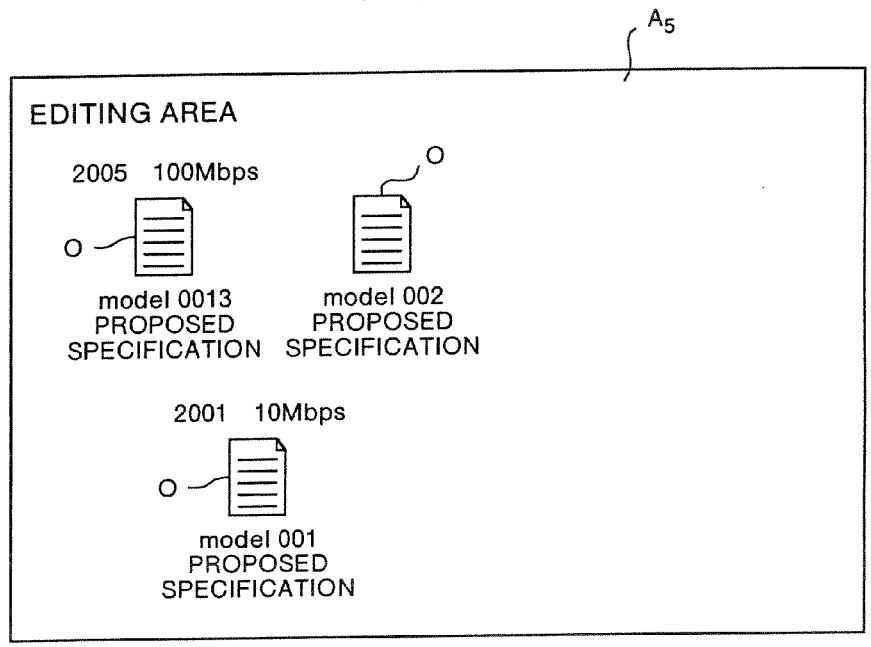
FIG. 16 is a front view which shows a multi-dimensional attribute given to an object.

When the "editing area" A5 is switched into the "attribute" mode, then the pointing device such as the coordinate detector 12 and the mouse 19 is employed to point and click the target object O, as shown in FIG. 15, a pull-down menu is displayed near the object O ("Model 002 proposed specification" file icon). As shown in FIG. 15, the "developed year" displayed in the pull-down menu M has attribute values of "2001", "2002", "2003", "2004", "2005". The "communication speed" displayed in the pull-down menu M has attribute values of "1 Mbps", "5 Mbps", "10 Mbps", "50 Mbps", "100 Mbps". These attribute values are previously stored in a pre-determined memory region (a predetermined region in the hard disk 20 or storage section). The user can select values in the pull-down menu M individually for the "developed year" and the "communication speed". The attribute value can be selected by clicking each attribute value per attribute displayed in the pull-down menu M using the pointing device such as the coordinate detector 12 and the mouse 19. Each attribute value per attribute is exclusive from another and only one attribute value can be selected per attribute. FIG. 15 shows that "2002" is selected for the attribute value of the "developed year" and "50 Mbps" for the value of the "communication speed". An attribute value per attribute can be determined by clicking the "OK" button b in the pull-down menu M using the pointing device such as the coordinate detector 12 and the mouse 19. Thus, the function of the attribute value selecting unit is executed. Once the attribute value per attribute is determined, as shown in FIG. 16, the pull-down menu M is cleared from the "editing area" A5. At the same time, the attribute value per attribute or an additional attribute Z ("2002" and "50 Mbps") is created and given to the selected object O ("Model 002 proposed specification" file icon). The given additional attribute Z is displayed near the corresponding object O. Thus, the function of the additional attribute generating unit, the function of the attribute giving unit and the function of the additional attribute display unit are executed. This allows the user to give any combination of the attribute value of the developed year" and the attribute value of the "communication speed" stored in the memory region (a predetermined region in the hard disk 20) to any object O in the "editing area" A5. The additional attribute Z given to any object O is displayed near the object O. Thus, the objects O that are given various additional attributes Z can be identified during the discussion using the "editing area" A5. Accordingly, it is possible to identify the flow of the discussion at a glance and extremely improve the efficiency of the proceedings.

Figure 17:
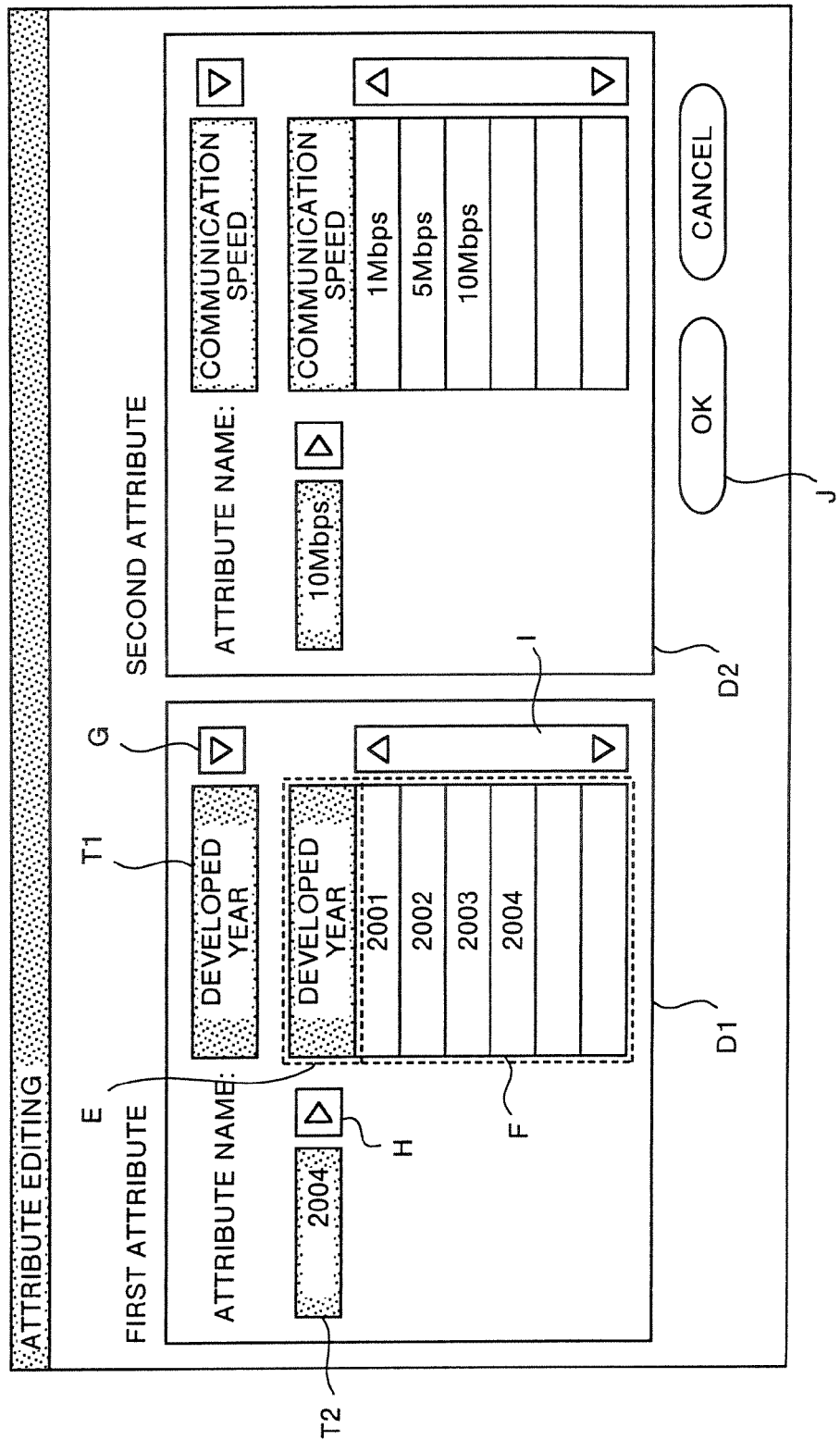
FIG. 17 is a front view which shows an example of displayed contents during editing of an attribute name and value to be displayed on a pull-down menu.

The user can freely edit the attribute name and value displayed in the pull-down menu M. When the user selects the attribute edit mode by operating a button, not shown, an attribute edit dialog D is displayed in the display screen on the display 11 as shown in FIG. 17. The attribute edit dialog D includes an area D1 for editing information on a first attribute and an area D2 for editing information on a second attribute. FIG. 17 contains meshed portions that show "Text input box" T1 T2 for the user input.

An operation of editing an attribute name and value is explained below with reference to an example of the attribute name and value of the first attribute. A portion E is employed to display the "attribute name" of the first attribute and a portion F the "attribute value" of the first attribute. First, the "developed year" is entered to the "text input box" T1 located at the right of the indication of the "attribute name", then an arrow button G located at the right is clicked using the pointing device such as the coordinate detector 12 and the mouse 19. As a result, a text string of "Developed Year" is displayed in the portion E and the attribute name of the first attribute is set to the "developed year". A plurality of attribute values can be entered. Into the "text input box" T2 located below the indication of the "attribute value", "2004" can be entered, for example. Then, an arrow button H located at the right is clicked using the pointing device such as the coordinate detector 12 and the mouse 19. As a result, a text string of "2004" is entered in the portion F in turn from above and the text string in the "text input box" T2 is cleared. It is assumed that an attribute value of "None" is previously defined in the portion F. An additional attribute value can be entered through the similar operation. After many attribute values are entered and one of them reaches to the lowermost end of the portion F, the whole portion F is scrolled against the information to allow another attribute value to be entered in the lower portion. The attribute value entered in the lower portion can be referred by scrolling the array of attribute values using the pointing device such as the coordinate detector 12 and the mouse 19 to click a control object I generally known as "scroll bar" in GUI. It is possible to sort the attribute values when one of attribute values displayed in the portion F is selected by clicking it using the pointing device such as the coordinate detector 12 and the mouse 19, and operating an arrow in the control object I. This operation is an operational method of GUI widely employed in general. The second attribute can be edited similarly. Finally, when the pointing device such as the coordinate detector 12 and the mouse 19 is employed to click an "OK" button J in the attribute edit dialog D, two attribute names and the corresponding attribute values are stored in a predetermined memory region (a predetermined region in the hard disk 20). Thus, the function of the attribute editing unit is executed.

The user is allowed to freely edit the attribute name and value displayed in the pull-down menu M. This is effective to absorb differences in categories of problems to be processed and differences in languages due to different occupations and professions. Therefore, an extreme improvement of the efficiency in any type of knowledge creative work can be expected.

When the multi-dimensional attribute is given to the object O, a relation between objects O may be displayed visually based on the attribute value per attribute. An example is explained below with reference to FIG. 16 which shows three objects O copied into the "editing area" A5 from the "stacking area" A4.

When the user operates a button, not shown, to select the table chart display mode, a view named "Table chart view" is created and a screen is displayed in the display 11 as shown in FIG. 18. The horizontal axis corresponds to the first attribute and the vertical axis to the second attribute. As shown in FIG. 18, an attribute value per attribute is processed as an "item" and a display location of each object O is displayed within a category corresponding to the attribute value. Thus, the function of the object relation display unit is executed.

Figure 19:
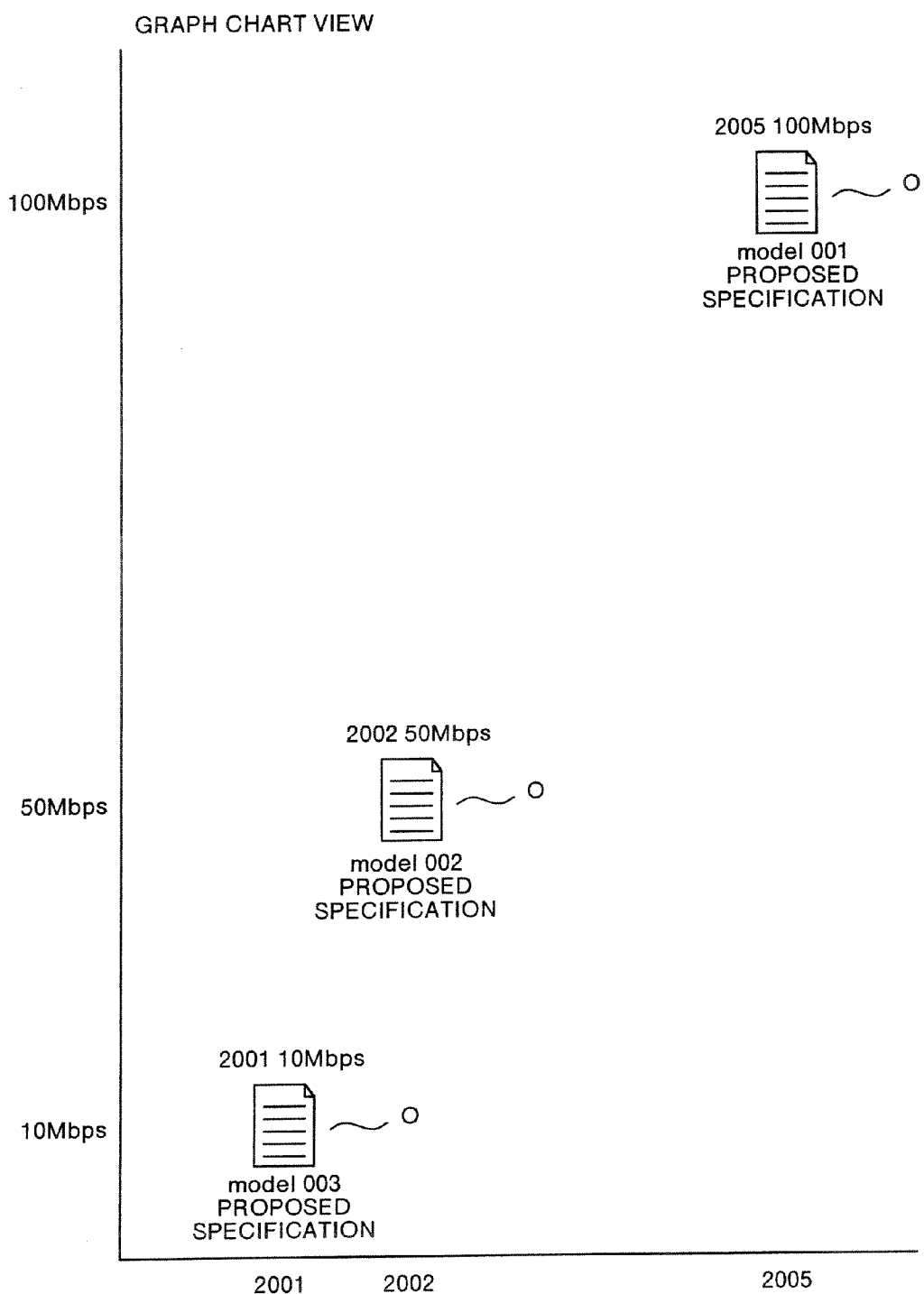
FIG. 19 is a front view which shows an example of a graph chart view.

In an alternative, when the user operates a button, not shown, to select the graph chart display mode, a view named "Graph chart view" is created and a screen is displayed in the display 11 as shown in FIG. 19. The horizontal axis corresponds to the first attribute and the vertical axis to the second attribute. As shown in FIG. 19, an attribute value per attribute is processed as a "numeral" and a display location of each object O is scaled based on the attribute value and displayed. Thus, the function of the object relation display unit is executed.

As explained, the relation between objects O can be displayed visually based on the attribute value per attribute. As a result, relations among pieces of information provided with meanings by giving attributes thereto can be identified at a glance. Therefore, it is possible to easily arrange the consideration to create new knowledge and expect an extreme improvement of the efficiency in a cooperative knowledge creative work.

[Explanation of Operations in the Editing Area in "Link" Mode]

The operation, when the "link" button B4 is operated and the "editing area" A5 is switched into the "link" mode, is explained. When the "editing area" A5 is switched into the "link" mode, an occurrence of the mouse event is regarded as an operation of "link setting". A predetermined significant attribute can be given to the selected object O. When the user operates the "link" button B4, the "editing area" A5 is switched into the "link" mode. In this state, as shown in FIG. 14, the pointing device such as the coordinate detector 12 and the mouse 19 is employed to click the pointer and move the clicked pointer through two objects O, including a text string, "This is a conclusion", and a file icon, "Final proposed report" (Trace A). As a result, a link is defined from the text string object O, "This is a conclusion", to the file object 0, "Final proposed report". The defined link is saved in the item of the object, "This is a conclusion", in the object managing list, through an action that describes the pointer to the object O, "Final proposed report", and updates the list. The created link is visually fed back as a display on the "editing area" A5, for example, a display of Trace A, as shown in FIG. 14.

An operation is explained for setting a link from the text string object O, "This is a conclusion", to a file object O, "Finish chart", as indicated with a Trace B in FIG. 14. The pointing device such as the coordinate detector 12 and the mouse 19 is employed to click the pointer and move the clicked pointer through two objects O, including the text string, "This is a conclusion", and a file icon, "Finish chart". The pointer also passes through a file object O, "Lecture recording", in the middle of the movement. In this case, the file object O, "Lecture recording", is excluded from the link. In the "link" mode, only the first passed-through object and the last passed-through object during the pointer movement are processed, and the objects O passed-through in the middle are excluded.

More specifically, during the pointer movement, coordinates of the moving stroke are checked from the beginning in turn. Then, coordinates of the object O described in the object managing list are checked per coordinates on the stroke to determine if the coordinates of the object O overlap the checked coordinates on the stroke. If it is determined that the coordinates of the moving stroke overlap the coordinates of the object O, the ID of the object O is stored as the object O at a link start point. After further checking is continued, if it is determined that the coordinates of the moving stroke overlap the object O, the ID of the object O is stored as the object O at a link end point. After still further checking is continued, if it is determined that the coordinates of the moving stroke overlap the object O similarly, the ID of the object O at the link end point previously stored is employed to update the ID of the object O. As a result, when the end point of the moving stroke is checked, the ID of the first passed-through object and the ID of the last passed-through object are stored. Based on this condition, the item of the corresponding object in the object managing list is updated. The role of such the link supports, for example, when a predetermined object O is found through any means such as retrieval and vision, to know an object associated with the found object only based on the found object.

Therefore, pieces of information divergently created/provided during the discussion using the editing screen or the "editing area" A5 can be layered by linking objects O respectively associated with the information. As a result, it is possible to perform a dynamic and electronic classification of the information in front of all conferees, arrange a discussion to easily, and improve a convergence of the discussion in the conference. It is also possible, based on one object O created during the conference (for example, a final conclusion), to obtain the object O employed in the middle of the discussion leading to this conclusion. This is effective to extremely improve the reusability of the information.

[Explanation of Operations in the Editing Area in "Group" Mode]

Figure 20:
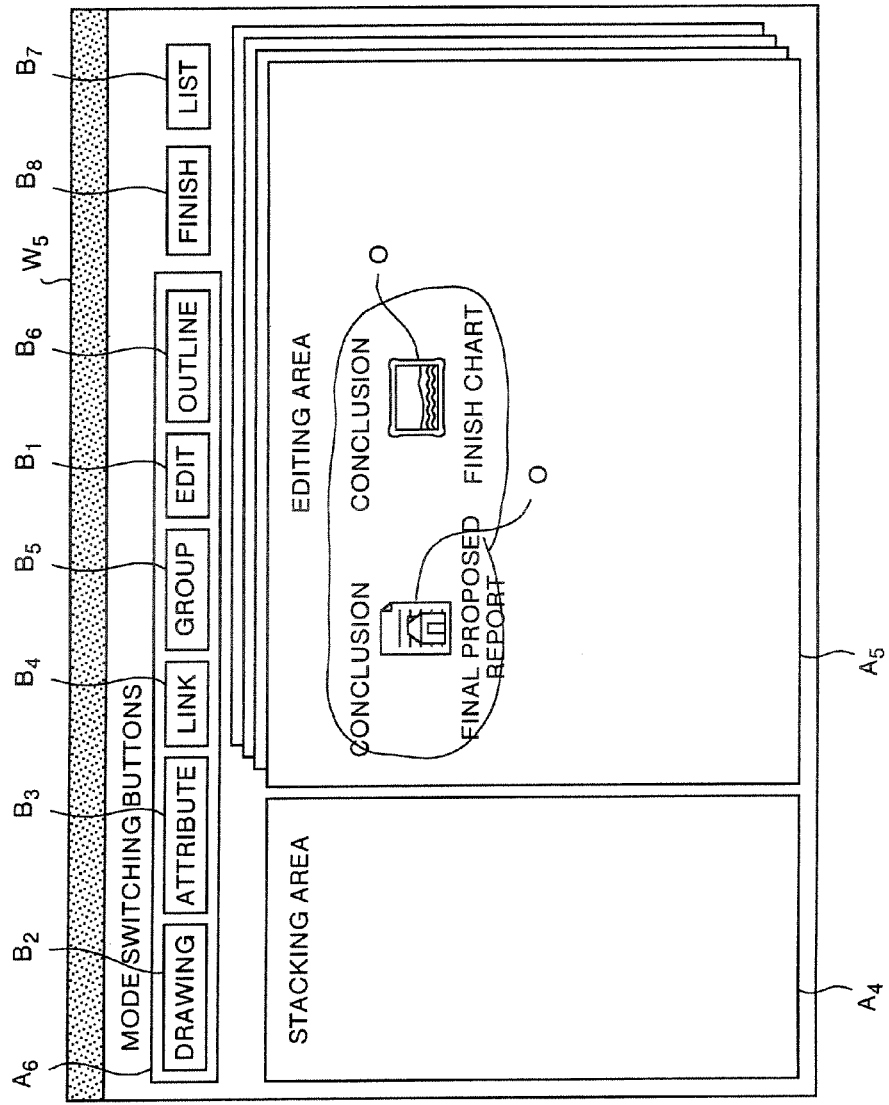
FIG. 20 is a front view which shows an example of a display screen on a display, which explains creation of a group.

The operation, when the "group" button B5 is operated and the "editing area" A5 is switched into the "group" mode, is explained. When the "editing area" A5 is switched into the "group" mode, an occurrence of the mouse event is regarded as an operation of "group setting". A predetermined significant group attribute can be given to the selected object O. When the user operates the "group" button B5, the "editing area" A5 is switched into the "group" mode. In this state, as shown in FIG. 20, the pointing device such as the coordinate detector 12 and the mouse 19 is employed to click the pointer and move the clicked pointer to enter a closed-curve stroke that surrounds two objects O, including a file icon, "Final proposed report" shown in the "editing area" A5, and a file icon, "Finish chart". This operation defines that the file object O, "Final proposed report", and the file object O, "Finish chart", belong to the same "group". The defined "group" is saved in the items of the object O, "Final proposed report", and the object O, "Final chart", through an action that describes a unique "group ID" automatically created with serial numbers and updates the list. The unique "group ID" is automatically created every time when the user enters a closed-curve stroke that includes at least one object O while the "editing area" A5 is in the "group" mode. The role of such the group supports, for example, when a predetermined object O is found through any means such as retrieval and vision, to refer objects having the same characteristic as the found object at a glance or extract the objects having the characteristic together. The presence of an own cross-point in one stroke, at which the stroke crosses itself, is effective to determine if the user-entered stroke is a closed-curve. It is also possible to determine if the coordinates of an object O such as a file icon are included in a closed-curve, using a publicly known technology (see http://www.wombat.or.jp/tomoyashuttle/shtml/algorithm/Hougan.htm, for example), which is omitted to explain.

Therefore, pieces of information divergently created/provided during the discussion using the editing screen or the "editing area" A5 can be grouped at site. As a result, it is possible to perform a dynamic and electronic classification of the information in front of all conferees, arrange a discussion easily, and improve a convergence of the discussion in the conference.

[Explanation of Operations When "List" Button is Operated]

The operation, when the "list" button B7 is operated, is explained. After the "list" button B7 is operated, in dependent of the operation mode in the "editing area" A5, the following function operates. Once the "list" button B7 is operated, the object managing list is retrieved for objects having a specific attribute from the attributes given in the "attribute" mode. In this example, the objects O with the given attribute such as "purpose", "conclusion" and "subject" are retrieved. After completion of the retrieval, as shown in FIG. 21, the retrieved objects O are displayed in the form of a list. Thus, the function of the edited result display unit is executed. Title, Attribute and Contributor in FIG. 21 are referred from the contents described in the object managing list. When titles on columns are clicked using the publicly known operation interface on Windows from Microsoft Corporation, for example, the whole table can be sorted with the contents on the columns.

Therefore, during the discussion using the editing screen that is the "editing area" A5, it is possible to identify the objects O with various attributes added thereto. As a result, it is possible to identify the flow of the discussion at a glance and extremely improve the efficiency of the proceedings.

[Explanation of Operations When "Finish" Button is Operated]

The operation, when the "finish" button B8 is operated, is explained. After the "finish" button B8 is operated, in dependent of the operation mode in the "editing area" A5, the following function operates. Once the "finish" button B8 is operated, the object managing list is retrieved for objects having a specific attribute from the attributes given in the "attribute" mode. In this example, the objects O with the given attribute such as "conclusion" and "subject" are retrieved. After completion of the retrieval, a new page is added to the "editing area" A5 and the retrieved object O is copied. The page newly added to the "editing area" A5 and the objects O having the attributes of "conclusion" and "subject" and copied onto the page are displayed in FIG. 22. The page newly added to the "editing area" A5 is similar to the "editing area" A5 already explained. Therefore, after the mode is switched to the "drawing", the user can draw a hand-written character, for example. FIG. 22 exemplifies "Memorized" objects O, which are added to the object O with the attribute of "conclusion" and the object O with the attribute of "subject", to instruct the subsequent actions to them.

Figure 23A:
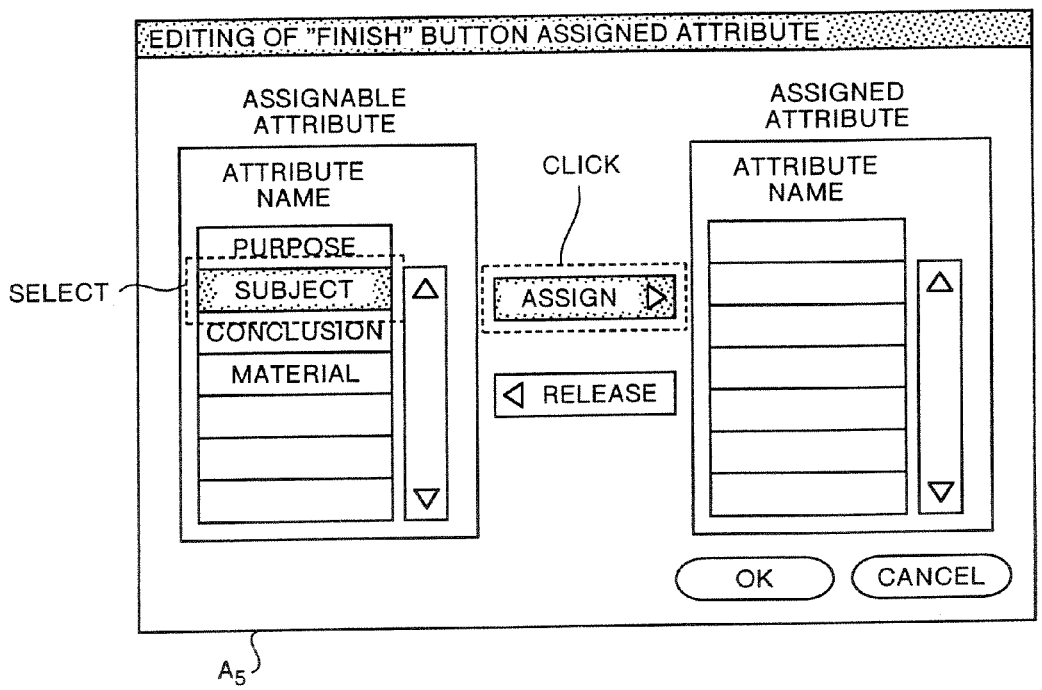
FIGS. 23A and 23B show edit screens for a "conclude" button assigned attribute.
Figure 23B:
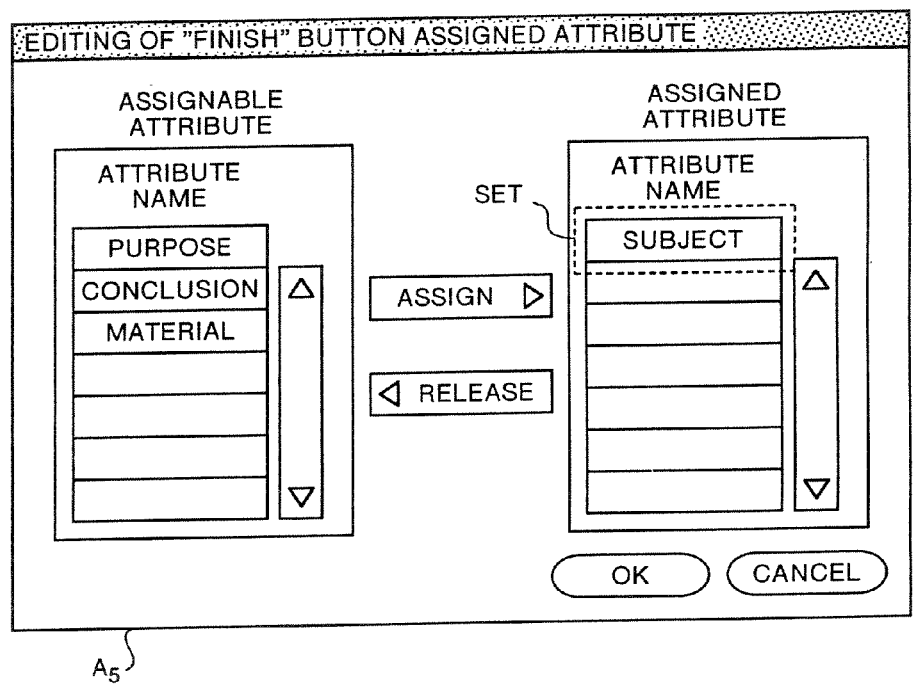
Figure 32:
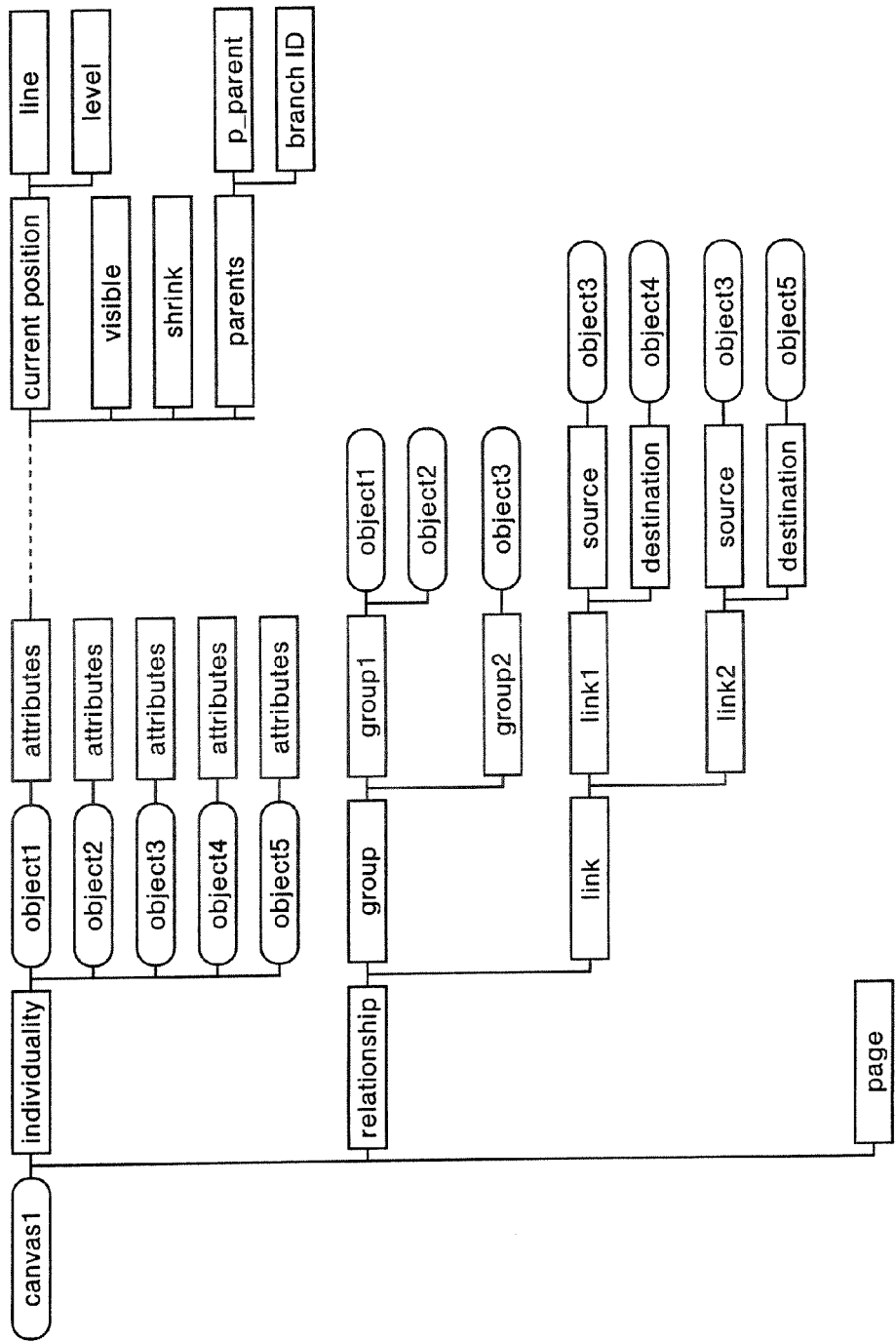
FIG. 32 is a schematic diagram which shows a data structure of an object managing list based on the various operations within the "editing area" of FIG. 31.

A page attribute, "finish page", is added to a newly created editing area page and is described in the object managing list (see FIG. 32). This page can be distinguished from other pages. Therefore, if a button, "finish page redisplay", is provided, even after completion of the conference, the finish page can be easily displayed and referred. In the example, "conclusion" and "subject" are assigned as types of attributes to be extracted using the "finish" button. This can be edited freely. For example, "conclusion" and "subject" can be assigned to the "finish" button. In a specific operation, when the "finish" button is clicked using the right button on the mouse, for example, an edit dialog is displayed as shown in FIGS. 23A and 23B. In the edit dialog, previously determinable attributes are displayed in the left region. When a desired attribute in the left region is clicked and a "setting" button at the center is clicked, an attribute to be assigned to the "finish" button is selected and displayed in the right region. The assigned attribute can be released when a desired attribute in the right region is clicked and a "release" button at the center is pressed.

Thus, attributes are given to objects to provide them with meanings in the "attribute" mode, then the objects are extracted in the "finish" mode using the attributes (for example, "conclusion" and "subject") generally important particularly in a conference as keys and displayed as a new page in the "editing area" A5. Therefore, it is possible to reliably identify the output on the proceedings.

The extracted object can be written in a newly created screen having a white-board-like function employed during the discussion. Thus, an annotation can be further attached to the written contents to define the next action (homework for members, for example) following the written information and extremely improve a yield of the conference.

A page attribute is given to the page that displays the extracted objects. Therefore, it is possible to distinguish the page from other pages and display a finish page that can easily display the extracted objects even when any page is referred. As a result, it is possible to reconfirm the result after the conference easily and reliably and extremely improve a yield of the conference.

[Operations in the Editing Area in "Outline" Mode]

The operation, when the "outline" button B6 is pressed and the "editing area" A5 is switched into the "outline" mode, is explained. This "outline" mode provides functions for visualizing a hierarchical relation between the objects in the "editing area" A5; editing the hierarchical relation with a simple operation; arranging objects dispersed in the editing area; and finishing a conclusion.

Figure 24:
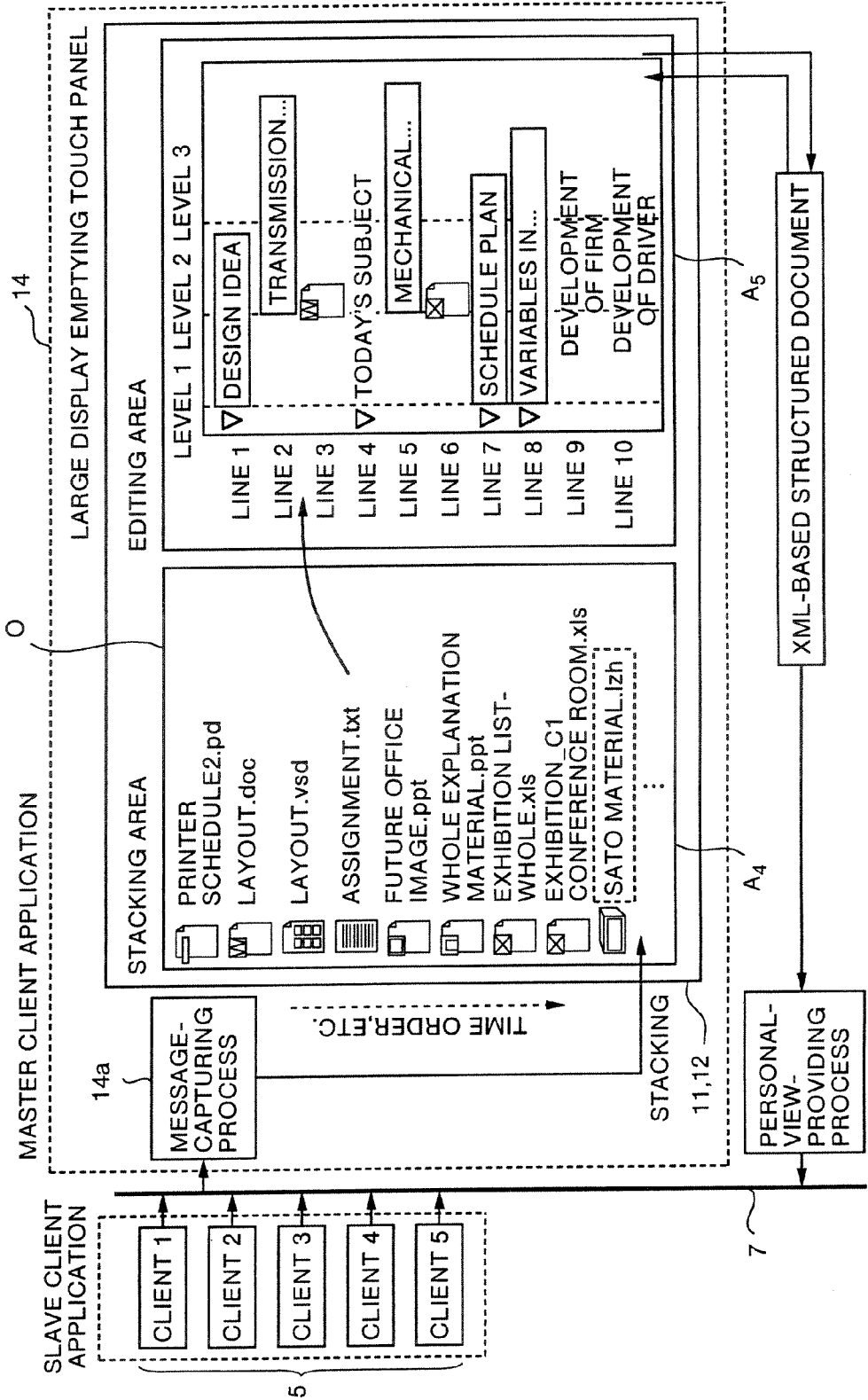
FIG. 24 is an explanatory diagram, which explains a specific example of an object displayed in an "editing area" in an "outline mode"

When the "outline" button B6 is pressed, a new page (blank page) is displayed in the "editing area" A5. In the "outline" mode, an object is dragged and dropped from the "stacking area" A4 to the "editing area" A5 to edit the object. Attributes corresponding to the edit contents are described in the object managing list. FIG. 24 shows a specific example of the objects displayed in the "editing area" A5 in the "outline mode". FIG. 24 shows practical display examples in the "editing area" A5 when the objects have types of file icons, text strings, hand-written characters and images. Operations of displaying and editing the objects in the "editing area" A5 in the "outline mode" are explained below in detail.

Figure 25:
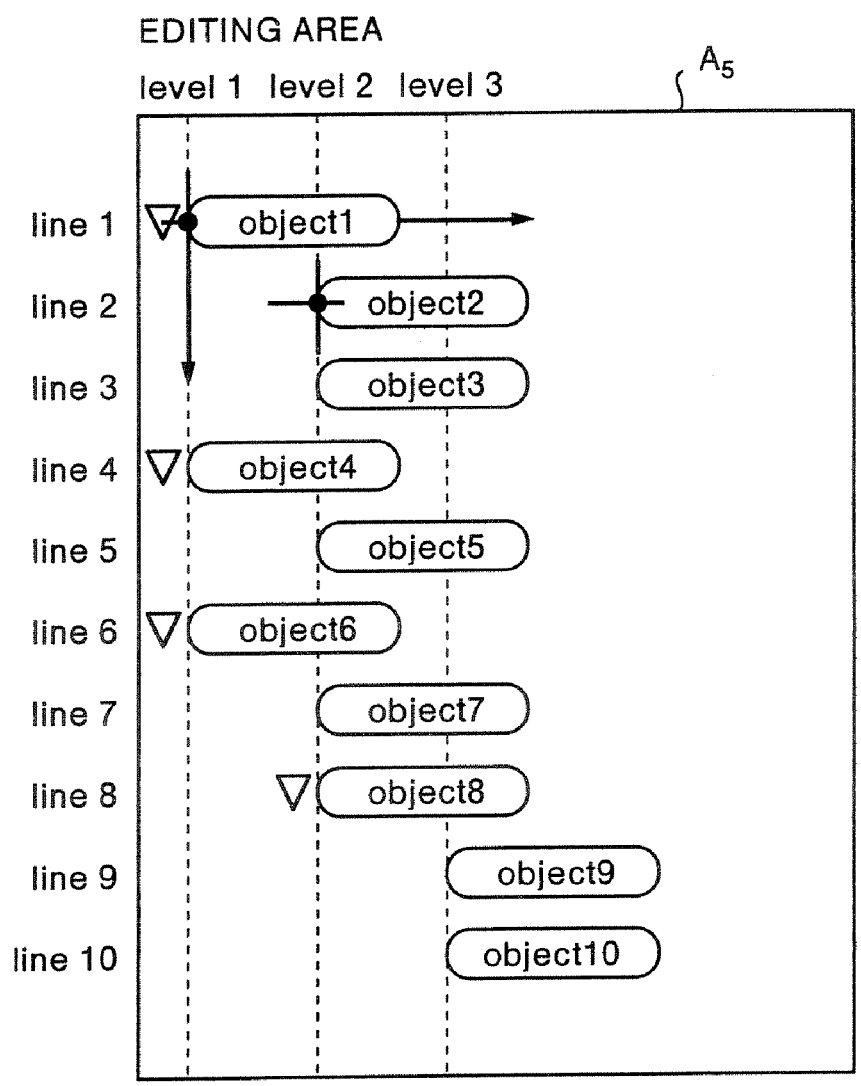
FIG. 25 shows the editing area in the "outline mode"

(1) Explanation of states of objects in the editing area A5:

FIG. 25 shows the editing area A5 in the "outline mode". A state of the editing area A5 in the "outline mode" is explained with reference to FIG. 25.

An object in the editing area A5 is displayed on a predetermined location indicated with a level and line. The level becomes larger when it is displayed at a location closer to the right and the line becomes larger when it is displayed at a location closer to the bottom. The levels and lines are integers and expressed with line-1, line-2 and so on and level-1, level-2 and so on. The levels and lines are mapped with coordinates on the editing area A5. When coordinates values on the editing area A5 are indicated from a pointing device such as a mouse, the line and level corresponding to the indicated point from the mouse can be known. The editing area A5 may be scrolled though it is not shown in FIG. 25. In this case, the coordinates indicated from the mouse come to have line and level values, to/from which the scrolled amounts of the editing area are added/subscribed. Thus, even if the editing area is scrolled, through the use of the mouse to point a location in the screen, it is possible to obtain the line and level corresponding to the point. These processes are common in GUI-based applications and accordingly their detailed explanations for internal processing including the coordinate processing are omitted.

A black dot shown at the left end of the object 2 in FIG. 25 indicates a reference location of each object, which is a reference point for displaying the object. This reference point is defined per object type including a file icon, a text string, a hand-written character and an image. The type of the object is generalized herein and the object is expressed with an ellipse shown in the figure. The reference point of the object is located at the left end of the object on the horizontal centerline. For example, the object 2 has the reference point at a cross-point between the line 2 and the level 2. Thus, the object 2 is defined as located at line 2, level 2. To "determine an object display location at line 2, level 2" means that the object is displayed by locating the reference location at line 2, level 2. In the following explanation, an expression that an "object is located at line 2, level 2" means that "the reference location of the object is located at line 2, level 2". Thus, the reference location is hereinafter always employed to discuss the location of the object.

A relation between a hierarchy and a display condition of an object will be explained next. In FIG. 25, the objects 2 and 3 are children (child objects) of the object 1. When a remark is made to a predetermined object, its child object is an object that satisfies a condition 1 (having a line larger than the remarked object, and smaller than the smallest one among lines larger than the remarked object at a level larger than the remarked object).

In FIG. 25, the object 7 and the object 8 are brother objects. When a remark is made to a predetermined object, its brother object is an object that satisfies a condition 2 (an object having the same level as the remarked object, and a level of another object having a line between the line of the remarked object and the line of the concerned object is larger than the remarked object or not present).

Figure 26B:
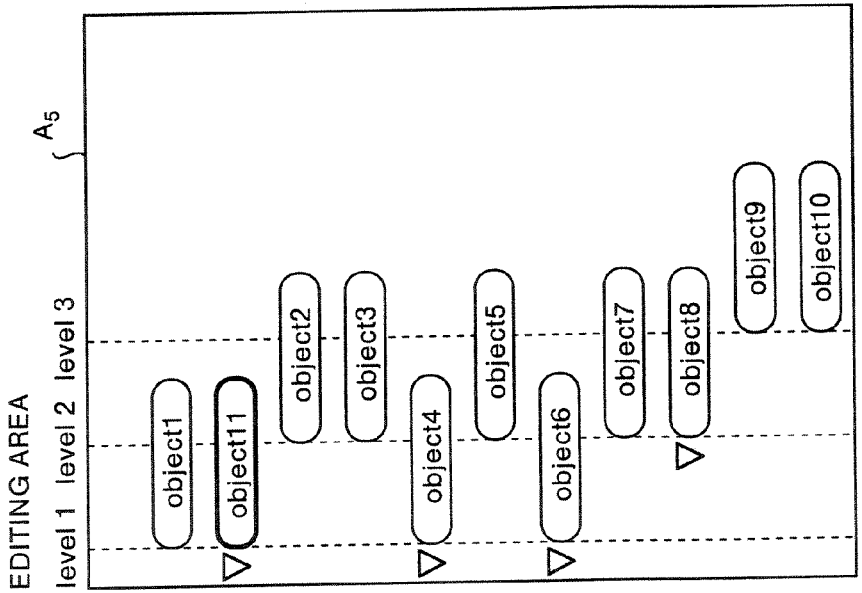
FIGS. 26A and 26B show movement of an object from a "stacking area" to the "editing area"
Figure 26A:
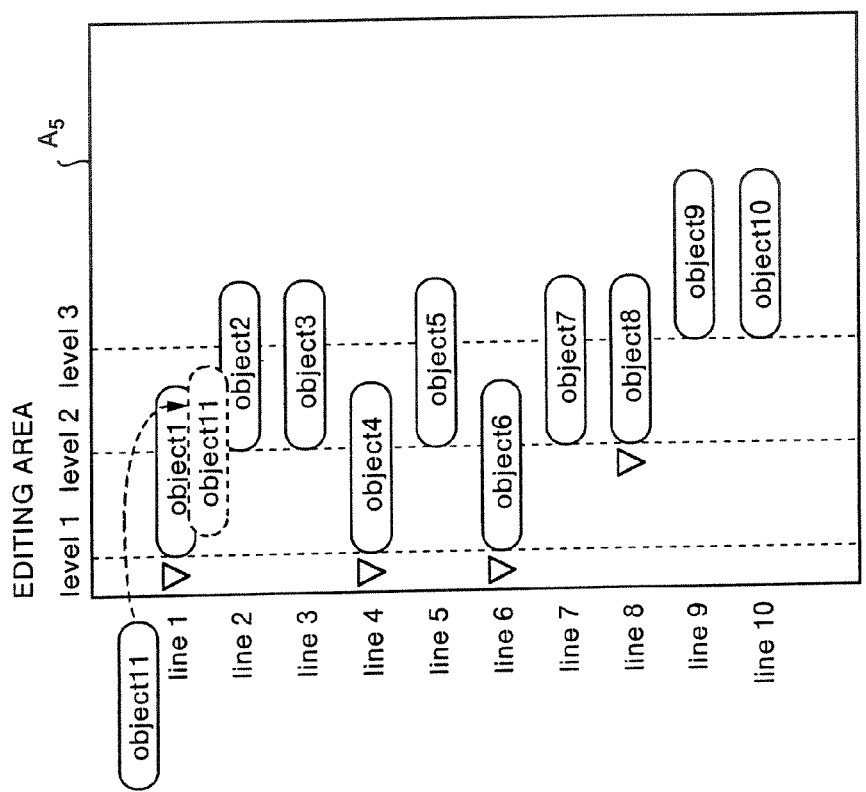

(2) Movement of the object from the stacking area to the editing area:

FIGS. 26A and B are explanatory diagrams which explain the movement of the object from the "stacking area" A4 to the "editing area" A5. FIG. 26A shows an operation when a single object is dragged and dropped into the editing area A5. The object to be dragged is either an object located in the "stacking area" A4 or an object moved from the editing area A5. It is dropped at a location in the editing area A5 similarly with the same operation. When the object 11 is dropped at the location shown in FIG. 26A, the object 1 is replaced with the object 11 as shown in FIG. 26B. The objects 11 and 1 are displayed as brother objects and the object 11 comes to have child objects 2 and 3.

Processes required for reaching to the display will be explained specifically. All objects on the "editing area" A5 are assumed to have levels and lines corresponding to display locations as attribute values, respectively. When the object 11 is dropped in the "editing area" A5, the line and level at the dropped location can be acquired. The line and level may be rougher than that acquired from the pointing device such as the mouse. Therefore, the nearest line and level can be assigned to the dropped object. As for the object having a line number larger than the line at the dropped location, the line number is incremented by one while remaining the level unchanged. A dropped new object has a line substituted by the line at the dropped location and a level substituted by the level at the dropped location. If the dropped object is once located in the editing area A5, with respect to an object that has a larger line value than the line in the attribute value possessed by the dropped object before dragged, the line value is decremented by one. Thereafter, all objects are re-drawn, based on levels and lines possessed by them as attribute values, in the editing area A5. FIGS. 27A and 27B show an example of the object dropped on the same line as but different level from that in FIGS. 26A and 26B.

Figure 28A:
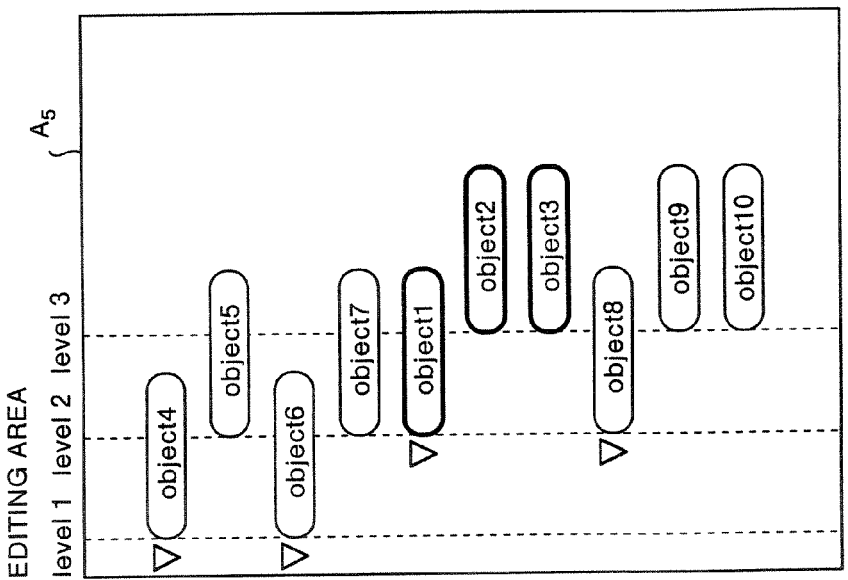
FIGS. 28A and 28B show movement of a parent object by Drag and Drop within the "editing area"
Figure 28B:
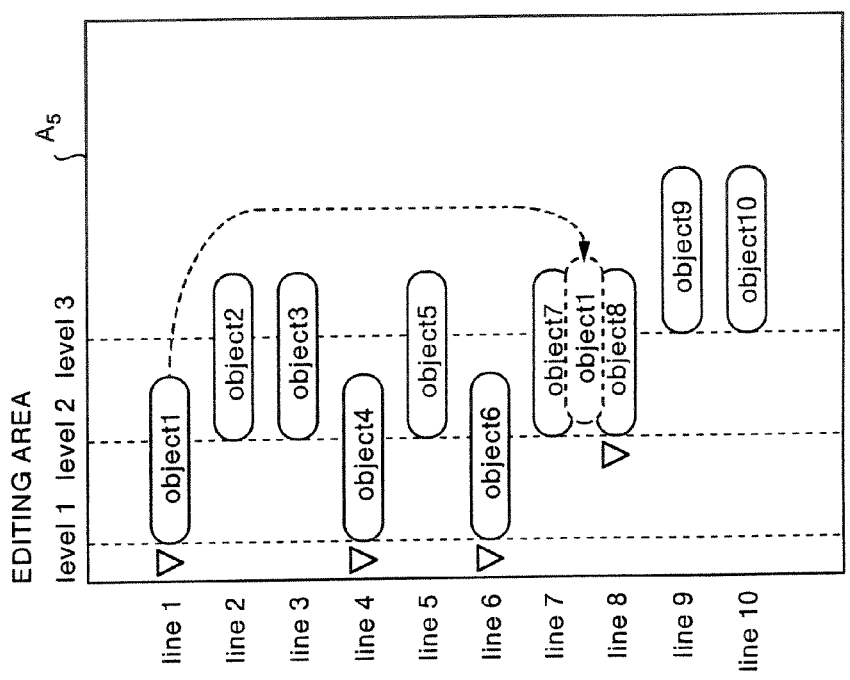

(3) Movement of the object within the editing area:

FIGS. 28A and 28B show examples of a parent-with-child object moved within the "editing area" A5 using an operation of Drag & Drop. When the object 1 is dropped at an arrow-headed location as shown in FIG. 28A, the object 1 and its child object are displayed between the object 7 and the object 8 as brother objects of the object 7 as shown in FIG. 28B.

Figure 29B:
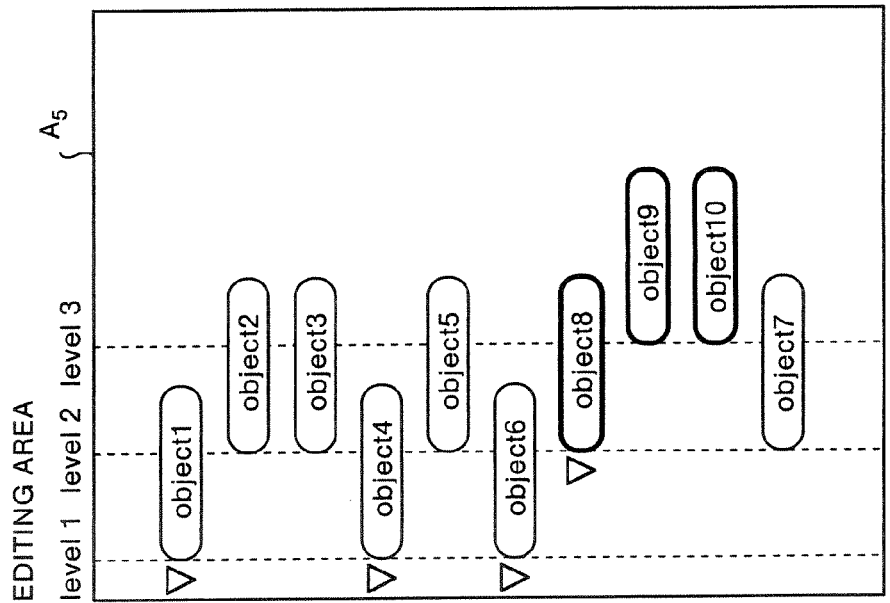
FIGS. 29A and 29B show movement of a parent object by Drag and Drop within the "editing area"
Figure 29A:
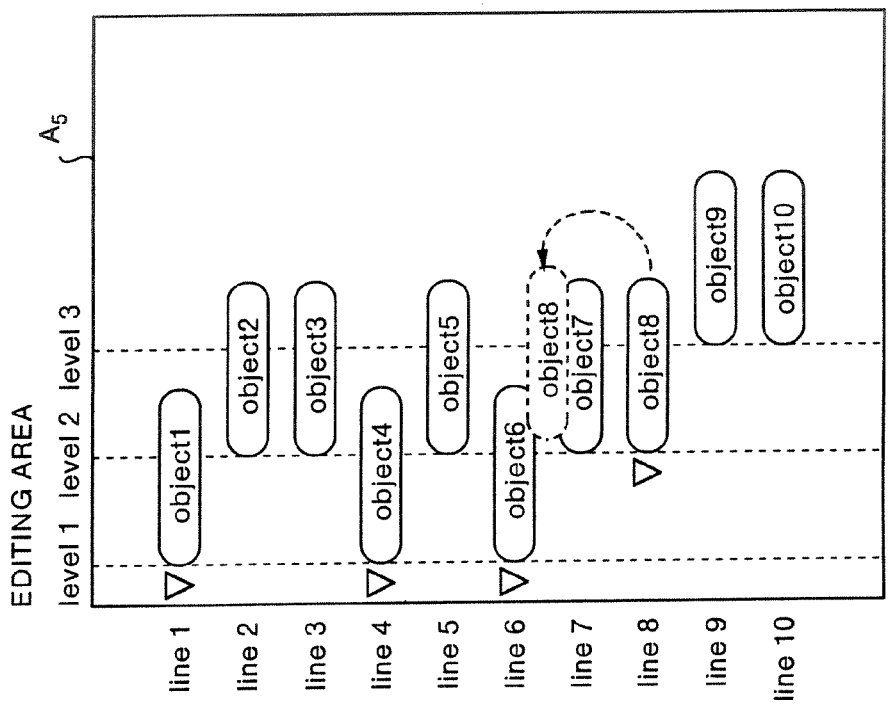

Processes required for reaching to the display will be explained specifically. All objects on the "editing area" A5 are assumed to have levels and lines corresponding to display locations as attribute values, respectively. When the object 1 is designated in the "editing area" A5 using the pointing device such as the mouse (normally through a click operation and a subsequent drag operation), the line and level of the object can be acquired. Child objects of the acquired object are retrieved under the condition 1 to acquire lines of all child objects. Among brother objects of the designated object (the condition 2), with respect to an object, having a larger line than the designated object, and its child object(s), the lines are decremented by the total number of the designated object and its child object(s). When the object 1 is dropped on the "editing area" A5, the line and level at the dropped location can be acquired. The line and level may be rougher than that acquired from the pointing device such as the mouse. Therefore, the nearest line and level can be assigned to the dropped object. As for the object having a line number larger than the line at the dropped location, the line number is incremented by the total number of the dropped object and its child object(s) while remaining the level unchanged. A dropped new object has a line substituted by the line at the dropped location and a level substituted by the level at the dropped location. Thereafter, all objects are redrawn, based on levels and lines possessed by them as attribute values, in the editing area A5. FIGS. 29A and B show movement of the object having its child object(s) and other examples.

Figure 30B:
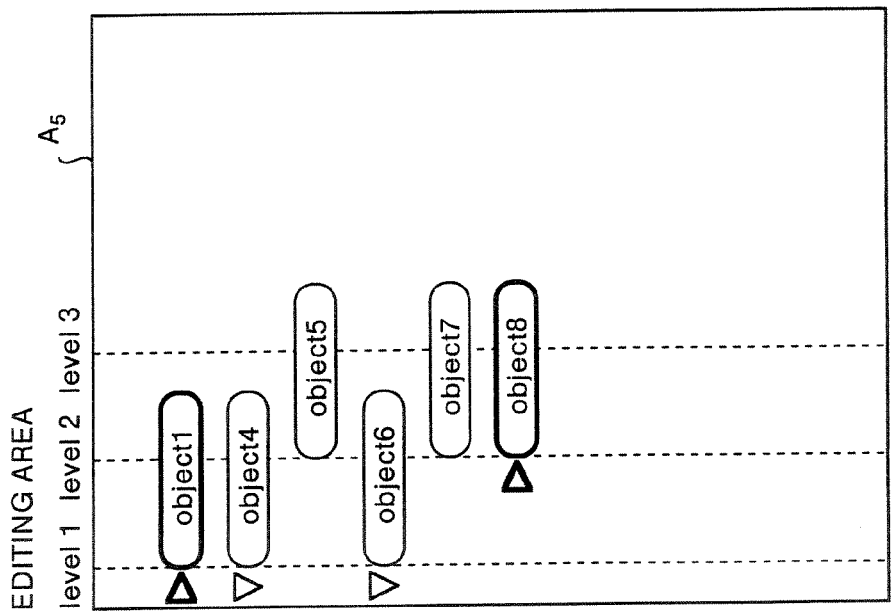
FIGS. 30A and 30B shows a child object to be shrink-displayed in the "editing area"
Figure 30A:
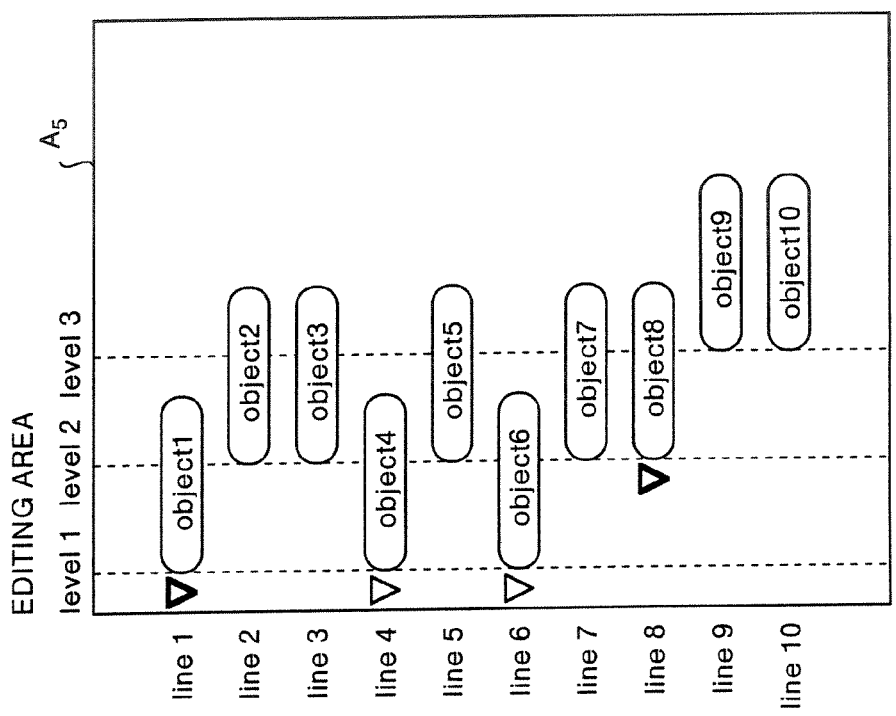

(5) Shrink display of the child object in the editing area:

FIGS. 30A and 30B are explanatory diagrams that show an operation of shrink display of the child object in the editing area A5. As shown in FIGS. 30A and 30B, a triangle mark is attached to the left side of the object having its child object. This mark is displayed automatically by the program that displays the editing area A5 when the program checks if the object has its child object and it determines that the object has the child object. If the user performs no action, as shown in FIG. 30A, a triangle mark directs downward like ∇ and child objects are all displayed. It is possible to click the triangle mark using the pointing device such as the mouse. When the user clicks the triangle mark ∇, as shown in FIG. 30B, the top of the triangle mark ∇ directs to the right and the child objects of the object with the triangle mark come into a non-display state.

Processes required for reaching to the display will be explained specifically. All objects on the "editing area" A5 are assumed to have, in addition to levels and lines corresponding to display locations, visible attributes for holding a display/non-display state, and shrink attributes for holding a display state of the child object, respectively. The visible attribute exhibits "true" for a display state and "false" for a non-display state. The shrink attribute exhibits "false" for a display state of the child object and "true" for a non-display state. Normally, the visible attributes are all "true" and the shrink attributes are all "false".

For example, in FIG. 30A, as the object 1 has child objects, a triangle mark is displayed at its left side, directing downward. When the triangle mark at the object 1 is clicked, the visible attributes of its child objects are set to "false". At the same time, the shrink attributes are set to "true". As for the object having a larger line attribute value than the concerned object, the line is decremented by the number of the child objects possessed by the concerned object. Then, the objects having the visible attributes of "true" are re-drawn. In this example, a predetermined object (triangle mark) associated with the parent object is operated to set a display/non-display state of the child object. Alternatively, the parent object may be operated directly to set a display/non-display state of the child object.

As explained, in the "outline" mode, the hierarchical structure of the object in the "editing area" A5 is designated/edited and the hierarchical structure of the designated object is displayed based on a predetermined rule. Therefore, it is possible to collect fragmentary objects efficiently.

When the parent object is designated, its child objects are designated together. Therefore, it is possible to easily edit the hierarchical structure of the object appeared in the editing area and collect fragmentary objects efficiently.

When the parent object or a predetermined object associated with the parent object is designated, a display/non-display state of its child object is designated/edited. Therefore, it is possible to easily edit the hierarchical structure of the object appeared in the "editing area" A5 and collect fragmentary objects efficiently.

A drawing is performed based on the rule that employs the horizontal location of the displayed object to express the hierarchical relation. Therefore, it is possible to intuitionally inspect the hierarchical structure of the object appeared in the "editing area" A5 and collect fragments of information efficiently.

[Explanation of Object Managing List]

Figure 31:
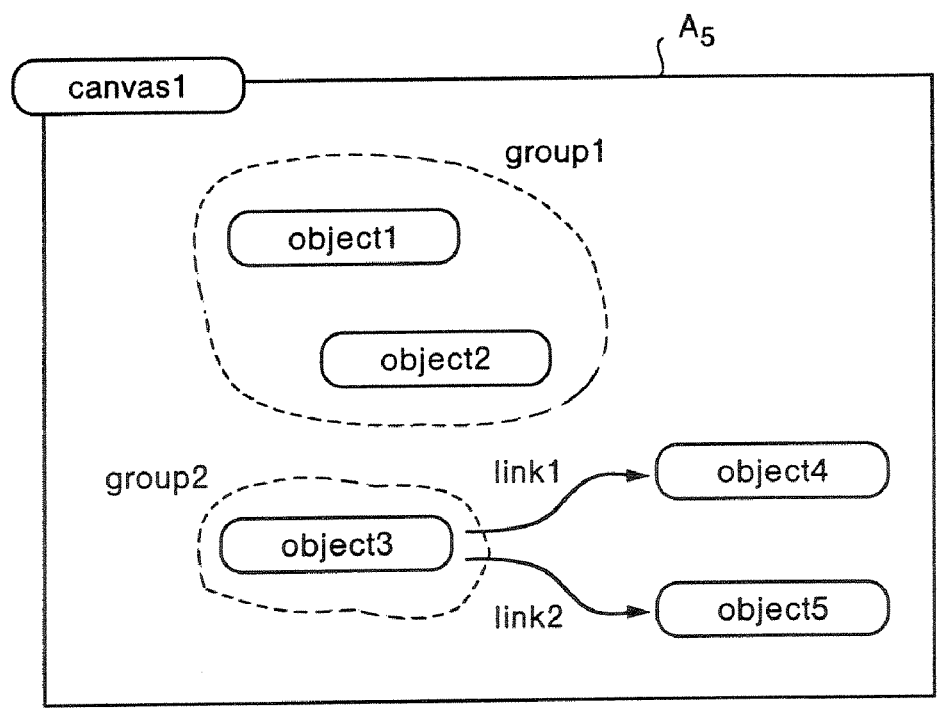
FIG. 31 is an explanatory diagram which shows an example of various operations within the "editing area"

The structure of the object arranged in the "editing area" A5 through the various operations is described in the form of an object managing list. FIG. 31 is an explanatory diagram which shows an example of the various operations in the "editing area" A5 and FIG. 32 is a schematic diagram which shows a data structure of the object managing list based on the various operations in the "editing area" A5 shown in FIG. 31. In FIG. 32, a rounded-rectangle indicates a pointer to an object and an angled-rectangle indicates a tag that shows a structure of an object. The object managing list will be explained below in turn.

A structure of a page in the "editing area" A5 is expressed by an object named "canvas". As the "editing area" A5 may continue over a plurality of pages, a first page in the "editing area" A5 is expressed by an object named "canvas 1". The object managing list is expressed in XML (Extensible Markup Language). The tag which shows the object structure directly corresponds to an XML tag.

As shown in FIG. 32, the "canvas" comprises an "individuality tag" that describes constitutional objects, a "relationship tag" that describes a relationship among objects and a "page attributes tag". Below the "individuality tag", pointers (object 1, object 2, . . . ) to the objects appeared in the "canvas" are described. Below each object pointer, attributes of an individual object are described. The attributes herein described include, in addition to the attributes explained earlier, attributes required for displaying locations within the "canvas" and others than significant attributes such colors. When an attribute of the object is changed, the corresponding value individually described is also changed.

In FIG. 32, those described in a lower layer below the attributes tag include a current position attribute, a visible attribute, a shrink attribute and a parents attribute, which are given in the "outline" mode. The current position attribute describes the level and line corresponding to the display location of the object in the editing area A5. The visible attribute holds a displayed state of an object, indicating "true" for display and "false" for non-display. The shrink attribute holds a displayed state of a child object, indicating "true" for display and "false" for non-display. The parents attribute holds a state of parenthood among objects, describing p_parent, branch ID.

Below the "relationship tag" that describes a relationship among objects, a "group" tag and a "link" tag are described. Below the "group" tag, groups defined in the "canvas" are described with names of group 1, group 2 and so on. These names are automatically generated in serial numbers and defined when the group definition is operated in the editing area A5. Below the groups (group 1, group 2, . . . ) defined in the "canvas", pointers to the objects belonging to respective groups are described. The pointers to the objects described herein are included in the objects described below the "individuality tag".

Below the "link tag", links defined in the "canvas" are described with names of link 1, link 2 and so on. These names are automatically generated in serial numbers and defined when the link definition is operated in the editing area A5.

Below the links (link 1, link 2, . . . ) defined in the "canvas", tags of "source" and "destination" are defined. Below each of these tags, pointers to objects corresponding to respective source and destination are described. The pointers to the objects described herein are included in the objects described below the "individuality tag".

The "page tag" indicates a page attribute, which is normally null. When the "finish" button B8 is pressed, it comes to "finish" and the page attribute is given.

Such the object managing list is described in XML and stored in a storage medium such as a disk. When the master client application is activated, it is read out of the disk and developed on a memory after objectified to the canvas 1, the canvas 2 and so on. When the master client application is terminated, these objects are stored again in the storage medium such as the disk in XML format. In the present embodiment, the object managing list is sent to the document managing server 4 together with the actual conditions of the objects, that is, the files and, after they are associated with each other, stored as a "conference document".

EXAMPLES

The teleconference system 1 will be explained for a specific example of the flow of a series of operations with reference to FIGS. 33 and 34.

In the teleconference system 1 in the present embodiment, the conference chairman can perform a series of operations, locating the pointing device at hand, such as the mouse 19, connected to the information processor 14 or the master client and sitting in a chair. Alternatively, the chairman can perform a series of operations using the coordinate detector 12, arising from the chair and standing in front of the information input/output device 2. The conferee other than the chairman can similarly perform a series of operations using the coordinate detector 12, arising from the chair and standing in front of the information input/output device 2. From the viewpoint of sharing information, the teleconference system 1 in the present embodiment allows the conferee to throw an object (text string, stroke data, file) into the "stacking area" A4 in the information processor 14 (master client) from the information processor 5 (slave client) at any desired time. Only the pointing device such as the mouse 19 connected to the information processor 14 or the master client and the coordinate detector 12 in the information input/output device 13 connected to the information processor 14 or the master client are allowed to access the "stacking area" A4.

As a result, it is possible to avoid a problem with the access right control and a problem with the overhead due to massive spending of computational resources. These problems are caused when the objects in the display screen on the display 11 connected to the information processor 14 or the master client are operated from the conferee's information processors 5 (slave clients) simultaneously. They are also caused when all slave clients operate the objects while a display condition of each conferee's information processor 5 (slave client) is always synchronized with another.

Figure 33:
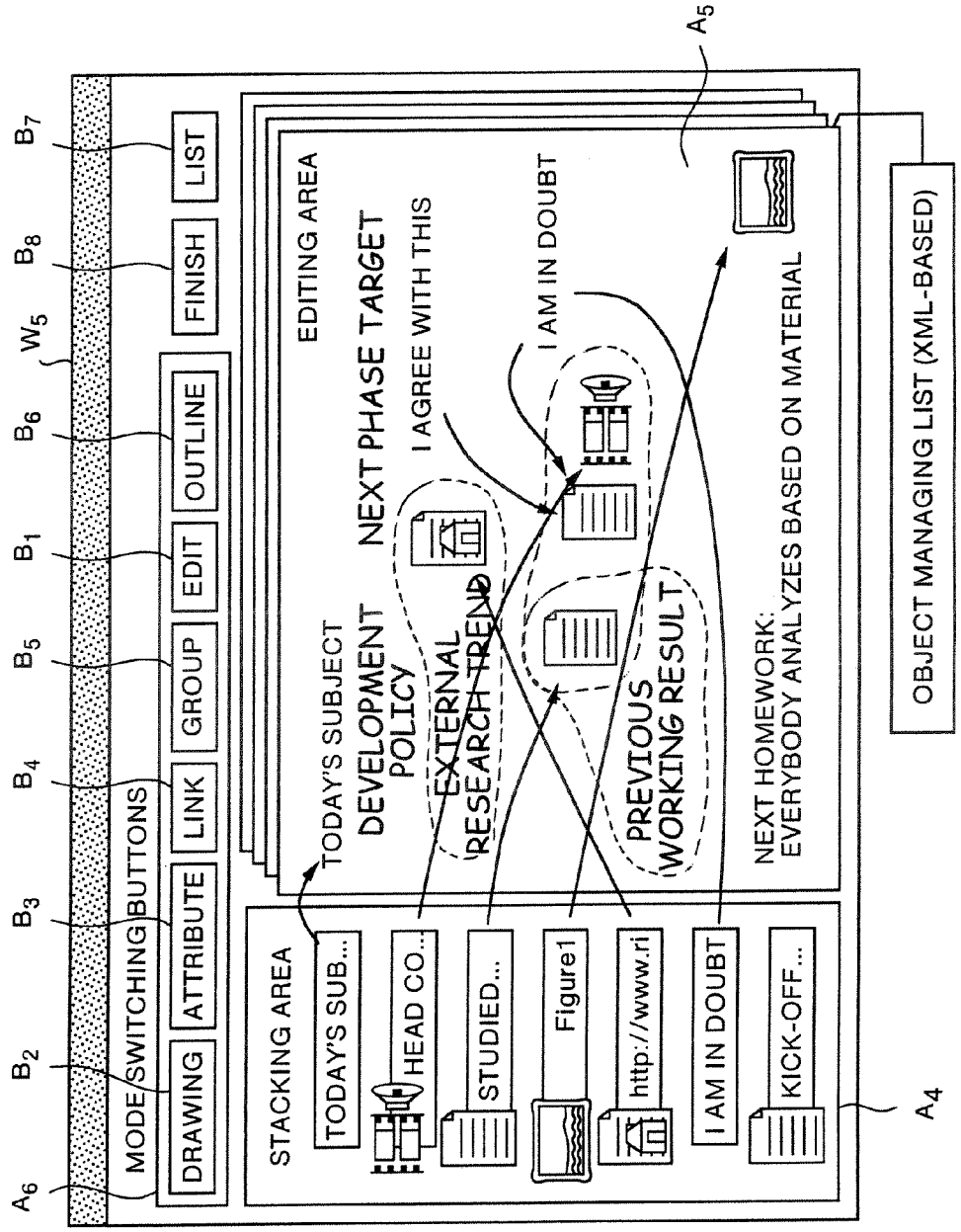
FIG. 33 is an explanatory diagram which shows an example of object operations in the display screen.

FIG. 33 is an explanatory diagram which shows an example of object operations in the display screen. As shown in FIG. 33, various objects sent from the conferees (shared) are located in the "stacking area" A4. In the "stacking area" A4 in FIG. 33, an object only with a text string is a text string entered by the conferee through the own information processor 5 (slave client) at site. It is an opinion or headline in a simple sentence generally. In the "stacking area" A4 in FIG. 33, an object of a text string with an icon added thereto is a file or URL sent from the conferee through the own information processor 5 (slave client). Expectable files include files in multimedia series such as audio files and motion picture files; image files in bit map series; and files created in appropriate applications such as word processors.

The conference chairman can employ the "editing area" A5 like the conventional white board to draw a hand-written character directly in it and can move/copy the object stacked in the "stacking area" A4 to the "editing area" A5 through the operation of Drag & Drop. The conference chairman may locate an information processor 5 (slave client) at hand as one conferee.

The conference chairman successively hand writes items under discussion into the "editing area" A5 in the form of an agenda. The conferee on the other hand, during discussion of each item, throws various pieces of information associated with the item into the "stacking area" A4. For example, during discussion of an "external research trend", one of the conferees at site or previously checks a URL to another company's home page and throws it into the "stacking area" A4. The conferee can immediately send an object from the slave client any time when the idea of the object comes up even during discussion. In the master client, even if the "editing area" A5 is working (processing, active condition), when the master client receives the object from the slave client, the display in the "stacking area" A4 is updated almost in real-time. The conference chairman drags the file object of the URL thrown into the "stacking area" A4 and drops it near the hand-written characters of the "external research trend".

The conference chairman operates the "group" button B5 to switch the mode to the "group", then surrounds the text string, "external research trend", and the file object of the dragged and dropped URL with a curve. As a result, the text string, "external research trend", and the file object of the URL are grouped.

When a conferee obtains a material related to the "previous working result", the conferee throws it into the "stacking area" A4. The conferee tells verbally to the conference chairman that the material is thrown. The conference chairman drags and drops the thrown material object in the "editing area" A5. The conference chairman moves the object near the hand-written characters of the "external research trend" and operates the "group" button B5 to switch the mode to the "group", then similarly grouping them. If another related material is present (for example, a file object of "kick-off report" in the figure), it may also be grouped.

After a further proceeding of the discussion, when the conferee attaches a comment to the contents of the "kick-off report" and if the conference chairman recognizes it important, the conference chairman operates the "link" button B4 to link a comment, "I agree with this", to the "kick-off report".

Figure 34:
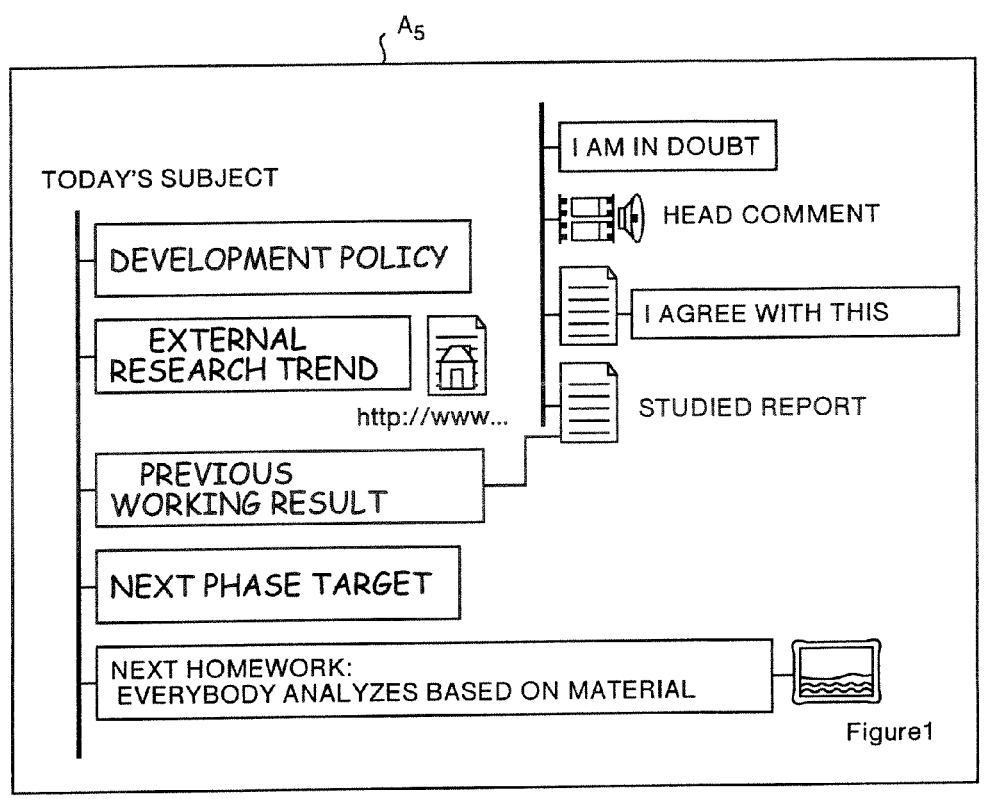
FIG. 34 is a front view which shows an example of a display screen on a display, which explains a tree structure of objects.
Figure 35:
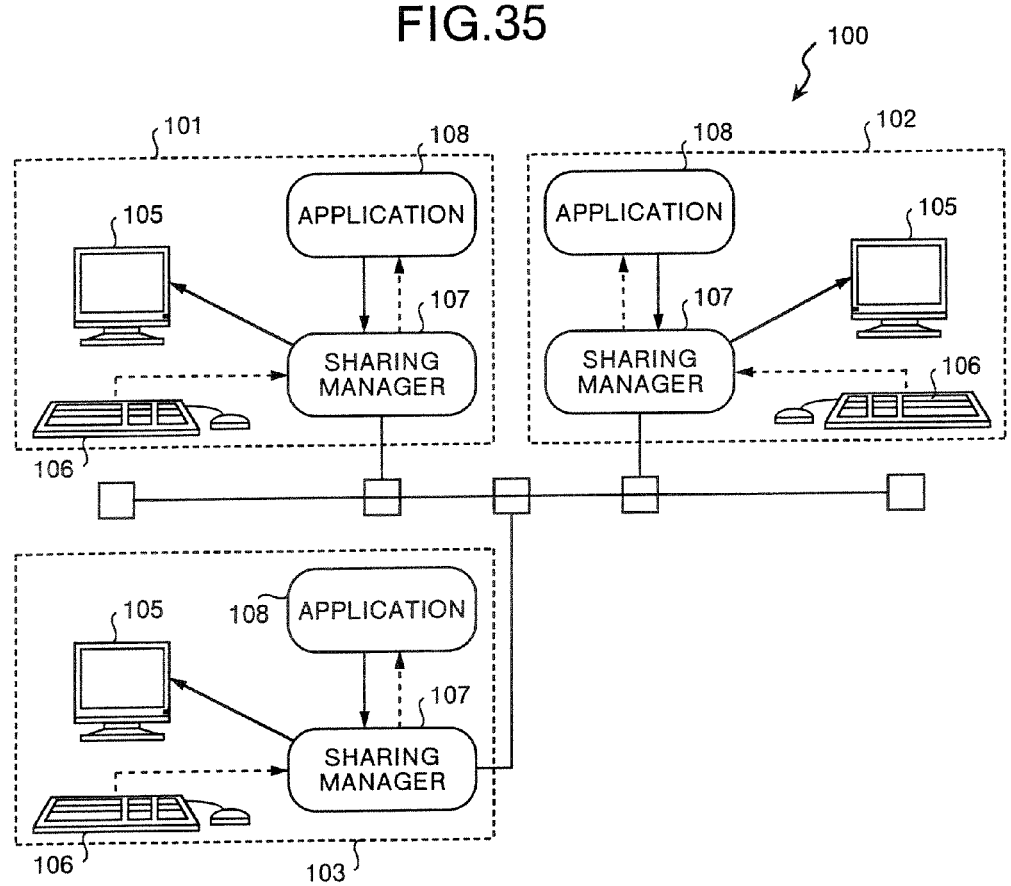
FIG. 35 is a systematic arrangement diagram which briefly shows an example of the conventional teleconference system.
Figure 36:
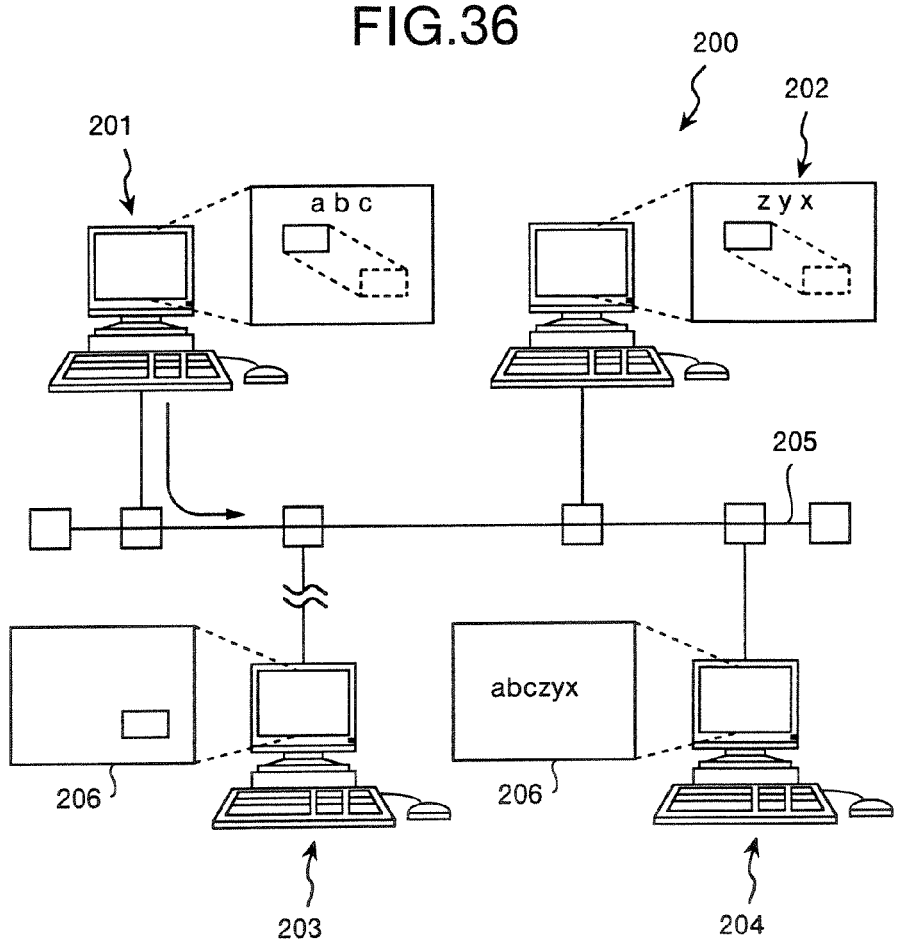
FIG. 36 is an explanatory diagram which shows the interrupted use of a PC during a teleconference.
Figure 37:
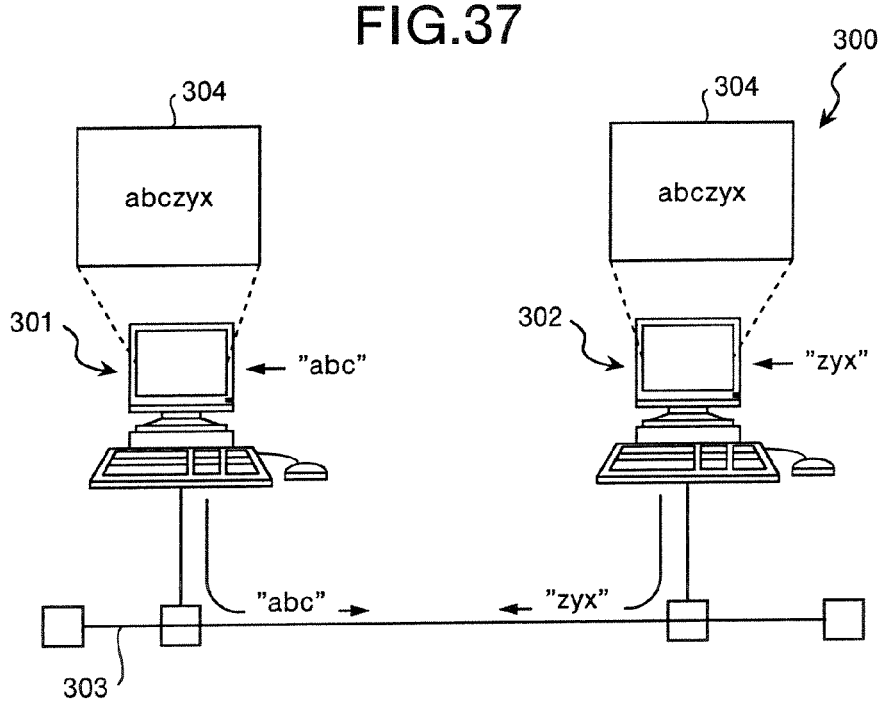
FIG. 37 is an explanatory diagram which shows data not sent in a correct order during the teleconference.

The information linked and grouped in the "editing area" A5 may be displayed in a tree structure as shown in FIG. 34 when the "finish" button B8 is operated, for example. In this example, the horizontal axis corresponds to a depth of the link and the vertical axis, for example, a time order of the objects created. If objects located in the same layer define a group, they are tied together with a vertical line as shown in FIG. 34. The objects located in the most left layer in FIG. 34 are objects in the highest layer (that is, they are not linked with any objects), which are expressed as a tree unconditionally tied together with a vertical line. Thus, the operation of the "finish" button B8 allows the structure between the objects to be visualized through the use of the link and attribute given to the object. This allows the conferees to visually identify the structures of various materials provided during the discussion. This is effective to prevent the discussion from departing from the right way and the conference from causing an ambiguous conclusion.

Attributes attachable to the object in the "editing area" A5 include, in addition to the grouped attributes, a one-dimensional attribute having a predetermined meaning such as "purpose", "conclusion" and "subject". They also include a multi-dimensional attribute having attributes in combination (for example, an attribute expressed with two attribute names such as "developed year" and "communication speed" according to a proposed specification of a machine to be developed). As shown in FIG. 33, if a phrase, "Next homework: Everybody analyzes based on this material", is an item decided in the conference, the conference chairman operates the "attribute" button B3 to select the "conclusion" from the pull-down menu and give an attribute of "conclusion" to the phrase (object) at site.

The use of the attribute having a predetermined meaning such as "purpose", "conclusion" and "subject" is explained. If it is required during the discussion to look back at the previous discussion and re-confirm the decided item, the "list" button B7 is operated. The operation of the "list" button B7 allows an object to be extracted, which object has a specific attribute among the attributes added in the "attribute" mode in the object managing list (see FIG. 20).

As for the use of the multi-dimensional attribute having the attributes in combination, as shown in FIG. 18 or 19, when a relation between objects is displayed visually based on attribute values per attribute, a relation between pieces of information having meanings added by giving attributes can be identified at a glance. Therefore, it is possible to easily arrange the consideration to create new knowledge and expect an extreme improvement of the efficiency in a cooperative knowledge creative work.

It has been explained centering around the operations performed by the conference chairman, though any conferee can take the leadership on the proceeding by just walking into the shared space (that is, in front of the large display 11 equipped with the coordinate detector 12). Any complicated processing such as the access right management is not required in the system and the access right can be passed to the conferee from the conference chairman only with an extremely natural action. This is effective to extremely improve the usability of the system.

As explained, the teleconference system 1 in the present embodiment definitely distinguishes the function that intends to share knowledge from the function that edits the structure of the shared knowledge through cooperative works.

The "stacking area" A4, employed by all conferees for sharing the information (object) or personal knowledge transmitted via the information processors 5 from conferees, and the "editing area" A5, employed for editing a structure of the information (object) or shared knowledge, can be definitely distinguished from each other and displayed in a large display 11 commonly visible from all conferees. When the areas are displayed in the large display 11 and a predetermined object of those displayed in the "stacking area" A4 is designated, the designated object is displayed at a desired location in the "editing area" A5.

It is also possible to give an additional attribute Z, which is a combination of attribute values of at least two attributes, to the information (object) divergently created/provided during the discussion by all conferees centering around the conference chairman using the selective display area. As a result, when the information provided from one conferee is updated, other conferees and the chairman can identify the update easily. In addition, the provided information is not directly displayed in the "editing area" A5 and accordingly synchronizing is not required at each information processor 5. Therefore, it is possible to manage the conference without preventing the discussion from proceeding. It is also possible, by giving the additional attribute Z, which is a combination of attribute values of at least two attributes, to the provided information (object), to arrange a relation between pieces of information (object) at site and efficiently collect and grasp information.

The invention should not be viewed as limited to the disclosed embodiments but rather should be viewed as limited only by the spirit and scope of the present invention.

As obvious from the forgoing, the information sharing area, employed by all conferees for sharing the information (object) or personal knowledge transmitted via the information processors from conferees, and the selective display area, employed for editing a structure of the information (object) or shared knowledge, can be definitely distinguished from each other and displayed in a large display device commonly visible from all conferees. When the areas are displayed in the large display device and one of the objects displayed in the information sharing area is designated, the designated object is displayed at a desired location in the selective display area and can be edited through cooperative works by all conferees centering around a conference chairman. As a result, when the information provided from one conferee is updated, other conferees and the chairman can identify the update easily. In addition, the provided information is not directly displayed in the selective display area and accordingly synchronizing is not required at each information processor. Therefore, it is possible to manage the conference without preventing the discussion from proceeding. It is also possible to definitely distinguish the function that intends to share knowledge and the function that edits the structure of the shared knowledge to simplify the system. This is effective to reduce the spending of computational resources and improve reliability and fastness.

The object designating unit and the designated object moving unit employ Drag & Drop operations. Therefore, the information sharing area or the space for holding information provided from the conferees is not directly related to the selective display area or the editing screen. In spite of such the arrangement, through an easy and intuitive operation of Drag & Drop, the conference chairman can move/copy the information provided from the conferees to the space for editing as a target to be edited. This is effective to reduce interruptions in consideration during the discussion, readily share the individual information and extremely improve the efficiency in cooperative works by all conferees.

The object designating unit designates one object among the objects displayed in the information sharing area indicated via a coordinate detector which detects coordinates of a location indicated in a display screen on the display device. Therefore, the information sharing area that is the space for holding information provided from the conferees is not directly related to the selective display area or the editing screen. In spite of such the arrangement, through an easy and intuitive operation of direct touch, the conference chairman can move/copy the information provided from the conferees to the space for editing as a target to be edited. This is effective to reduce interruptions in consideration during the discussion, readily share the individual information and extremely improve the efficiency in cooperative works by all conferees. In addition, any conferee can take the leadership on the proceeding by just walking into the shared space (that is, in front of the large display device equipped with the coordinate detector). Any complicated processing such as the access right management is not required in the system and the access right can be passed to the conferee from the conference chairman only with an extremely natural action. This is effective to extremely improve the usability of the system.

The object editing unit groups at least two of the objects displayed in the selective display area. Therefore, pieces of information divergently created/provided during the discussion using the selective display area that is the editing screen can be grouped at site. As a result, it is possible to perform a dynamic and electronic classification of the information in front of all conferees, arrange a discussion easily, and improve a convergence of the discussion in the conference.

The object editing unit gives a predetermined attribute to the object displayed in the editing display area. Therefore, it is possible to add a concept important in the conference for the information divergently created/provided during the discussion using the selective display area that is the editing screen, such as the "purpose", "conclusion" or "subject", to the object as an attribute. As a result, it is possible to easily look over only the objects with these important attributes added thereto even in the middle of the conference and extremely improve the efficiency of the proceedings. The third party can easily extract the essence of the conference and efficiently collect or grasp the information.

The object editing unit links two of the objects displayed in the editing display area. Therefore, pieces of information divergently created/provided during the discussion using the selective display area that is the editing screen can be layered by linking objects respectively associated with the information. As a result, it is possible to perform a dynamic and electronic classification of the information in front of all conferees, arrange a discussion to easily, and improve a convergence of the discussion in the conference. It is also possible, based on one object created during the conference (for example, a final conclusion), to obtain the object employed in the middle of the discussion leading to this conclusion. This is effective to extremely improve the reusability of the information.

The object editing unit includes an object edited result storage unit that stores an edited result on the object by the object editing unit. As a result, it is possible to hold the edited result on the object. This is effective to extremely improve the reusability of the information.

The object editing unit includes an edited result display unit that extracts a specifically edited object from the edited result on the object stored in the object edited result storage unit to display the specifically edited object on the display device. Thus, the objects that are given various attributes can be identified during the discussion using the selective display area. Accordingly, it is possible to identify the flow of the discussion at a glance and extremely improve the efficiency of the proceedings.

The object editing unit includes an attribute storage unit that stores an attribute of the object; an attribute giving unit that displays the attribute stored in the attribute storage unit and selects the displayed attribute to give the attribute to the object; and an object storage unit that stores the attribute-given object together with the given attribute in the storage unit. Therefore, all conferees can grasp the contents of the conference, share the common information, and listen to the conference proceeding, without complicating the system. Particularly, it is possible to give an attribute to the object common to all conferees, give a meaning to the common object without preventing the conference from proceeding.

The object editing unit includes an object extracting unit that extracts a predetermined attribute-given object from the attribute-given objects by the attribute giving unit. Therefore, by extracting an object based on the attribute given to the object to give a meaning, it is possible to arrange the subject and conclusion of the conference during or after the conference.

The object editing unit includes a storage unit that separately stores attribute values associated with at least two attributes related to the object; an attribute value selecting unit that selects a desired attribute value from the attributes stored in the storage unit; an additional attribute generating unit that combines attribute values of the attributes selected by the attribute value selecting unit to generate an additional attribute to be given to the object; and an attribute giving unit that gives the additional attribute generated by the additional attribute generating unit to the object displayed in the editing display area by the designated object moving unit. Therefore, it is possible to give an additional attribute, which is a combination of attribute values of at least two attributes, to the information (object) divergently created/provided during the discussion by all conferees centering around the conference chairman using the selective display area to arrange a relation between pieces of information (object) at site and efficiently collect and grasp information.

The object editing unit includes an additional attribute display unit that displays the additional attribute given to the object by the attribute giving unit near the object displayed in the editing display area on the display device. Thus, the objects that are given various additional attributes can be identified during the discussion using the selective display area. Accordingly, it is possible to identify the flow of the discussion at a glance and extremely improve the efficiency of the proceedings.

The object editing unit includes an object relation display unit that displays a relation between a plurality of additional attribute-given objects on the display device based on the attribute values of the attributes contained in the additional attribute given to each object. Thus, a relation between pieces of information having meanings added by giving attributes can be identified at a glance. Therefore, it is possible to easily arrange the consideration to create new knowledge and expect an extreme improvement of the efficiency in a cooperative knowledge creative work.

The object editing unit includes an attribute editing unit that edits at least two attributes associated with the object stored in the storage unit and attribute values related to the attributes. This is effective to absorb differences in categories of problems to be processed and differences in languages due to different occupations and professions. Therefore, an extreme improvement of the efficiency in any type of knowledge creative work can be expected.

The object editing unit includes an attribute giving unit that gives an attribute to the object displayed in the editing display area; an object extracting unit that extracts an object given a predetermined attribute among the attributes given by the attribute giving unit; and an extracted object display unit that displays the object extracted by the object extracting unit in a predetermined format in the editing display area. Thus, an attribute generally important in the conference is employed as a key to extract an object and the extracted object is displayed in the selective display area. Therefore, it is possible to reliably identify the output on the proceedings. It is also possible to arrange a relation between pieces of information (object) at site divergently created/provided from the information processor and efficiently collect and grasp information.

The extracted object display unit displays the object extracted by the object extracting unit on a new page in the editing display area. Thus, an extracted object can be displayed on a new page in the editing display area. Therefore, an annotation can be further attached to the extracted object to define the next action (homework for members, for example) and extremely improve a yield of the conference.

The object editing unit includes a page attribute giving unit that gives a page attribute to the new page in the editing display area displaying the object extracted by the object extracting unit. Thus, a page attribute can be given to the page that displays the extracted objects. Therefore, it is possible to distinguish the page from other pages and display a finish page that can easily display the extracted objects even when any page is referred. As a result, it is possible to reconfirm the result after the conference easily and reliably and extremely improve a yield of the conference.

The predetermined attribute employed by the object extracting unit to extract the object is previously determined. Thus, the predetermined attribute employed by the object extracting unit to extract the object is previously determined. As a result, it is possible to set generally important attributes previously.

The object editing unit includes a hierarchical structure edit-directing unit that instructs an edit direction on a hierarchical structure of the object displayed in the editing display area; and a hierarchical structure drawing control unit that draws the hierarchical structure of the object edit-directed by the hierarchical structure edit-directing unit based on a predetermined rule. Thus, the hierarchical structure is designated/edited and the hierarchical structure of the designated object is displayed based on a predetermined rule. Therefore, it is possible to collect fragmentary objects efficiently. It is also possible to arrange a relation between pieces of information (object) at site divergently created/provided from the information processor and efficiently collect and grasp information.

The hierarchical structure of the object contains a structure of parentage between objects. Thus, the structure of parentage between objects is displayed. Therefore, it is possible to express the parentage between objects.

The hierarchical structure edit-directing unit edit-directs a parent object together with a child object thereof in a batch within the editing display area. Thus, when the parent object is designated, its child objects are designated together. Therefore, it is possible to easily edit the hierarchical structure of the object appeared in the editing area and collect fragmentary objects efficiently.

The hierarchical structure edit-directing unit directs the parent object or a predetermined object associated with the parent object to indicate the child object in a displayed or non-displayed condition. The hierarchical structure drawing control unit switches the child object between the displayed and non-displayed conditions based on the direction from the hierarchical structure edit-directing unit. Thus, when the parent object or a predetermined object associated with the parent object is designated, a display/non-display state of its child object can be designated/edited. Therefore, it is possible to easily edit the hierarchical structure of the object appeared in the editing display area and collect fragmentary objects efficiently.

The structure of parentage between objects is expressed by a horizontal location of the object displayed. Therefore, it is possible to intuitionally inspect the hierarchical structure of the object displayed in the editing display area and collect fragments of information efficiently.

In an embodiment according to the present invention, an information processor is connected via a network to a conference support apparatus that supports a teleconference. The processor comprises a transmission information determining unit that determines transmission of predetermined information to be processed; and an information transmitting unit that transmits the information to the conference support apparatus after the determination by the transmission information determining unit of the transmission of the information. Therefore, independent of processing operations by other conferees and the conference chairman, predetermined information prepared by one conferee can be sent to the conference support apparatus and accordingly, it is possible to manage the conference without preventing the discussion from proceeding.

This application is a division of application Ser. No. 10/259,774, filed Sep. 20, 2002, the entire contents of which is hereby incorporated by reference. This application also claims the benefit from and incorporates by reference the entire contents of Japanese priority document, 2001-303385 filed in Japan on Sep. 28, 2001, 2002-082149 filed in Japan on Mar. 22, 2002, 2002-229162 filed in Japan on Aug. 6, 2002, 2002-258309 filed in Japan on Sep. 3, 2002 and 2002-258310 filed in Japan on Sep. 3, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A teleconference system, which comprises information processors configured to be used by conferees and a master conference support apparatus configured to be used by a master operator and shared by the conferees and connected via a network to the information processors, the information processors each including:
    a transmission information determining unit that determines transmission of predetermined information to be processed; and
    an information transmitting unit that transmits the predetermined information to the master conference support apparatus after the determination by the transmission information determining unit of the transmission of the predetermined information, the master conference support apparatus including:
    a display device comprising a display configured to be visible to the conferees;
    an information receiving unit that receives information transmitted from the information processors;
    an area display unit that allows the display device to display an information sharing area for listing predetermined objects and an editing display area for displaying the predetermined objects listed in the information sharing area;
    an object listing unit that employs the information sharing area to display the predetermined objects according to the information received by the information receiving unit;
    an object designating unit that designates a predetermined object among the predetermined objects displayed in the information sharing area;
    a designated object moving unit that displays the predetermined object designated by the object designating unit at a desired location in the editing display area; and
    an object editing unit that edits the predetermined object displayed in the editing display area by the designated object moving unit, wherein
    the object designating unit and the designated object moving unit are configured to be controlled by commands from the master conference support apparatus and not the information processors used by the conferees.

2. The teleconference system according to claim 1, wherein the object editing unit includes:
    an attribute storage unit that stores an attribute of the predetermined object;
    an attribute giving unit that displays the attribute stored in the attribute storage unit and selects the displayed attribute to give the attribute to the predetermined object; and
    an object storage unit that stores the attribute-given predetermined object together with the given attribute in the storage unit.

3. The teleconference system according to claim 1, wherein the object editing unit includes:
    a storage unit that separately stores attribute values associated with at least two attributes related to the predetermined object;
    an attribute value selecting unit that selects a desired attribute value from the attributes stored in the storage unit;

attribute generating unit that combines attribute values of the attributes selected by the attribute value selecting unit to generate an attribute to be given to the predetermined object; and an attribute giving unit that gives the attribute generated by the attribute generating unit to the predetermined object displayed in the editing display area by the designated object moving unit.

4. The teleconference system according to claim 1, wherein the object editing unit includes:

an attribute giving unit that gives an attribute to the predetermined object displayed in the editing display area;

an object extracting unit that extracts an object given a predetermined attribute among the attributes given by the attribute giving unit; and an extracted object display unit that displays the object extracted by the object extracting unit in a predetermined format in the editing display area.

5. The teleconference system according to claim 1, wherein the object editing unit includes:

a hierarchical structure edit-directing unit that instructs an edit direction on a hierarchical structure of the predetermined object displayed in the editing display area; and a hierarchical structure drawing control unit that draws the hierarchical structure of the predetermined object edit-directed by the hierarchical structure edit-directing unit based on a predetermined rule.

6. A master conference support apparatus, comprising:

a display device comprising a display configured to be visible to conferees;

an information receiving unit that receives information transmitted from information processors configured to be used by the conferees;

an area display unit that allows the display device to display an information sharing area for listing predetermined objects and an editing display area for displaying the predetermined objects listed in the information sharing area;

an object listing unit that employs the information sharing area to display the predetermined objects according to the information received by the information receiving unit;

an object designating unit that designates a predetermined object among the predetermined objects displayed in the information sharing area;

a designated object moving unit that displays the predetermined object designated by the object designating unit at a desired location in the editing display area; and an object editing unit that edits the predetermined object displayed in the editing display area by the designated object moving unit, wherein the object designating unit and the designated object moving unit are configured to be controlled by commands from the master conference support apparatus and not the information processors used by the conferees.

7. The master conference support apparatus according to claim 6, wherein the object editing unit includes:

an attribute storage unit that stores an attribute of the predetermined object;

an attribute giving unit that displays the attribute stored in the attribute storage unit and selects the displayed attribute to give the attribute to the predetermined object; and an object storage unit that stores the attribute-given predetermined object together with the given attribute in the storage unit.

8. The master conference support apparatus according to Claim 6, wherein the object editing unit includes:

a storage unit that separately stores attribute values associated with at least two attributes related to the predetermined object;

an attribute value selecting unit that selects a desired attribute value from the attributes stored in the storage unit;

an attribute generating unit that combines attribute values of the attributes selected by the attribute value selecting unit to generate an attribute to be given to the predetermined object; and an attribute giving unit that gives the attribute generated by the attribute generating unit to the predetermined object displayed in the editing display area by the designated object moving unit.

9. The master conference support apparatus according to claim 6, wherein the object editing unit includes:

an attribute giving unit that gives an attribute to the predetermined object displayed in the editing display area;

an object extracting unit that extracts an object given a predetermined attribute among the attributes given by the attribute giving unit; and an extracted object display unit that displays the object extracted by the object extracting unit in a predetermined format in the editing display area.

10. The master conference support apparatus according to claim 6, wherein the object editing unit includes:

a hierarchical structure edit-directing unit that instructs an edit direction on a hierarchical structure of the predetermined object displayed in the editing display area; and a hierarchical structure drawing control unit that draws the hierarchical structure of the predetermined object edit-directed by the hierarchical structure edit-directing unit based on a predetermined rule.

11. A method of teleconferencing, comprising:

determining a transmission of predetermined information received from information processors used by conferees to be processed;

transmitting the predetermined information to a master conference support apparatus after the determining the transmission of the predetermined information;

receiving the transmitted predetermined information from the information processors;

displaying an information sharing area for listing predetermined objects and an editing display area for displaying the predetermined objects listed in the information sharing area;

employing the information sharing area to display the predetermined objects according to the received transmitted predetermined information;

designating a predetermined object among the predetermined objects displayed in the information sharing area;

displaying the predetermined object designated by the designating step at a desired location in the editing display area; and editing the predetermined object displayed in the editing display area, wherein the designating the predetermined object and the displaying the predetermined object are controlled by commands from the master conference support apparatus and not the information processors used by the conferees.

12. The method of teleconferencing according to claim 11, wherein the editing the predetermined object displayed in the editing display area includes:

storing an attribute of the predetermined object;

displaying the attribute stored and selecting the displayed attribute to give the attribute to the predetermined object; and storing the attribute-given predetermined object together with the given attribute in the storage unit.

13. The method of teleconferencing according to claim 11, wherein the editing the predetermined object displayed in the editing display area includes:

separately storing attribute values associated with at least two attributes related to the predetermined object;

selecting a desired attribute value from the stored attributes;

combining attribute values of the selected attributes to generate an attribute to be given to the predetermined object; and giving the generated attribute to the predetermined object displayed in the editing display area.

14. The method of teleconferencing according to claim 11, wherein the editing the predetermined object displayed in the editing display area includes:

giving an attribute to the predetermined object displayed in the editing display area;

extracting an object given a predetermined attribute among the given attributes; and displaying the object extracted by the object extracting unit in a predetermined format in the editing display area.

15. The method of teleconferencing according to claim 11, wherein the editing the predetermined object displayed in the editing display area includes:

instructing an edit direction on a hierarchical structure of the predetermined object displayed in the editing display area; and drawing the hierarchical structure of the predetermined object edit-directed by the hierarchical structure edit-directing unit based on a predetermined rule.

* * * * *